United States Patent
Östman et al.

(10) Patent No.: US 6,483,838 B1
(45) Date of Patent: Nov. 19, 2002

(54) COMBINED HEADER PARAMETER TABLE FOR ATM NODE

(75) Inventors: Mattias Östman, Saltsjöbaden (SE); Lars-Göran Petersen, Tumba (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/188,096

(22) Filed: Nov. 9, 1998

Related U.S. Application Data

(60) Provisional application No. 60/071,063, filed on Dec. 19, 1997.

(51) Int. Cl.$^7$ .......................... H04L 12/28; H04L 12/56
(52) U.S. Cl. ................... 370/395.31; 370/395.6
(58) Field of Search .......................... 370/310.1, 310.2, 370/351, 389, 395.1, 395.3, 395.31, 395.6, 395.64

(56) References Cited

U.S. PATENT DOCUMENTS

| | | | | |
|---|---|---|---|---|
| 5,414,701 A | * | 5/1995 | Shtayer et al. | 370/395.3 |
| 5,467,347 A | | 11/1995 | Petersen | 370/230 |
| 5,946,309 A | | 8/1999 | Westberg et al. | 370/395.3 |
| 5,953,339 A | * | 9/1999 | Baldwin et al. | 370/230 |
| 5,963,564 A | | 10/1999 | Petersen et al. | 370/395.1 |
| 5,978,375 A | * | 11/1999 | Petersen et al. | 370/241.1 |

FOREIGN PATENT DOCUMENTS

WO 96/34478 10/1996

OTHER PUBLICATIONS

US 5,361,257, 11/1994, Petersen (withdrawn)
Baldwin et al, "AAL–2—A new ATM Adaptation Layer for Small Packet Encapsulation and Multiplexing", Bell Labs Technical Journal, vol. 2, No. 2, Mar. 21, 1997, pp. 111–131.

Mauger et al, "QoS Guarantees for Multimedia Services on a TDMA–Based Satellite Network", IEEE Communications Magazine, Jul. 1997, pp. 60–65.

\* cited by examiner

Primary Examiner—Kwang Bin Yao
Assistant Examiner—Kevin C. Harper
(74) Attorney, Agent, or Firm—Nixon & Vanderhye, P.C.

(57) ABSTRACT

Within an ATM node, a cell handling unit (CHU) receives incoming ATM cells from an ATM switch and provides outgoing ATM cells back to the ATM switch. The cell handling unit consults a combined or consolidated table to obtain ATM parameters (e.g., VCI) for use in headers of outgoing ATM cells. The combined table can be utilized both for ATM cells with AAL2 protocol and ATM cells of a second type AAL protocol. The second type AAL protocol is preferably AAL2 prime, which requires that AAL2 packets carried in the ATM cell payload be whole packets and that the ATM payload not have an AAL2-type start field. The combined table is structured to have plural intervals, including a first interval for AAL2 protocol connections and plural other intervals for the second type AAL protocol connections. Each row for the AAL2 protocol interval associates (1) a unique incoming VCI value; (2) an output link value; (3) an outgoing VCI value; and (4) an offset value. The offset value points to the one of the plural intervals for the second AAL protocol connection. Each of the rows for the table intervals for the second AAL protocol connections associates (1) an incoming VCI value; (2) a channel identifier (CID); (3) an output link value; and (4) an ATM parameter for use in an ATM header of an outgoing ATM cell.

14 Claims, 34 Drawing Sheets

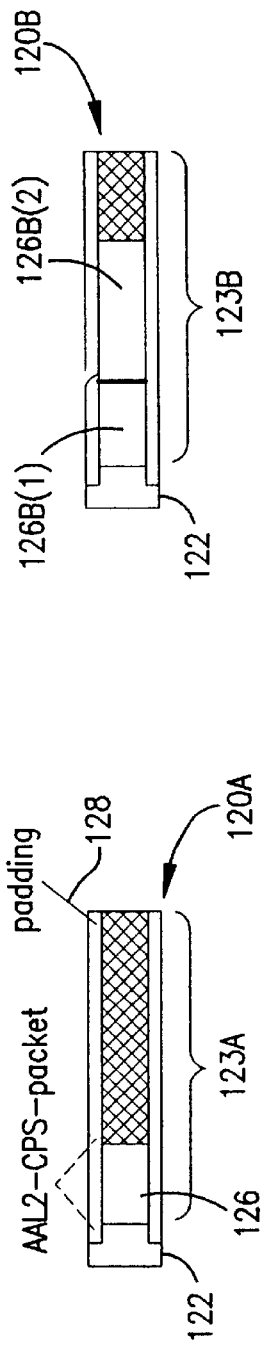
FIG. 6B
FIG. 6A
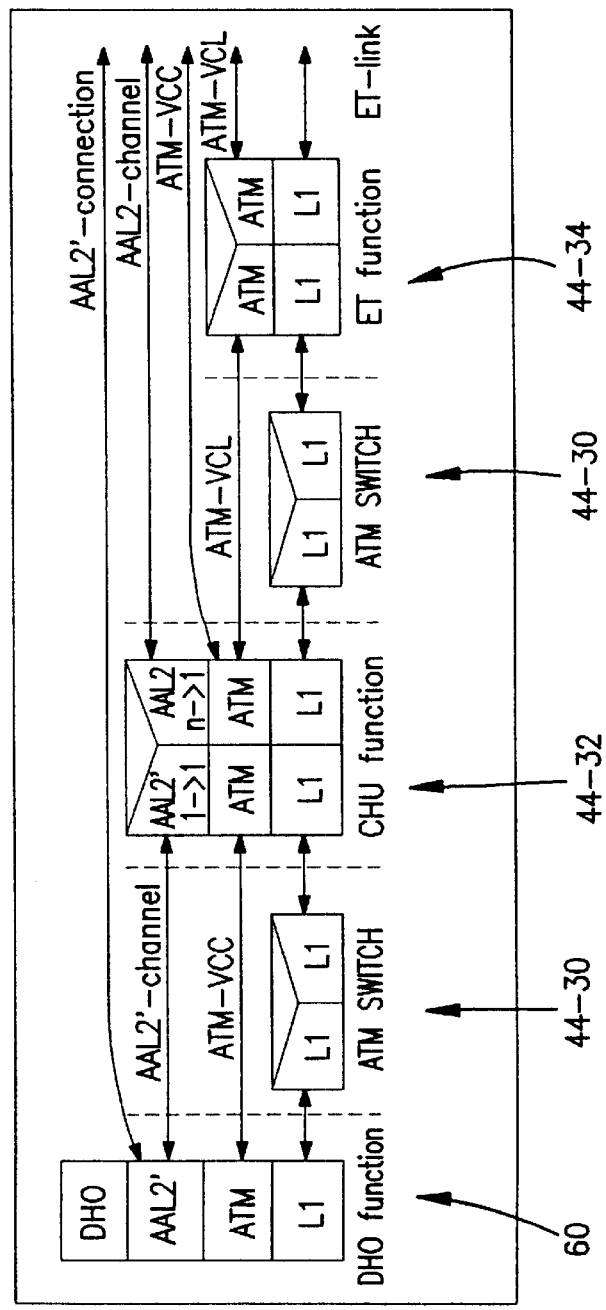
FIG. 8

TOP PRIORITY

ROUTER SCHEDULER

TRANSFER CELL FUNCTION

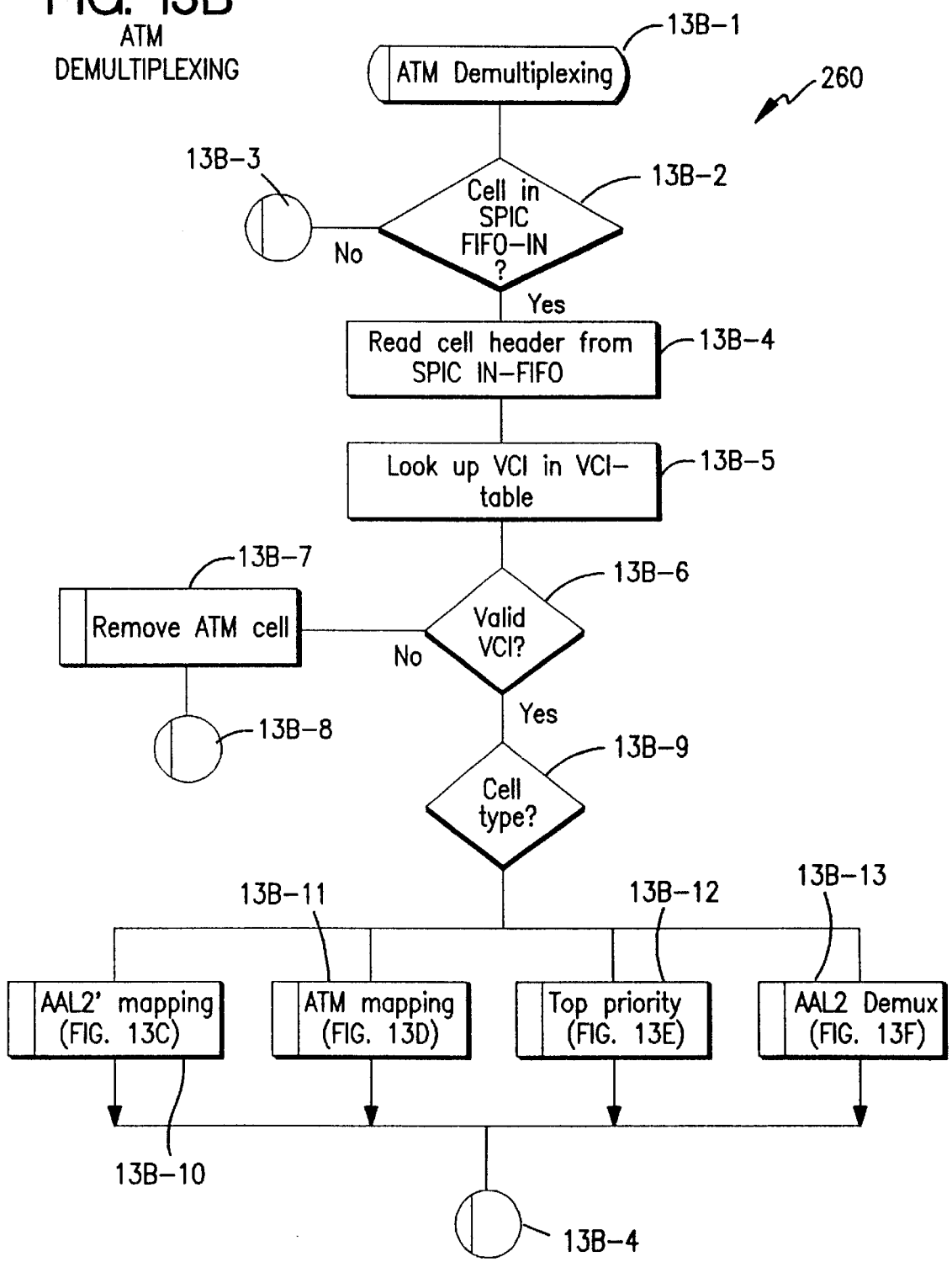

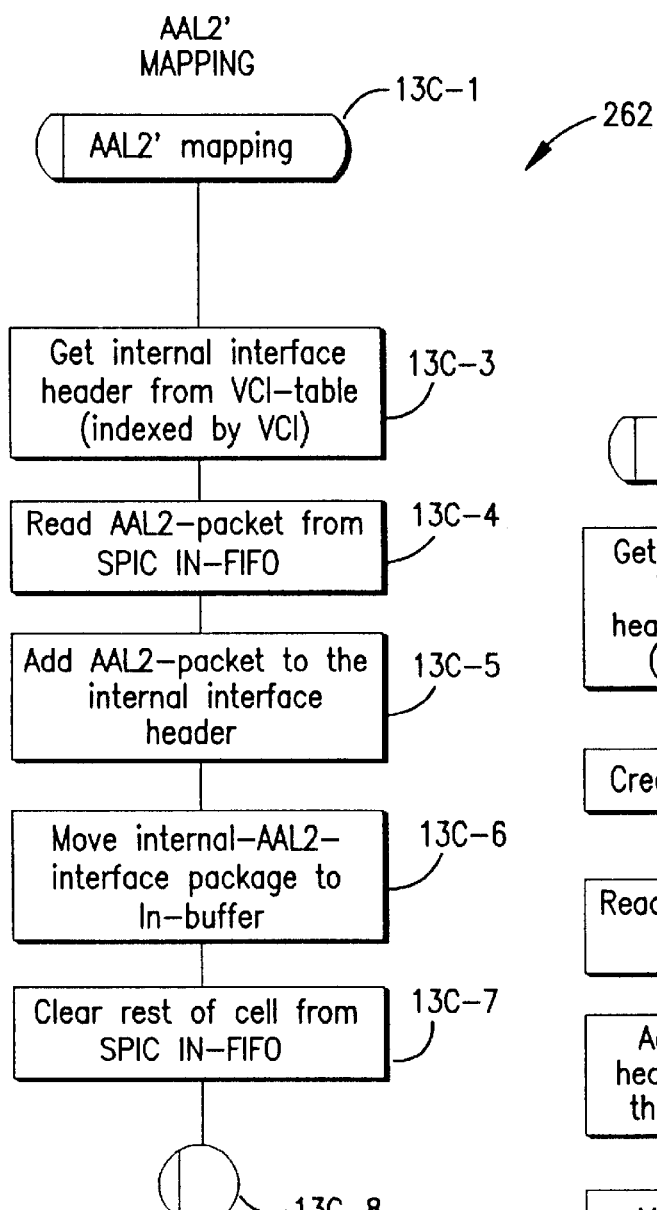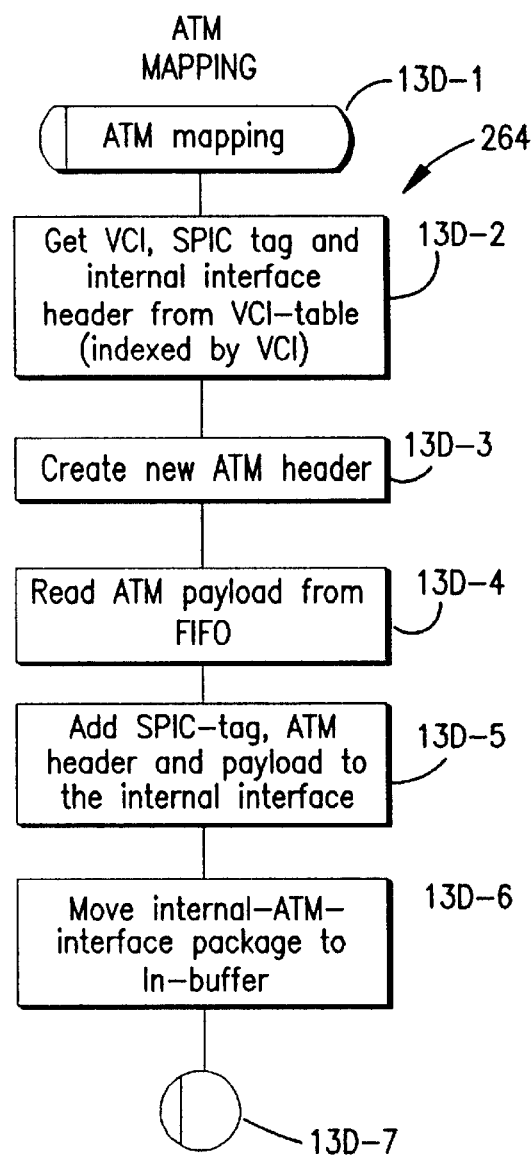

AAL2
DEMULTIPLEXING

ROUTER
START FIELD
HANDLING

ROUTER OVERLAP HANDLING

READ AAL2 PACKET

CREATE
AAL2' CELL

ROUTER REMOVE
ATM CELL

ROUTER REMOVE
AAL2 PACKET

QUEUE SERVER
SCHEDULER

QUEUE CELL/PACKET FUNCTIOM

MULTIPLEXING FUNCTION

ATM MULTIPLEXING FUNCTION

AAL2 MULTIPLEXING FUNCTION

CREATE ATM HEADER AND START FIELD

SELECT AAL2 PACKET

AAL2 PRIME
PAYLOAD PREPARATION
FUNCTION

AAL2 OVERLAP
FORMAT
FUNCTION

DISCARD ATM
CELL FUNCTION

DISCARD AAL2 PACKET FUNCTION

DEQUEUE ATM CELL FUNCTION

DEQUEUE AAL2 PACKET FUNCTION

TRANSMISSION ORDER →

PRIORITY LEVEL ↓

| E | F | G | H | A | B | C | D | E | --- |
|---|---|---|---|---|---|---|---|---|---|
| F | G | H | A | B | C | D | E | F | --- |
| G | H | A | B | C | D | E | F | G | --- |
| H | A | B | C | D | E | F | G | H | --- |
| A | B | C | D | E | F | G | H | A | --- |
| B | C | D | E | F | G | H | A | B | --- |
| C | D | E | F | G | H | A | B | C | --- |
| D | E | F | G | H | A | B | C | D | --- |

FIG. 15A

TRANSMISSION ORDER →

PRIORITY LEVEL ↓

| E1 | E2 | E3 | E4 | E1 | E2 | E3 | E4 | E1 | --- |
|----|----|----|----|----|----|----|----|----|-----|
| E2 | E3 | E4 | E1 | E2 | E3 | E4 | E1 | E2 | --- |
| E3 | E4 | E1 | E2 | E3 | E4 | E1 | E2 | E3 | --- |
| E4 | E1 | E2 | E3 | E4 | E1 | E2 | E3 | E4 | --- |
| E1 | E2 | E3 | E4 | E1 | E2 | E3 | E4 | E1 | --- |

| (1) CID | (2) INCOMING VCI | (3) CONNECTION TYPE | (4) ET-LINK | (5) AAL2-LINK | (6) OFFSET | (7) OUTGOING VPI | (8) OUTGOING VCI | (9) OUTGOING SPIC TAG | (10) |
|---|---|---|---|---|---|---|---|---|---|
| — | 32 | AAL2 to/from ET-link | 0 | 0 | A | | | | |
| — | 33 | AAL2 to/from ET-link | 0 | 1 | B | | | | |
| — | 34 | AAL2 to/from ET-link | 0 | 2 | C | | | | |
| — | 35 | AAL2 to/from ET-link | 0 | 3 | D | | | | |
| — | 36 | AAL2 to/from ET-link | 1 | 0 | E | | | | |
| — | 37 | AAL2 to/from ET-link | 1 | 1 | F | | | | |
| — | 38 | AAL2 to/from ET-link | 1 | 2 | G | | | | |
| — | 39 | AAL2 to/from ET-link | 1 | 3 | H | | | | |
| — | 40–47 | UNUSED | | | | | | | |
| 8 | 48 | AAL2' to/from NODE | 0 | 0 | | | | | |
| 9 | 49 | AAL2' to/from NODE | 0 | 0 | | | | | |
| 10 | 50 | AAL2' to/from NODE | 0 | 0 | | | | | |
| ... | | AAL2' to/from NODE | 0 | 0 | | | | | |
| 256 | 295 | AAL2' to/from NODE | 0 | 0 | | | | | |
| 8 | 296 | AAL2' to/from NODE | 0 | 1 | | | | | |
| 9 | | AAL2' to/from NODE | 0 | 1 | | | | | |
| ... | | | 0 | | | | | | |
| 256 | 547 | AAL2' to/from NODE | 0 | 1 | | | | | |
| 8 | 1784 | AAL2' to/from NODE | 1 | 3 | | | | | |
| 9 | | AAL2' to/from NODE | 1 | 3 | | | | | |
| ... | | | | | | | | | |
| 256 | 2031 | AAL2' to/from NODE | 1 | 3 | | | | | |

COMBINED TABLE LOOK-UP
PROCEDURE FOR DEMULTIPLEXING

COMBINED TABLE LOOK-UP
PROCEDURE FOR MULTIPLEXING

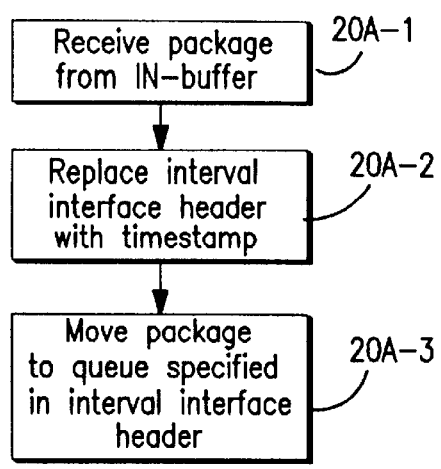
FIG. 20A
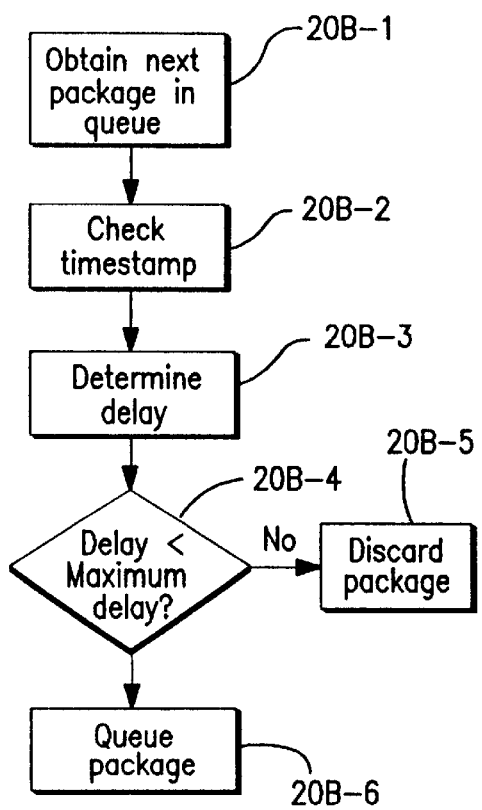
FIG. 20B
FIG. 20C
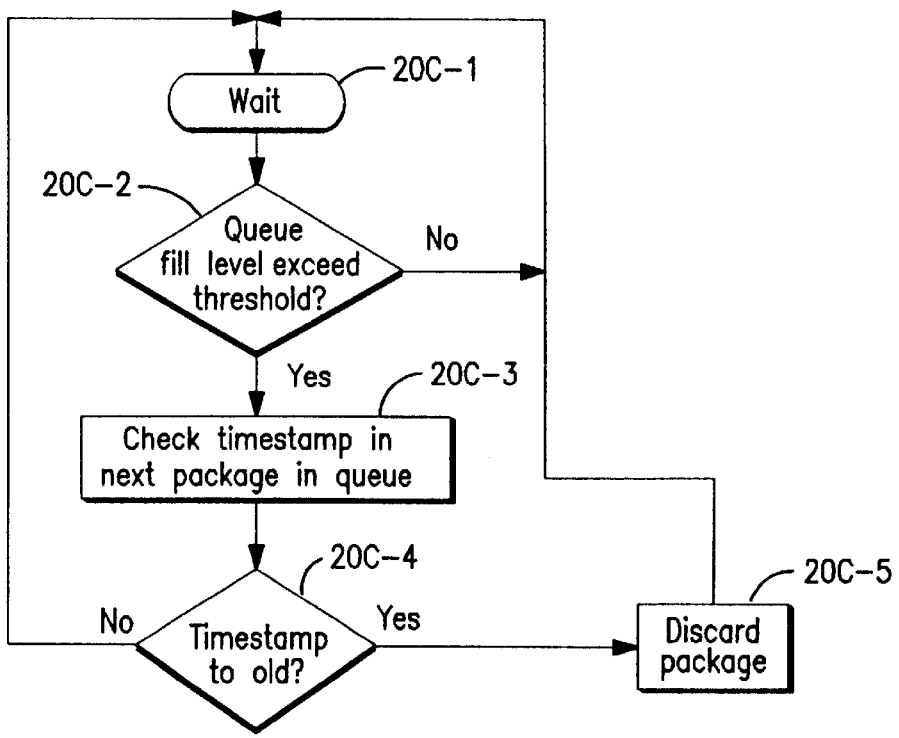

LINK RATE
COUNTER FUNCTION

LINK RATE COUNTER TABLE

| LINK | CHU # | DSP # | LINK MUX # | TIMING CHARACTERISTIC |
|------|-------|-------|------------|----------------------|
| 56   | 44-32 | 1     | 1          | 1.5                  |

COMBINED HEADER PARAMETER TABLE FOR ATM NODE

This application claims the benefit of United States Provisional Patent Application Serial No. 60/071,063 entitled "Asynchronous Transfer Mode System", filed Dec. 19, 1997, which is incorporated herein by reference, and is related to the following simultaneously filed United States Patent Applications, all of which are incorporated herein by reference:

U.S. patent application Ser. No. 09/188,102, entitled "ASYNCHRONOUS TRANSFER MODE SYSTEM HANDLING DIFFERING AAL PROTOCOLS".

U.S. patent application Ser. No. 09/188,347, entitled "CENTRALIZED QUEUING FOR ATM NODE".

U.S. patent application Ser. No. 09/188,340, entitled "CELL HANDLING UNIT FOR ATM NODE".

U.S. patent application Ser. No. 09/188,097, entitled "ATM TIME STAMPED QUEUING".

U.S. patent application Ser. No. 09/188,344, entitled "COORDINATED CELL DISCHARGE FROM ATM QUEUE".

BACKGROUND

1. Field of the Invention

The present invention pertains to communications systems, and particularly to communications systems which employ ATM technology.

2. Related Art and other Considerations

Asynchronous Transfer Mode (ATM) is becoming increasingly used in communication networks. ATM is a packet-oriented transfer mode which uses asynchronous time division multiplexing techniques. Packets are called cells and have a fixed size.

As shown in FIG. 1, an ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

Between termination points of an ATM network a plurality of nodes are typically situated, such as switching nodes having ports which are connected together by physical transmission paths or links. The switching nodes each typically have several functional parts, a primary of which is a switch core. The switch core essentially internal to the switch core are selectively controlled so that particular ports of the switch are connected together to allow a cells ultimately to travel from an ingress side of the switch to an egress side of the switch.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of tile ATM layer by mapping the higher-layer protocol data units (PDU) into the information field of the ATM cell and vise versa. There are several differing AAL types or categories, including AAL0, AAL1, AAL2, AAL3/4, and AAL5.

AAL2 is a standard defined by ITU recommendation I.363.2. An AAL2 packet is shown in FIG. 2 as comprising a three octet packet header, as well as a packet payload, The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets FIG. 3 shows how plural AAL2 packets can be inserted into a standard ATM cell. In particular, FIG. 3 shows a first ATM cell $20_1$ and a second ATM cell $20_2$. Each ATM cell 20 has a header 22 (e.g., cell $20_1$ has header $22_1$ and cell $20_2$ has header $22_2$). The payload of the ATM cells 20 begin with a start field 24 (e.g., cell $20_1$ has start field $24_1$ and cell $20_2$ has start field $24_2$). After each start field 24, the ATM cell payload contains AAL2 packets. For example, the payload of ATM cell $20_1$ contains AAL2 packets $26_1$ and $26_2$ in their entirety, as well as a portion of AAL2 packet $26_3$. The payload of c ell $20_2$ contains the rest of AAL2 packet $26_3$, and AAL2 packets $26_4$ and $26_5$ in their entirety. In addition, the payload of cell $20_2$ has padding 28.

The start field 24, shown in FIG. 3A, facilitates one AAL2 packet bridging two ATM cells. Start field 24 includes a six bit offset field (OSF), a one bit sequence number (SN), and one parity bit (P). The six bit offset field (OSF) contains a value, represented by offset displacement 29 in FIG. 3, indicative of the octet in the payload whereat the first full AAL2 packet begins. For ATM cell $22_1$, the value of the offset field (OSF) is one, since AAL2 packet starts just after start field $24_1$. For ATM cell $22_2$, the value of the offset field (OSF) is the sum of one (in view of start field $24_1$) and the number of octets of AAL2 packet $26_3$ protruding into cell $22_2$.

AAL2 advantageously allows multiplexing of data from many users within a single ATM VCC. In such multiplexing scheme, each user's data is carried in a separate AAL2 packet, but AAL2 packets of differing users are carried in the same ATM cells or cells borne on the same ATM VC. Thus, assuming each user has a different channel identifier (CID) value, as many as 248 user channels can be multiplexed onto one ATM VC. AAL2 thus allows more efficient utilization of low speed links than standard ATM while still maintaining low delay properties.

A problem with using AAL2 arises when terminating AAL2 channels at different nodes or different addresses in the same node. Since the individual AAL2 channels may be multiplexed into one ATM-VCC, it is not possible to direct the individual AAL2 channels (e.g., the AAL2 packets on which the channel data is carried) to different destinations using conventional ATM switches.

One approach for switching AAL2 packets is set forth by Mauger and Rosenberg, "QoS Guarantees for Multimedia Services on TDMA-Based Satellite Network", IEEE Communications Magazine July 1997). In that approach, fixed-cell ATM switches work in conjunction with separate variable-cell ATM switches for handling AAL2 packets.

SUMMARY OF THE INVENTION

Within an ATM node, a cell handling unit (CHU) receives incoming ATM cells from an ATM switch and provides outgoing ATM cells back to the ATM switch. Some of the incoming ATM cells can be of a first type AAL protocol (AAL2 protocol), while others of the incoming ATM cells are of a second type AAL protocol. The cell handling unit includes a demultiplexer function which demultiplexes an ATM cell with AAL2 protocol into outgoing ATM cells of the second type AAL protocol; as well as a multiplexer function which multiplexes ATM cells of the second type AAL protocol into an outgoing ATM cell with AAL2 protocol. In generating an outgoing ATM cell, a new ATM parameter (e.g., new VCI value) must be generated for the cell header.

The present invention provides a combined or consolidated table from which ATM parameters for use in headers of outgoing ATM cells can be determined. The table is consolidated in the sense that the table is structured and formatted so that it can be utilized for both incoming ATM cells with AAL2 protocol and ATM cells of the second type AAL protocol. The second type AAL protocol is preferably AAL2 prime, which requires that AAL2 packets carried in the ATM cell payload be whole packets and that the ATM payload not have an AAL2-type start field.

The combined table is structured to have plural intervals, including a first interval for AAL2 protocol connections and plural other intervals for the second type AAL protocol connections. Each interval is a set of rows, the rows also being referred to as subintervals. Each row for the AAL2 protocol interval (i.e., the first interval) is associated with (1) a unique incoming VCI value for its corresponding AAL2 protocol AAL connection, (2) an output link value; (3) an outgoing VCI value; and (4) an offset value. The offset value points to the one of the plural intervals for the second AAL type connection.

The combined table further has subintervals or rows for each of the plural intervals for the second AAL type connections. Each of the rows for the second AAL type connections has (1) an incoming VCI value; (2) a channel identifier (CID) for a particular one of the AAL2 connections; (3) an output link value; and (4) an ATM parameter for use in an ATM header of an outgoing ATM cell.

In a multiplexing operation, an incoming VCI value and incoming channel identifier (CID) value are ascertained from an incoming ATM cell having an AAL2 protocol. The incoming VCI value is used to locate an appropriate row in the AAL2 interval or portion of the table. From the appropriate AAL2 row an appropriate offset value is obtained. The appropriate offset value is then used to locate an appropriate one of the plural intervals for second type AAL protocol connections. Within the appropriate second AAL type protocol interval, an appropriate row of the interval is located by matching the incoming CID value with the CID values of the rows of the interval. From the thusly-determined appropriate row, an ATM parameter (e.g., outgoing VCI value) is obtained for use in an ATM header of the outgoing ATM cell.

In a demultiplexing operation, an incoming VCI value is ascertained from an incoming ATM cell. The plural intervals for the second type AAL protocol connections are searched to find and an appropriate row thereof which has its associated incoming VCI value matching the incoming VCI value of the incoming ATM cell. From the appropriate row an appropriate output link value is obtained. Then, the AAL2 interval of the table is searched to find an appropriate row thereof having an associated output link value which matches the appropriate output link value obtained from the appropriate row of the appropriate second type AAL protocol interval. From the appropriate row of the AAL2 portion of the table is obtained the associated ATM parameter (e.g., VCI value) for use in the header of the outgoing ATM cell.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6A is a diagrammatic view showing employment of an AAL2 prime protocol according to a first protocol mode of the invention.

FIG. 6B is a diagrammatic view showing employment of an AAL2 prime protocol according to a second protocol mode of the invention.

FIG. 8 is a diagrammatic view showing AAL2 link termination in context of layers and is keyed to components of the network of FIG. 5.

FIG. 13B is a flowchart showing general steps performed by a cell router of the cell handling unit of FIG. 11 in connection with an ATM Demultiplexing function.

FIG. 13C is a flowchart showing general steps performed by a cell router of the cell handling unit of FIG. 11 in connection with an AAL2' mapping function.

FIG. 13D is a flowchart showing general steps performed by a cell router of the cell handling unit of FIG. 11 in connection with an ATM mapping function.

FIG. 15A is a diagrammatic view of an example ATM unload table.

FIG. 15B is a diagrammatic view of an example AAL2 unload table.

FIG. 18 is a diagrammatic view of a combined VCI/CID table according to an embodiment of the invention.

FIG. 20A is a flowchart showing basic steps for moving an ATM package into a queue with timestamping.

FIG. 20B is a flowchart showing basic steps for dequing an ATM package from a queue with timestamping.

FIG. 20C is a flowchart showing basic steps for monitoring queue fill using timestamping.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

NETWORK OVERVIEW

Figure 5:
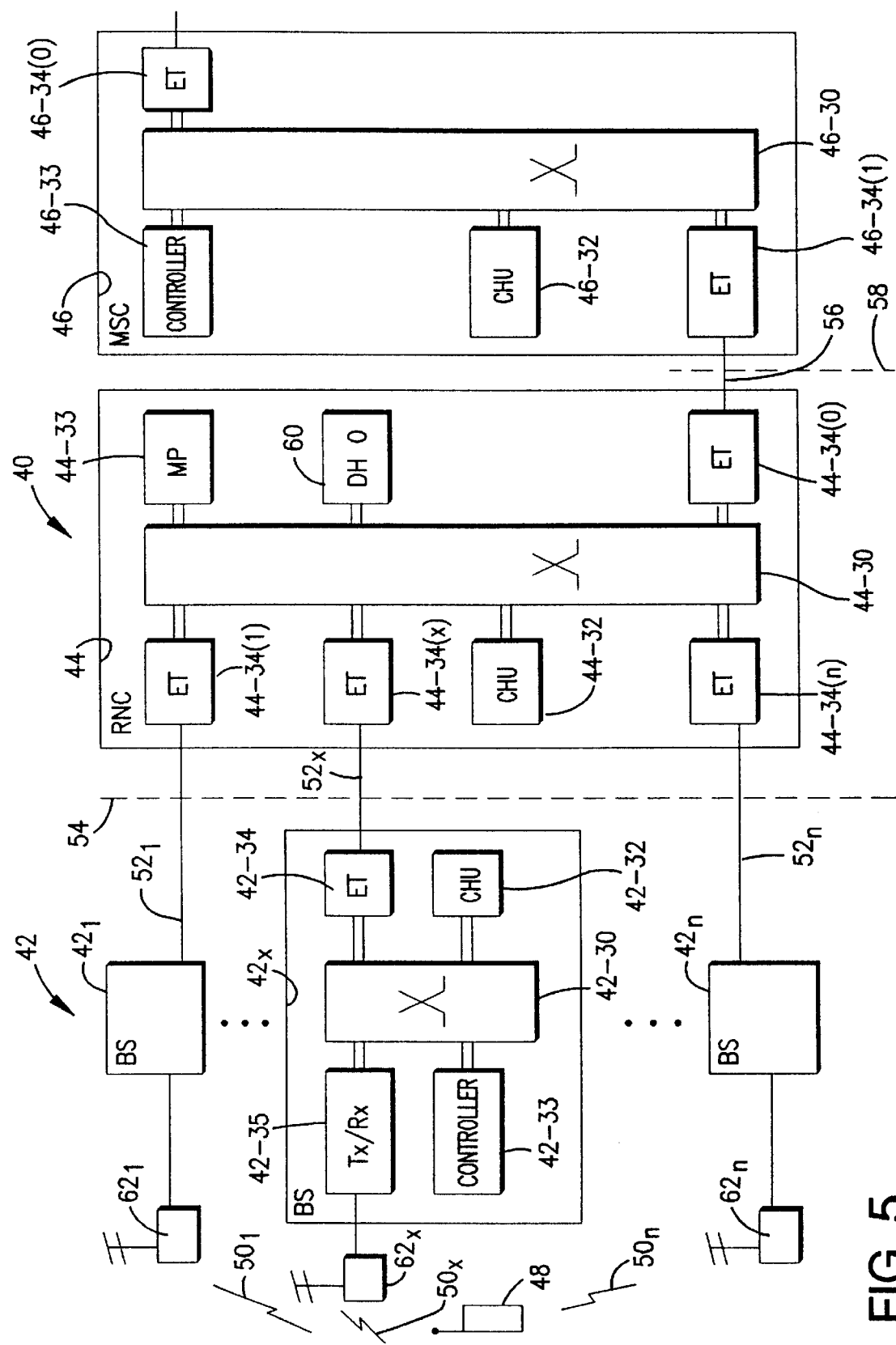
FIG. 5 is a schematic view of a communications network according to an embodiment of the invention.

FIG. 5 shows a communications network 40 which comprises a set 42 of nodes $42_1$ through $42_n$ (including node $42_x$), node 44; and node 46. Preferably network 40 has a hierarchical structure, the nodes $42_1$ through $42_n$ of set 42 being lower order nodes, node 44 being an intermediate node, and node 46 being a higher order node, e.g., node 46 is superior to node 44. In one example, network 40 takes the form of a mobile telecommunications network wherein nodes $42_1$ through $42_n$ are base stations (BS), node 44 is a base station controller node, and node 46 is a mobile switching center. Consistent with this example, hereafter reference is made to base stations $42_1$ through $42_n$; base station controller 44; and mobile switching center (MSC) 46. Base station controller (BSC) 44 is sometimes referred to in the art as a mobile control center (MCC) or a radio network controller (RNC). Hereafter, when only one base station is referenced as an example or to be generic, the non-subscripted numeral 42 is employed.

In network 40, a mobile station 48 (such as mobile telephone, for example) communicates over the air interface (represented by symbols $50_1$ through $50_n$, respectively) with the base stations $42_1$ through $42_n$. Base stations $42_1$ through $42_n$ are connected by landlines $52_1$ through $52_n$ to base station controller node 44. An interface known as the "super-A" interface exists between base stations $42_1$ through $42_n$ and base station controller 44 as depicted by broken line 54. Base station controller 44 is connected by landline 56 to mobile switching center (MSC) 46. An interface known as the "A" interface exists between base station controller 44 and mobile switching center (MSC) 46 as depicted by broken line 58. Mobile switching center (MSC) 46 is usually connected, e.g., via a gateway, to other telecommunication networks, such as the public switched telephone network.

The example illustrated network 40 is included in a code division multiple access (CDMA) mobile telecommunications system. In a CDMA system, the information transmitted between each base station $42_1$ through $42_n$ and mobile station 48 is modulated by a different mathematical code (such as a spreading code) to distinguish it from information for other mobile stations which are utilizing the same radio frequency. Thus, in CDMA, the individual radio links are discriminated on the basis of codes. Various aspects of CDMA are set forth in Garg, Vijay K. et al., *Applications of CDMA in Wireless/Personal Communications*, Prentice Hall (1997).

In addition, in CDMA mobile communications, typically the same baseband signal with suitable spreading is sent from several base stations (e.g., base stations $42_1$ through $42_n$) with overlapping coverage. Mobile terminal 48 can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high. This utilization of radio channels from multiple base stations by a mobile station in a CDMA scheme is termed "soft handover."

In a connection with soft handover concerning mobile station 48, frames with the same user data are sent from different base stations $42_1$ through $42_n$ simultaneously on the downlink to the mobile station 48. On the uplink, user data sent in frames from mobile station 48 for the mobile connection is received in multiple base stations $42_1$ through $42_n$, and at base station controller 44 the frames are combined/selected using a "best quality" technique employed at a diversity handover unit (DHO). Additional details of diversity and soft handover are provided e.g., by U.S. patent application Ser. No. (attorney docket 2380-3) filed Nov. 26, 1997, entitled "Multistage Diversity Handling for CDMA Mobile Telecommunications", and U.S. patent application Ser. No. (attorney docket 2380-4) filed Nov. 26, 1997, entitled "Diversity Handling Moveover for CDMA Mobile Telecommunications", both of which are incorporated herein by reference.

Thus, it should be understood that each base station 42 is simultaneously serving plural mobile stations, and that each mobile station is served simultaneously by plural base stations. For each mobile station, such as mobile station 48, at least one connection is set up between the mobile station through mobile switching center (MSC) 46 to another party. The connection with mobile station 48 thus has parallel legs handled by each base station participating in the connection (e.g., the $x^{th}$ of the parallel legs being over the air interface as denoted by symbol $50_x$ and over landline $52_x$), with the connection also extending through base station controller 44 and over landline 46 to mobile switching center (MSC) 46.

Figure 1:
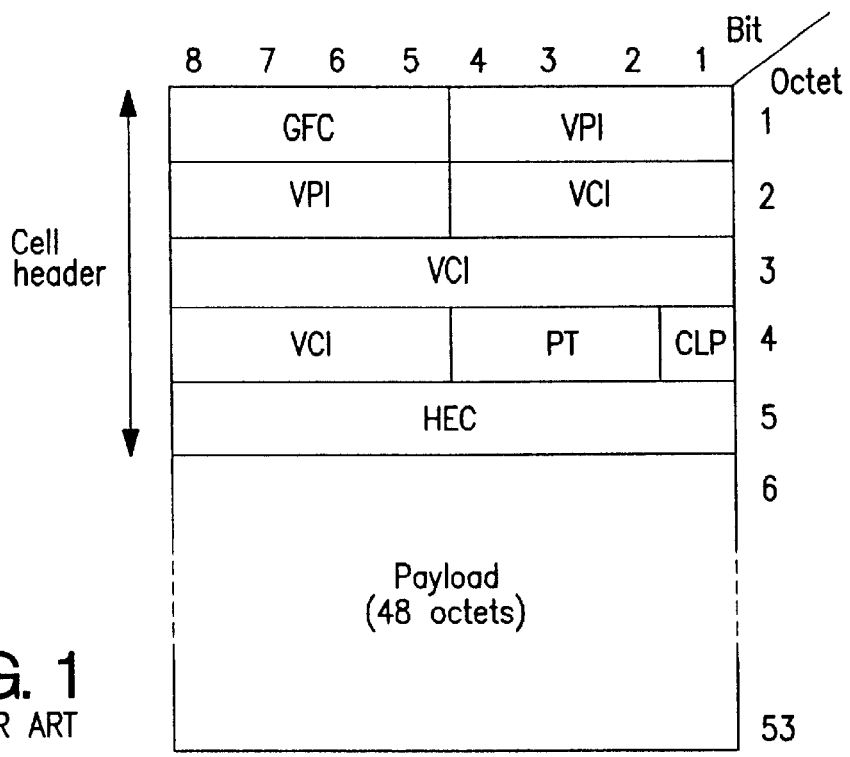
FIG. 1 is a diagrammatic view showing the format of an ATM cell.
Figure 2:
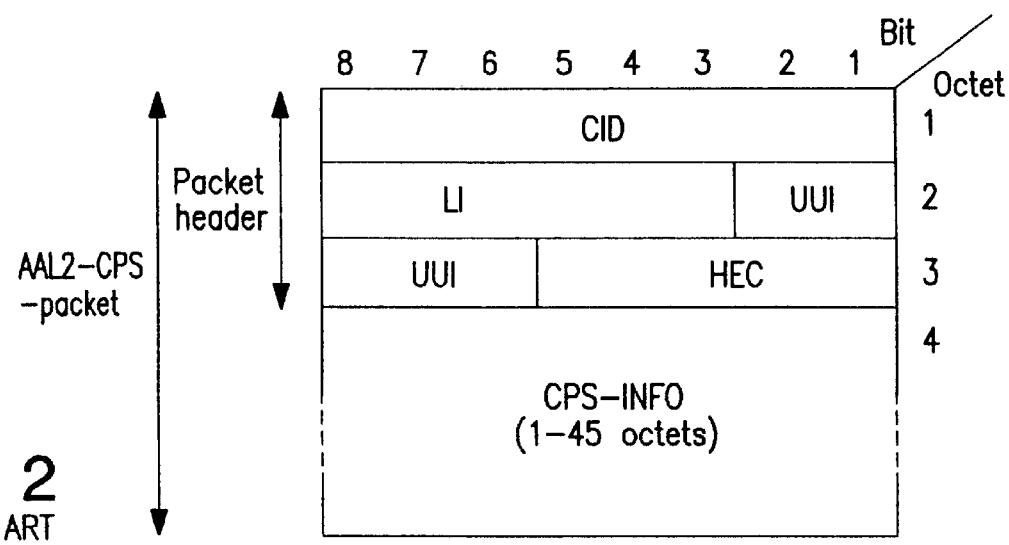
FIG. 2 is a diagrammatic view showing the format of an AAL2 packet.
Figure 3:
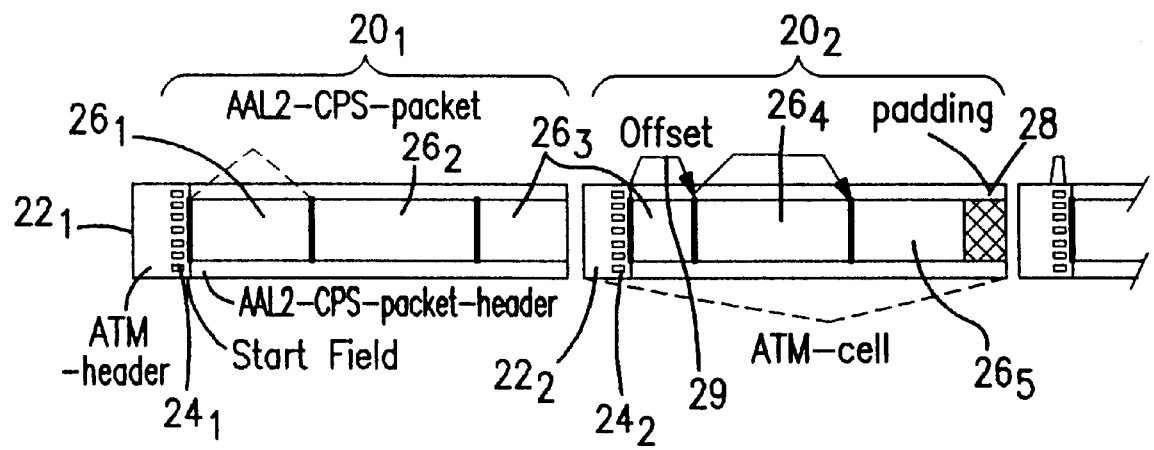
FIG. 3 is a diagrammatic view showing plural AAL2 packets in ATM cells.

Each connection is assigned a channel on the link 52 connecting each base station 42 and base station controller 44. In the illustrated embodiment, the information for each connection is transmitted as frames, with the frames being carried on a channel assigned to the connection. Moreover, in the illustrated embodiment AAL2 is employed, so that each frame of a connection is carried in an AAL2 packet in the channel assigned to the connection. In view of the CID field of the AAL2 packet as shown in FIG. 2, there can thus be 248 connections multiplexed onto each link 52 over the super-A interface 54. This means that AAL2 packets for differing channels can be carried in the same ATM cell in the manner depicted in FIG. 3.

Thus, in the illustrated embodiment, base stations 42, base station controller 44, and mobile switching center (MSC) 46 are each ATM-based nodes. As such, each of these nodes has an ATM switch generically represented by reference numeral 30. For example, base station 42 has an ATM switch 42-30, base station controller 44 has an ATM switch 44-30, and mobile switching center (MSC) 46 has an ATM switch 46-30.

Base station controller 44 has a diversity handover unit 60 which performs the diversity and soft handover operations above described. For example, in a selection/combining operation, diversity handover unit 60 compares like frames of user data received on the parallel legs of the connection between mobile station 48 and base station controller 44, and based on the comparison chooses frames (e.g., a best frame of frames on differing legs with the same user data) for forwarding to mobile switching center (MSC) 46. The frames are received at base station controller 44 in AAL2 packets which share an ATM cell with AAL2 packets of other connections (e.g., channels). But diversity handover unit 60 cannot handle cells having AAL2 packets for multiple connections. Thus, a problem is presented in that ATM cells with AAL2 packets cannot be directly routed through ATM switch 44-30 to diversity handover unit 60. Conversely, in a splitting operation, frames received from mobile switching center (MSC) 46 are copied by diversity handover unit 60 for parallel distribution to each base station 42 having a leg of the connection to mobile station 48. But since the frames transmitted on links 52 to the base stations 42 are carried in AAL2 packets, and the AAL2 packets for potentially differing connections are encapsulated with the same ATM cells, a problem exists in that the copies of the frames cannot be directly routed through ATM switch 44-30 to the respective base stations 42.

The foregoing problems are solved by provision of cell handling units (CHU) 32. In the illustrated embodiment, each node 42, 44, and 46 has a cell handling unit 32, e.g., each base station 42 has cell handling unit 42-32; base station controller 44 has cell handling unit 44-32; and mobile switching center (MSC) 46 has cell handling unit 46-32. Hereafter, generic reference to a cell handling unit 32 is to be understood as being applicable to any one of the cell handling units 42-32, 44-32, or 46-32. The cell handling units 32 are described in greater detail in connection with subsequently described drawings, such as FIG. 15 and FIG. 16, for example.

AAL2 PRIME PROTOCOL

Figure 3A:
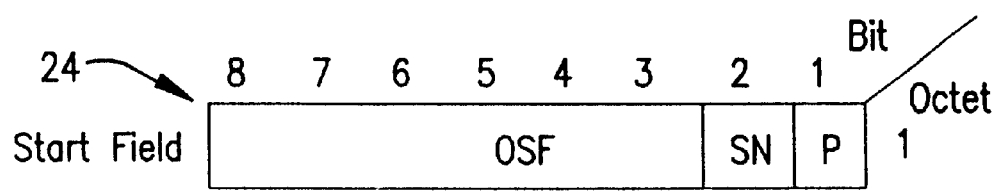
FIG. 3A is a diagrammatic view showing the format of a start field of an AAL2 packet.

As described in more detail hereinafter, cell handling unit 32 performs, among other things, both demultiplexing and mulitplexing operations. In the demultiplexing operation, cell handling unit 32 uses ATM cells having the AAL2 packets to form ATM cells having a different type AAL protocol. In particular, the different type AAL protocol is a modified AAL2 protocol, referenced herein as AAL2 prime. In the AAL2 prime protocol, the payloads of ATM cells have AAL2 packets belonging to the same channel, all the AAL2 packets in the payload being whole packets, with the payload not having the start field described with reference to FIG. 3 and FIG. 3A. In the multiplexing operation, ATM cells having AAL2 packets are prepared, e.g., from ATM cells having the different type AAL protocol (e.g., the AAL2 prime protocol).

FIG. 6A shows employment of the AAL2 prime protocol according to a first protocol mode of the invention. FIG. 6A shows an ATM cell 120A which has a five octet header 122 and a forty eight octet payload 123A. Payload 123A of cell 120A contains only one AAL2 packet, particularly packet 126. AAL2 packet 126 is an entire AAL2 packet. Payload 123A does not contain a start field. Remaining octets of payload 123A not utilized by AAL2 packet 126 contain padding 128. No partial AAL2 packets are included in payload 123A of ATM cell 120A.

FIG. 6B shows employment of the AAL2 prime protocol according to a second protocol mode of the invention. FIG. 6B shows an ATM cell 120B which also has a five octet header 122 and a forty eight octet payload 123B. Payload 123B of cell 120B contains more than one AAL2 packet, particularly packets 126B(1) and 126B(2). AAL2 packets 126B(1) and 126B(2) are entire AAL2 packets. As in the first protocol mode of FIG. 6A, payload 123B does not contain a start field or a partial AAL2 packet. Remaining octets of payload 123B not utilized by AAL2 packet 126 contain padding 128. Therefore, the protocol mode of FIG. 6B differs from the protocol mode of FIG. 6A in that, in the mode of FIG. 6B, plural entire AAL2 packets can be encapsulated into an ATM cell having the AAL2 prime protocol.

Figure 4:
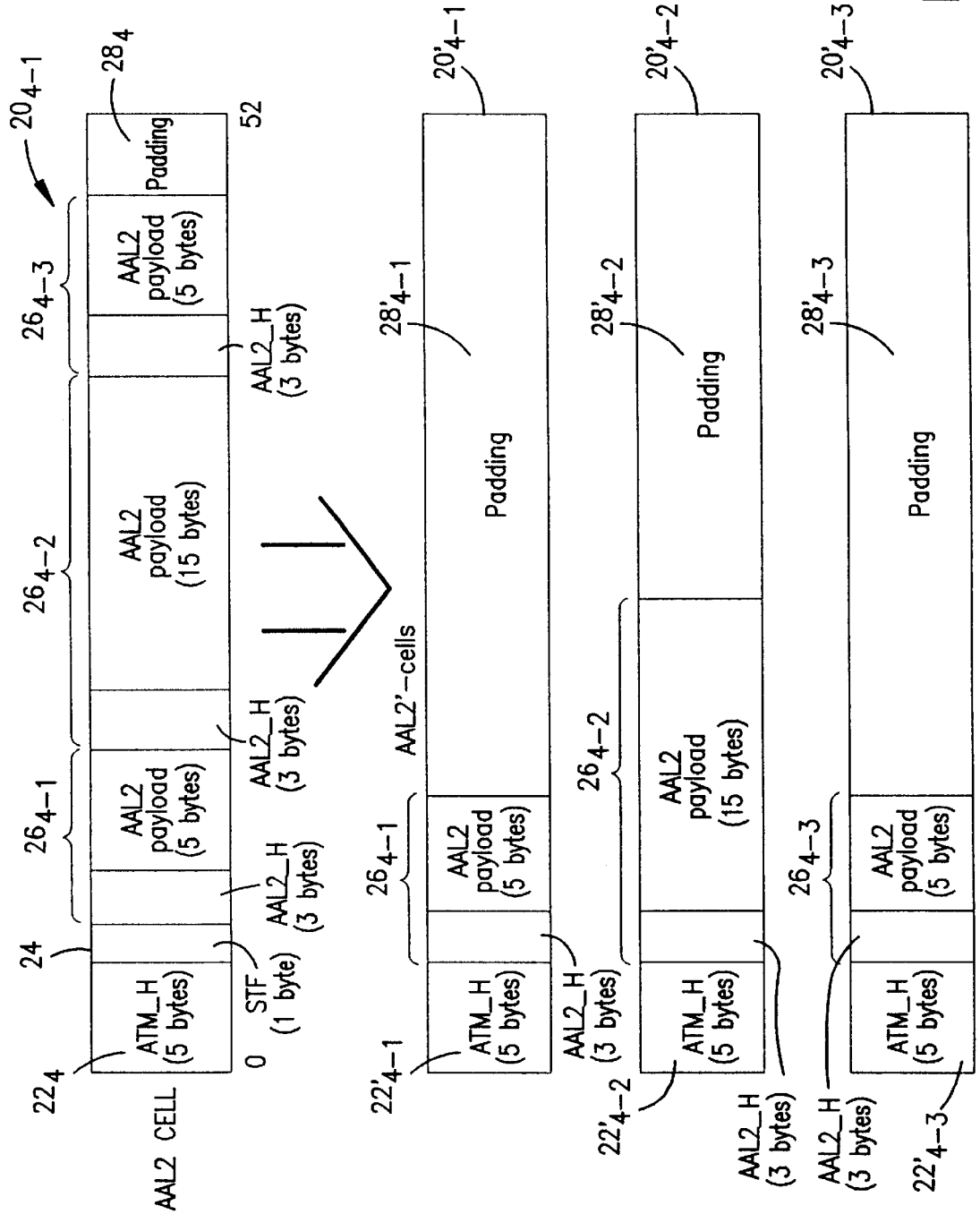
FIG. 4 is a diagrammatic view showing showing demuliplexing of an ATM cell having AAL2 protocol into an ATM cell having AAL2 prime protocol.

FIG. 4 shows how an ATM cell with AAL2 (i.e., cell $20_{4\text{-}1}$) is demultiplexed into ATM cells with AAL2' protocol (i.e., cells $20'_{4\text{-}1}$, $20'_{4\text{-}2}$, and $20'_{4\text{-}3}$). ATM cell $20'_{4\text{-}1}$ has header $22_4$ and a payload that consists of Start Field 24, AAL2 packets $26_{4\text{-}1}$ through $26_{4\text{-}3}$, and padding $28_4$. The CID field (see FIG. 2) of the ATM cell with AAL2 protocol designates specific VCC on the node internal connections. In accordance with the mode of the AAL2 prime protocol above discussed with reference to FIG. 6A, upon demultiplexing each of the AAL2 packets $26_{4\text{-}1}$ through $26_{4\text{-}3}$ resides in a separate ATM cell having the AAL2 prime protocol, i.e., cells $20_{4\text{-}1}$, $20'_{4\text{-}2}$, and $20_{4\text{-}3}$. The ATM AAL2 prime protocol cells $20_{4\text{-}1}$, $20'_{4\text{-}2}$, and $20_{4\text{-}3}$ have respective headers $22'_{4\text{-}1}$, $22'_{4\text{-}2}$, and $22'_{4\text{-}3}$, which are followed by the respective AAL2 packets $26_{4\text{-}1}$ through $26_{4\text{-}3}$, with each cell being concluded with padding fields $28'_{4\text{-}1}$ through $28'_{4\text{-}3}$. The demultiplexing of the present invention is subsequently described in more detail, e.g., in connection with the cell handling unit of the present invention.

BASE STATION STRUCTURE

Reference is again made to FIG. 5 for a more detailed discussion of the structure of the nodes of network 40. One of the base stations 42 is illustrated in FIG. 5, particularly base station $42_x$, which generically represents other base stations and, as such, is representatively referred to merely as base station 42. In addition to its ATM switch 42-30 and cell handling unit 42-32, base station 42 has a controller 42-33; plural extension terminals (only one of which, extension terminal 42-34, is illustrated); and plural transmitter/receiver boards (only one of which, particularly transmitter/receiver board 42-35, is shown). In actuality, each of the devices 42-33 through 42-35, as well as cell handling unit 42-32, resides on respective circuit boards which are connected to ports of ATM switch 42-30. An extension terminal 42-34 is implemented for each landline connection of base station 42 to another node of network 40. Each transmitter/receiver board 42-35 is connected between ATM switch 42-30 and an antenna broadcasting/reception site, such as site 62 shown for each base station 42. Each of the potential plural transmitter/receiver boards can be linked to a separate corresponding antenna broadcasting/reception site.

The structure of one example base station 42 has been shown in simplified form but in a manner sufficient to illustrate principles of the invention. It should be understood that other base stations have similar constituent boards, although the number of such boards (e.g., extension terminals and transmitter/receiver boards) may vary from base station to base station. The number of base stations employed in network 40 is not critical to the present invention.

BASE STATION CONTROLLER STRUCTURE

As indicated above, base station controller 44 has ATM switch 44-30, cell handling unit 44-32, and diversity handover (DHO) unit 60. In addition, base station controller 44 likewise has plural extension terminals, shown as extension terminals 44-34(0) through 44-34(n) in FIG. 5. Extension terminal 44-34(0) is connected between ATM switch 44-30 and link 56 leading to mobile switching center (MSC) 46. Extension terminals 44-34(1) through 44-34(n) are connected between ATM switch 44-30 and links $52_1$–$52_n$, respectively, with the links $52_1$–$52_n$ leading to base stations $42_1$ through $42_n$, respectively. In addition, base station controller 44 has a main processor board 44-33 upon which a main processor for base station controller 44 resides. Each of ATM switch 44-30, cell handling unit 44-32, diversity handover (DHO) unit 60, extension terminals 44-34(0) through 44-34(n), and main processor 44-33 reside on respective boards which are connected to corresponding ports of ATM switch 44-30.

MOBILE SWITCHING CENTER STRUCTURE

Mobile switching center (MSC) 46 similarly has boards connected to its ATM switch 46-30, including boards for extension terminals 46-34(0) and 46-34(1); for cell handling unit 46-32; and for controller 46-33. In the illustrated embodiment, extension terminal 46-34(0) connects mobile switching center (MSC) 46 to a gateway node, whereas extension terminal 46-34(1) connects mobile switching center (MSC) 46 to link 56 leading to base station controller 44. It should be understood that mobile switching center (MSC) 46 likely is connected to many other base stations in addition to base station controller 44, and that for each such connection a corresponding extension terminal would be supplied. Similarly, it should be understood that mobile switching center (MSC) 46 is likely connected to other mobile switching centers, and that for such connections corresponding extension terminals would also be supplied.

AAL2 TERMINATION

As used herein, an AAL2 link is synonymous with an AAL2 channel. The cell handling units 32 of the present invention make it possible to terminate the AAL2 link and also make use of a conventional ATM switch. For this reason, the cell handling unit 32 is also referred to as an AAL2 link termination unit, or ALT unit for short.

As described above, the cell handling unit 32 terminates a multitude of ATM-VCC carrying AAL2 channels. The cell handling unit 32 converts each AAL2 channel to an AAL2 prime channel. The AAL2 prime protocol makes it possible to carry each individual AAL2 channel in an ATM-VCC inside the conventional ATM switch. That is, the cell handling unit 32 facilitates distribution of the individual AAL2 connections by means of standard ATM switch equipment.

Figure 7A:
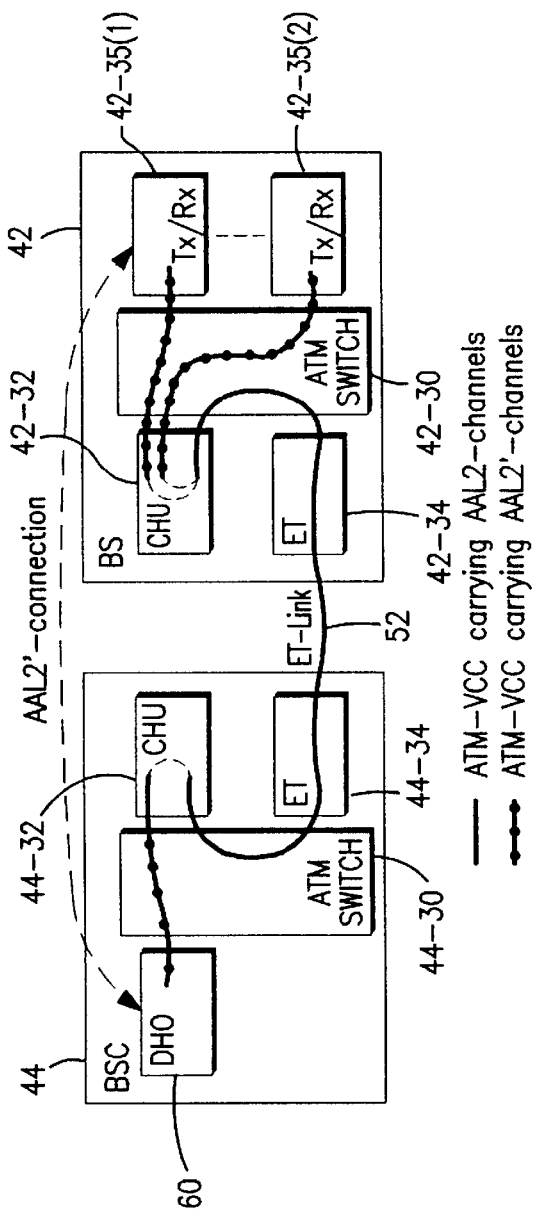
FIG. 7A is a schematic view showing portions of the network of FIG. 5 and particularly illustrating multiplexing of many AAL2 prime connections onto a single ATM-VCC.

FIG. 7A shows a distributed system and how many AAL2 prime connections are multiplexed on a single ATM-VCC by the cell handling unit 32. FIG. 7A particularly shows that base station 42 has two transmitter/receiver boards 42-35(1) and 42-35(2). Between transmitter/receiver board 42-35(1) and diversity handover (DHO) unit 60 a bidirectional AAL2 prime connection is established, as indicated by the broken line in FIG. 7A. The bidirectional AAL2 prime connection uses a physical path which involves the following components: diversity handover (DHO) unit 60, cell handling unit 44-32, extension terminal 44-34, link 52, extension terminal 42-34, cell handling unit 42-32, ATM switch 42-30, and transmitter/receiver board 42-35(1). In cell handling unit 42-32 of base station $42_t$ several AAL2 prime channels, each on an individual ATM-VCC, are multiplexed into one ATM-VCC utilizing the standard AAL2 protocol. In cell handling unit 44-32 of base station controller 44, the ATM cells carrying the AAL2 packets have their payloads demultiplexed so that ATM cells carrying payloads having the AAL2 prime protocol are routed to diversity handover (DHO) unit 60.

Figure 7B:
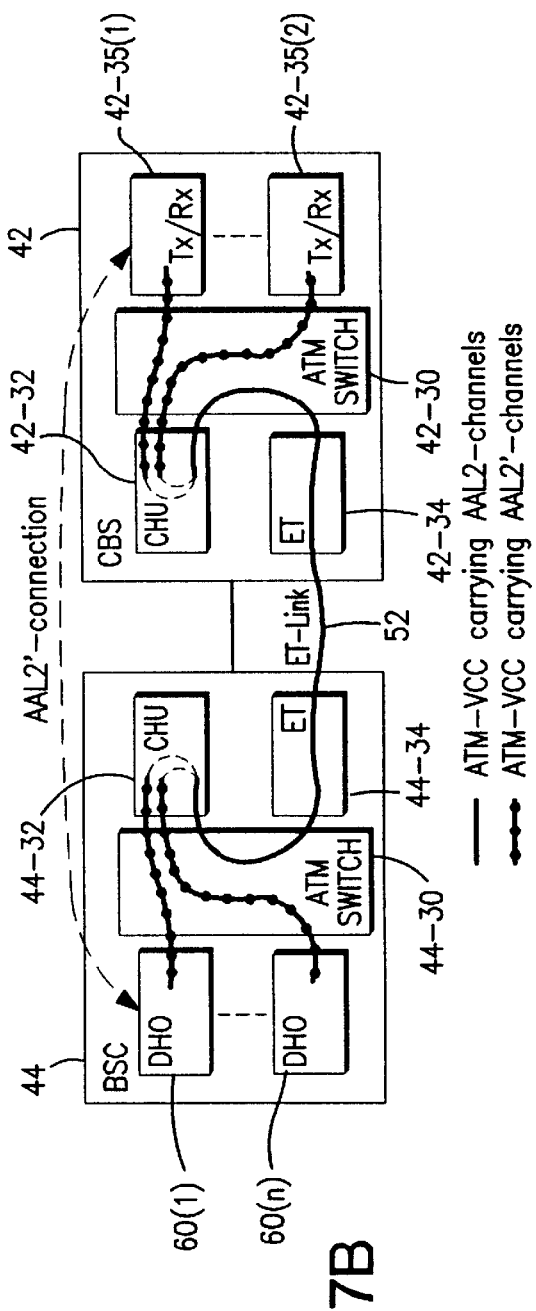
FIG. 7B is a schematic view showing portions of a modification of the network of FIG. 5 wherein the base station controller has plural diversity handover units, also particularly illustrating multiplexing of many AAL2 prime connections onto a single ATM-VCC.

FIG. 7B shows a variation of FIG. 7A wherein base station controller 44 employs plural diversity handover (DHO) units 60(1) through 60(n). In the variation of FIG. 7B, diversity handover (DHO) unit 60(1) is assigned to handle some connections, with another diversity handover (DHO) unit being assigned to handle other connections.

FIG. 8 shows AAL2 link termination in context of a layer diagram and keyed to components of network 40 as illustrated in FIG. 5. In FIG. 8, the LI layer represents the spatial switching of ATM cells in the ATM switches 30 of network 40. The two concatenated ATM-VCL links on each side of extension terminal 42-34 represent the ATM-VCC carrying AAL2. Extension terminal 42-34 performs concatenation by changing the VCI field in the ATM header according to a translation table that is defined at establishment of the ATM-VCC in accordance with prior art techniques.

As shown in FIG. 8, an AAL2 prime connection is an end-to-end network connection carried on an AAL2 channel between the nodes and on an AAL2 prime channel within the node. In other words, an AAL2 prime connection is carried end-to-end between devices internally in a node on an AAL2 prime channel and between nodes on an AAL2 channel or in the AAL2 prime format in an ATM-VCC when no multiplexing is performed.

In cell handling unit 44-32 of base station controller 44 the ATM-VCC is terminated at the ATM layer. In cell handling unit 44-32 each AAL2 channel is mapped to its specific AAL2 prime channel. Each AAL2 prime channel is then mapped to its ATM-VCC that takes the AAL2 prime connection to its final destination.

Figure 9:
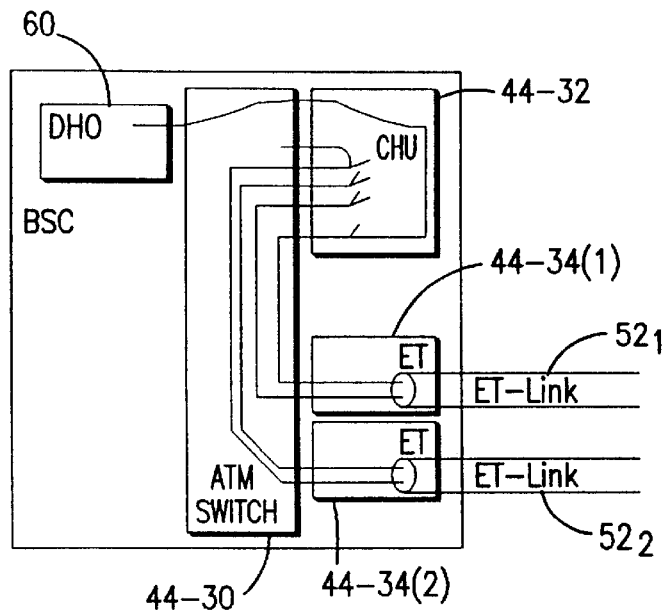
FIG. 9 is a schematic view of a portion of the network of FIG. 5, and particularly showing multiplexing of a number of ATM-VCC.
Figure 9A:
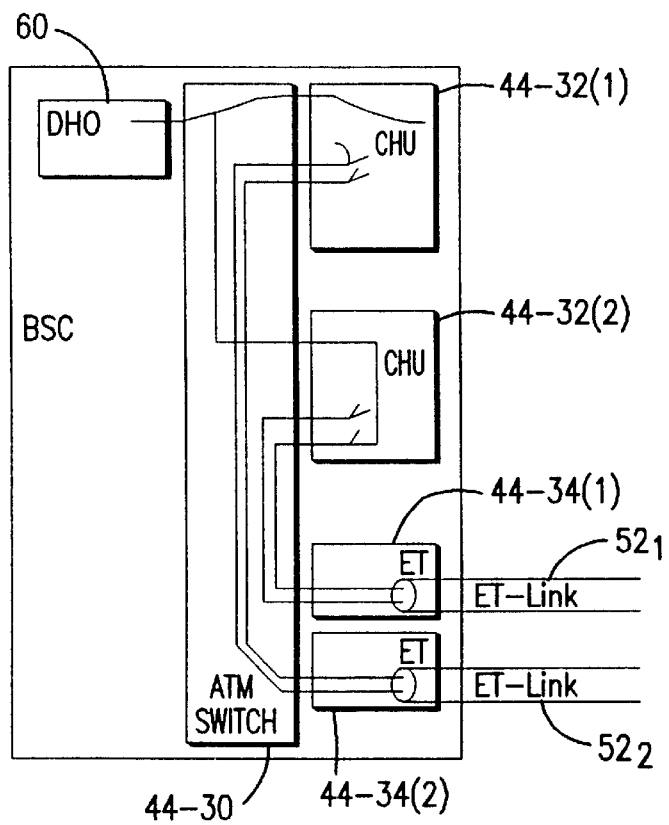
FIG. 9A is a schematic view of a portion of a modification of the network of FIG. 5 wherein two cell handling units are provided, and particularly showing multiplexing of a number of ATM-VCC.
Figure 9B:
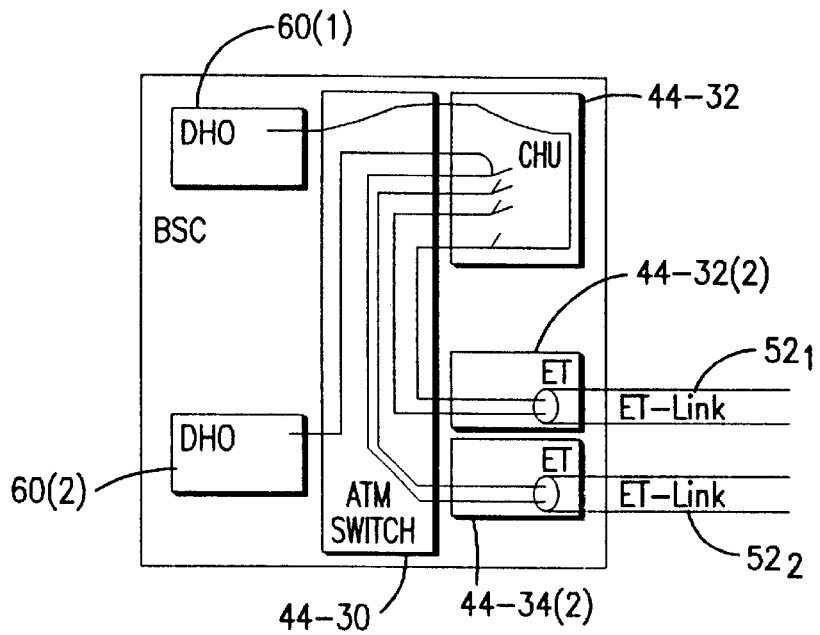
FIG. 9B is a schematic view of a portion of a modification of the network of FIG. 5 wherein two diversity handover (DHO) units are provided, and particularly showing multiplexing of a number of ATM-VCC.

FIG. 9 thus shows that a number of ATM-VCC are multiplexed onto one extension terminal (ET) link, each carrying AAL2 prime connections, which are concentrated to one cell handling unit 44-32. If it turns out that the ET-link has such high capacity and carries so many ATM-VCC that one cell handling unit 44-32 cannot handle the traffic, then base station controller 44 can be equipped with plural cell handling units, such as cell handling unit 44-32(1) and cell handling unit 44-32(2) as shown in FIG. 9A. Regardless of the number of cell handling units 44-32, a cell handling unit 44-32 must be able to handle the load of the AAL2 prime connections carried in the same ATM-VCC. FIG. 9B further shows the use of two diversity handover (DHO) units 60(1) and 60(2) employed in base station controller 44.

PROTOCOL ON THE "A" INTERFACE

The foregoing describes the transmission of ATM cells with AAL2 packets over interface 54 and, within base station controller 44, the multiplexing and demultiplexing between ATM cells with an AAL2 protocol and ATM cells with an AAL2 prime protocol by cell handling unit 44-32. In addition to the multiplexing and demultiplexing functions, the cell handling unit performs queuing of ATM cells which are outbound from the node. Further in this regard, the protocol on interface 58 between base station controller 44 and mobile switching center (MSC) 46 is also noteworthy. Either of two protocols can be employed on interface 58, either selectively or interchangeably.

Figure 10A:
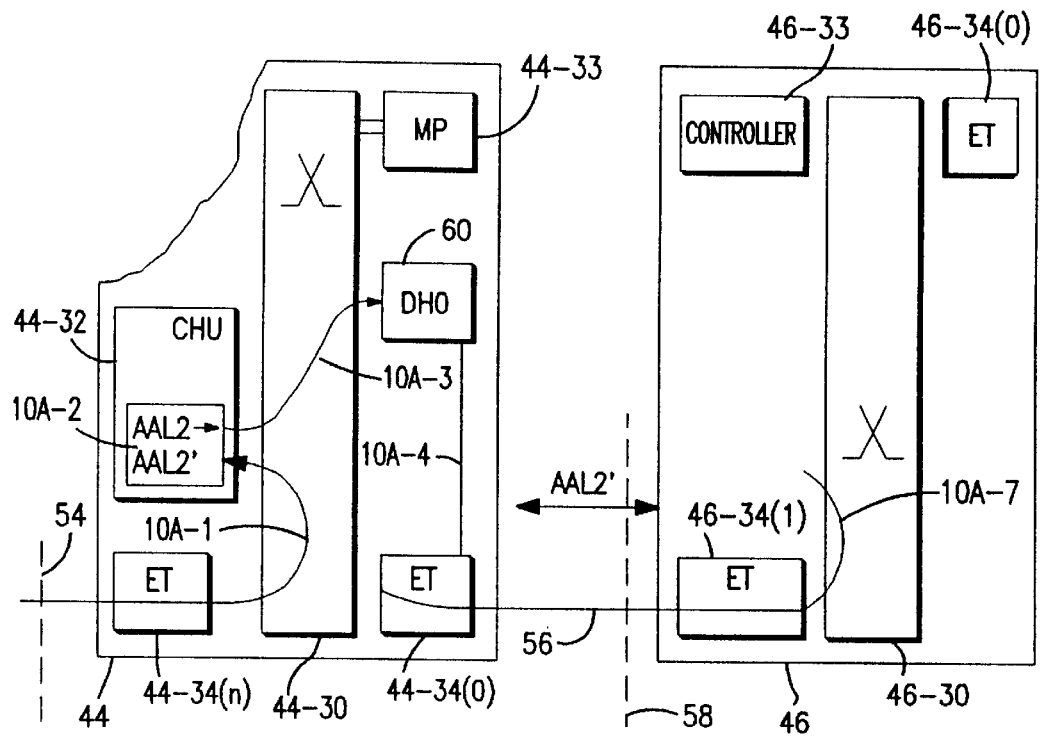
FIG. 10A is a schematic drawing depicting a portion of the network of FIG. 5 and utilization of ATM AAL2 prime protocol over a link between a base station controller and a node superior.

In a mode of the invention illustrated in FIG. 10A, ATM cells having the AAL2 prime protocol can be transmitted from base station controller 44 to other nodes, e.g., mobile switching center (MSC) 46. In this regard, FIG. 10A shows flow of ATM cells on an uplink from interface 54 to mobile switching center (MSC) 46. As shown in FIG. 10A, ATM cells with ALL2 packets received over interface 54 are transmitted through extension terminal 44-34(n) and through ATM switch 44-30 to cell handling unit 44-32, all as indicated by cell switching line 10A-1. In cell handling unit 44-32, the ATM cells with AAL2 packets are demultiplexed into the AAL2 prime protocol, as indicated by functional block 10A-2. After demultiplexing, the ATM cells employing AAL2 prime protocol are switched through ATM switch 44-30 to diversity handover (DHO) unit 60, as indicated by cell switching line 10A-3. At diversity handover (DHO) unit 60 a diversity selection function is performed. After diversity selection, the cells with the selected frames are applied directly (i.e., not switched through ATM switch 44-30) to extension terminal 44-34(0) as indicated by line 10A-4. From extension terminal 44-34(0) the ATM cells with AAL2 prime protocol are carried over link 56 (e.g., across interface 58) to mobile switching center (MSC) 46. At mobile switching center (MSC) 46 the ATM cells with AAL2 prime protocol are received at extension terminal 46-34(1), and then routed through ATM switch 46-30 in route to their destination.

Figure 10B:
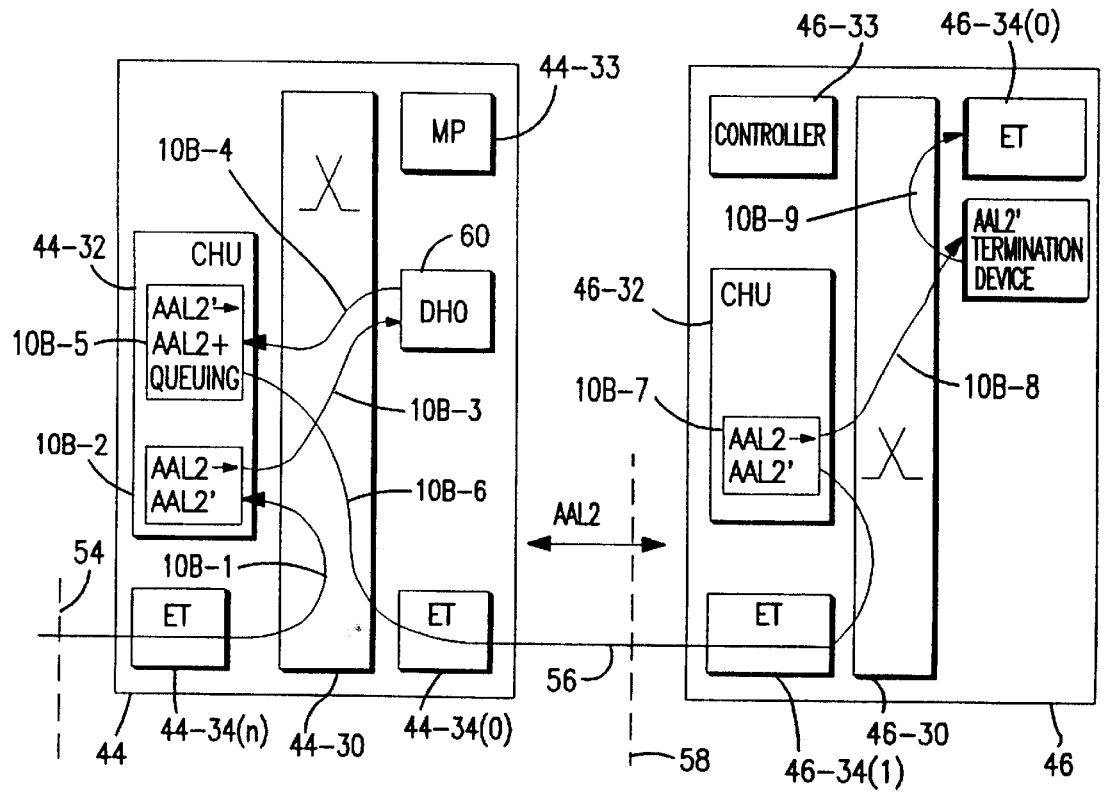
FIG. 10B is a schematic drawing depicting a portion of the network of FIG. 5 and utilization of ATM AAL2 protocol over a link between a base station controller and a node superior.

In the mode of the invention illustrated in FIG. 10B, the ATM cells transferred over link 56 (e.g., interface 58) from base station controller 44 to mobile switching center (MSC) 46 have the AAL2 protocol. Therefore, in the mode of FIG. 10B a cell handling procedure different from that of FIG. 10A is employed. In the mode of FIG. 10B, the cell switching procedures indicated by cell switching lines 10B-1 through 10B-4 are essentially identical to those of cell switching lines 10A-1 through 10A-4 of FIG. 10A. However, after diversity selection, the cells with the selected frames are routed from diversity handover (DHO) unit 60 to cell handling unit 44-32 as indicated by cell switching line 10B-4. At operation 10B-5 cell handling unit 44-32 performs both a multiplexing operation and a queuing operation. The multiplexing 10 operating involves multiplexing from the AAL2 prime protocol (i.e., the protocol of the cells received from diversity handover (DHO) unit 60) to the AAL2 protocol. Thus, ATM cells with AAL2 protocol leave cell handling unit 44-32 for routing through ATM switch 44-30 to extension terminal 44-34(0), as indicated by cell switching line 10B-6. From extension terminal 44-34(0) the ATM cells with AAL2 protocol are carried over link 56 (e.g., interface 58) to mobile switching center (MSC) 46. At mobile switching center (MSC) 46 the ATM cells with AAL2 protocol are received at extension terminal 46-34(1), and then routed through ATM switch 46-30 to cell handling unit 46-32 where the AAL2 connection is terminated. In cell handling unit 46-32, the ATM cells with AAL2 packets are (like at CHU 44-32) demultiplexed into the AAL2 prime protocol, as indicated by functional block 10B-7. After demultiplexing, the ATM cells employing the AAL2 prime protocol are switched through ATM switch 46-30 as shown by arrow 10B-8 to, e.g., an AAL2 prime termination device, such as a transcoder. The AAL2 prime termination converts the ATM cells having AAL2 prime protocol to another protocol, such as, e.g., AAL1, after which such cells are switched (as shown by arrow 10B-9) to another device of node 46 (such as extension terminal 46-34(o) which can transmit the cells out of node 46). Ultimately the ATM cells will be routed out of mobile switching center (MSC) 46.

Figure 10C:
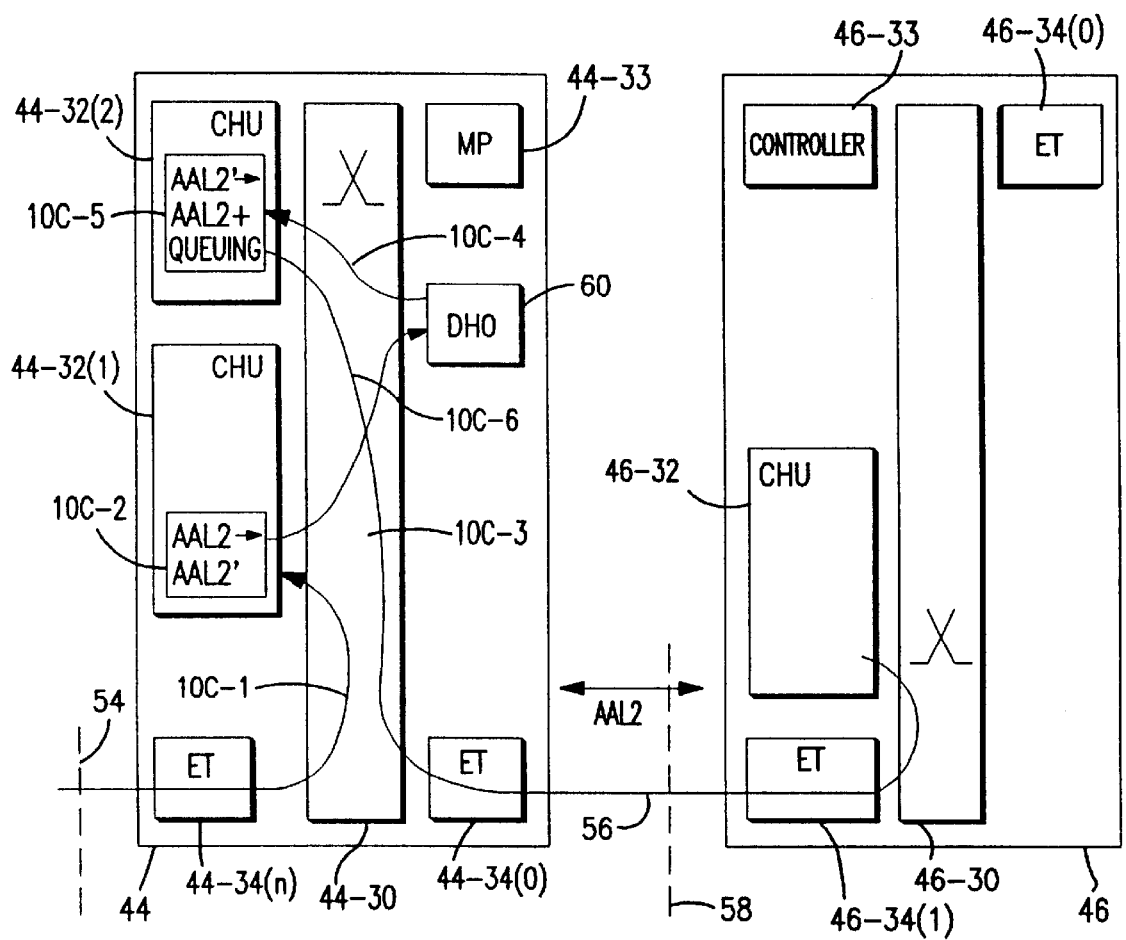
FIG. 10C is a schematic drawing depicting a portion of the network of FIG. 5 with distributed cell handling units and utilization of ATM AAL2 protocol over a link between a base station and a node superior

FIG. 10C differs from FIG. 10B in that base station controller 44 of FIG. 10C employs two cell handling units—cell handling unit 44-32(1) and cell handling unit 44-32(2). In the mode of FIG. 10C, the demultiplexing of ATM cells with AAL2 protocol to ATM cells with AAL2 protocol is performed by cell handling unit 44-32(1) [as indicated by process 10C-2]. After diversity selection is performed at diversity handover (DHO) unit 60, the ATM cells with AAL2 prime protocol are sent to cell handling unit 44-32(2), as indicated by cell switching line 10C-4. In the mode of FIG. 10C, the second cell handling unit 44-32(2) performs the multiplexing and queuing operations, as indicated by functional operation 10C-5. After multiplexing and discharge from the appropriate queue, the ATM cells with AAL2 protocol leave cell handling unit 44-32(2) and are routed by ATM switch 44-30 to extension terminal 44-34(0) as indicated by cell switching line 10C-6. From extension terminal 44-34(0) the ATM cells with AAL2 protocol are carried over link 56 (e.g., interface 58) to mobile switching center (MSC) 46 in like manner as with the mode of FIG. 10B.

Thus, the mode of FIG. 10C differs from that of FIG. 10B in that the functions of cell handling unit 44-32 of FIG. 10B are, in FIG. 10C, divided among the cell handling units 44-32(1) and 44-32(2). In the mode of FIG. 10C, cell handling unit 44-32(1) performs the multiplexing of ATM cells with AAL2 protocol into ATM cells with AAL2 prime protocol, while cell handling unit 44-32(2) performs the converse demultiplexing and queuing. It should be understood that these functions can be distributed in other manners, if desired. For example, both multiplexing and demultiplexing of cells can be performed by one cell handling unit while queuing can be performed by a second cell handling unit. In addition, one cell handling unit of the node can serve some links while another cell handling unit of the node can handle other links Alternatively, a greater number of cell handling units can be used, such as a first cell handling unit for multiplexing, a second cell handling unit for demultiplexing, and a third cell handling unit for queuing.

In FIG. 10A–FIG. 10C discussed above, the arrows have been shown unidirectionally for sake of simplicity. It should be understood in this regard that the AAL2 prime connection between a cell handling unit (CHU) and other devices in the node are, in fact, bidirectional. In this regard, and with respect to the cell handling unit(s) of a node, the multiplexing functions are performed for different links than the links for which the demultiplexing functions are performed.

The mode of FIG. 10A is likely more appealing when interface 58 between base station controller 44 and mobile switching center (MSC) 46 is not very delay sensitive. However, in the event that interface 58 is delay sensitive, the mode of FIG. 10B (or of FIG. 10C) may be preferable. Moreover, as indicated above, the provision of cell handling units affords the ability to interchangeably use either AAL2 protocol or AAL2 prime protocol over interface 58. In this regard, when cell handling unit 44-32 of base station controller 44 detects that its queues are becoming filled past a predetermined threshold (e.g., indicative of delay), the operator can set the multiplexing mode by macro or configuration.

CELL HANDLING UNIT (CHU): STRUCTURAL OVERVIEW

The effects and benefits of the functions of the cell handling units 32 have been described above—e.g., the demultiplexing of ATM cells with AAL2 protocol into ATM cells with AAL2 prime protocol, the multiplexing of ATM cells with AAL2 prime protocol into ATM cells with AAL2 protocol, and the queuing of cells prior to transmission. How these operations are performed is understood with reference to the ensuing discussion of the structure of a representative cell handling unit 32 as shown in FIG. 11.

Figure 11:
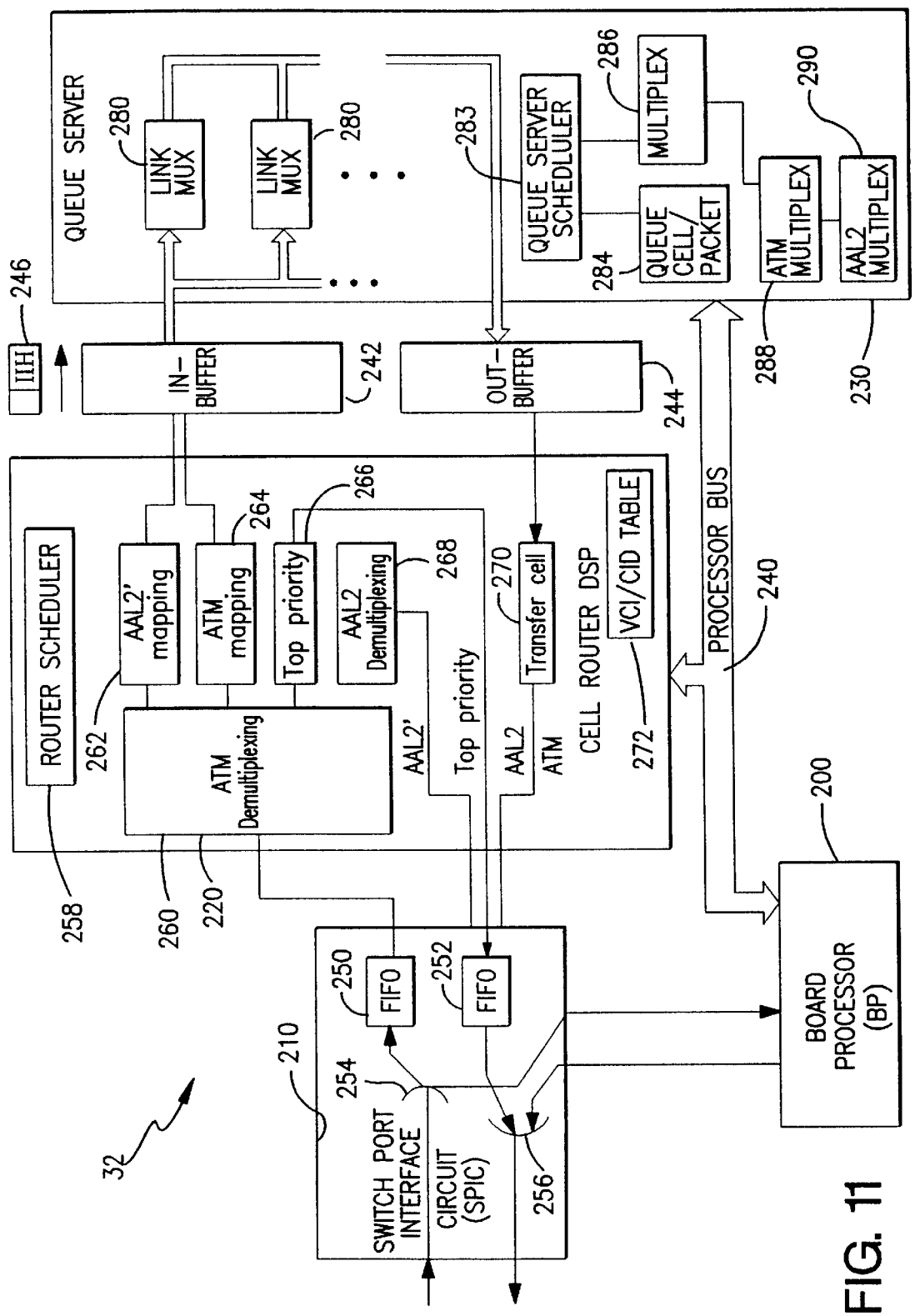
FIG. 11 is a schematic view of a cell handling unit utilized in the network of FIG. 5.

FIG. 11 shows a representative cell handling unit 32. Cell handling unit 32 comprises a board processor (BP) 200; a switch port interface circuit (SPIC) 210; a cell router digitial signal processor (R-DSP) 220; and a queuing resource known as queue server 230. For sake of simplicity, the cell router digitial signal processor (R-DSP) 220 shall hereafter be referred to as cell router 220. Queue server 230 preferably comprises one or more digital signal processors (DSPs). A processor bus 240 connects each of board processor (BP) 200, cell router 220, and each DSP of queue server 230. Two dual port memories are accessible both by cell router 220 and queue server 230, particularly an in-buffer memory 242 and an out-buffer memory 244. When queue server 230 comprises plural DSPs, a pair of dual port memories (for in-buffer memory 242 and out-buffer memory 244) can be provided for each DSP.

The switch port interface circuit (SPIC) 210 is the part of cell handling unit 32 that is connected to the ATM switch 30. In addition to unillustrated details, switch port interface circuit (SPIC) 210 comprises an incoming cell buffer or FIFO 250 and an outgoing cell buffer or FIFO 252. Incoming cell FIFO buffers cells received from the ATM switch 30 and destined to cell router 220; outgoing cell FIFO buffers cells received from cell router 220 and destined to the ATM switch 30. In addition, switch port interface circuit (SPIC) 210 comprises an incoming cell multiplexer 254 and an outgoing cell multiplexer 256. Incoming cell multiplexer 254 routes cells either to cell router 220 or to board processor (BP) 200; outgoing cell multiplexer 256 selects either cells from cell router 220 or board processor (BP) 200 to route to the ATM switch 30.

CHU FUNCTION: CELL ROUTER OVERIEW

Various ones of the functional operations performed by cell router 220 are illustrated as blocks in FIG. 11. For example, cell router 220 includes Router Scheduler function 258; ATM demultiplexing function 260 (which interfaces with each of an AAL2' mapping function 262; an ATM mapping function 264; a top priority function 266; an AAL2 Demultiplexing function 268); and transfer cell function 270.

In addition to the functions illustrated in FIG. 11, cell router 220 includes a combined VCI/CID table 272. The combined VCI/CID table 272 is discussed in more detail below in connection with FIG. 18 and FIG. 19A–FIG. 19B. ATM cells incoming to cell handling unit 32 and queued in incoming cell FIFO 250 of switch port interface circuit (SPIC) 210 have a SPIC tag used to direct the ATM cell through the ATM switch 30 to cell handling unit 32. In addition, the incoming ATM cells have a VCI value in their header. If the incoming ATM cells have an AAL2 protocol, each AAL2 packet has the eight bit channel identifier (CID) in its packet header [see FIG. 2]. For incoming ATM cells, the VCI of the incoming ATM cell is used as an index in combined VCI/CID table 272 to obtain various quantities. The quantities obtained from combined VCI/CID table 272 can include a new VCI to be assigned to an outgoing ATM cell, a new SPIC tag value indicative of the next port of the ATM switch 30 to which the cell is destined, and an internal interface header (IIH) to be used for routing information from cell router 220 to queue server 230. When ATM cells with the AAL2 prime protocol are being created, the VCI value of the incoming ATM cell header and the CID value in the header of the AAL2 packet stored in the incoming ATM cell are used to index the combined VCI/CID table 272 in order to obtain a new VCI value and SPIC tag to be applied to the ATM AAL2 prime cell being created.

The cell router 220 sends internal interface packages 246 to queue server 230 via in-buffer memory 242. As shown in FIG. 11, AAL2' mapping function 262 sends AAL2 packets to queue server 230 via in-buffer memory 242. Similarly, ATM mapping function $26_4$ sends ATM cells to queue server 230 via in-buffer memory 242. The ATM cells and AAL2 packets sent to queue server 230 via in-buffer memory 242 from cell router 220 each have an internal interface header (IIH) applied thereto by cell router 220. Accordingly, as shown in FIG. 11, each package 246 sent from cell router 220 to queue server 230 via in-buffer memory 242 has the internal interface header IIH.

Top priority function 266 sends a top priority indication to queue server 230 (as indicated by the broken line in FIG. 11), and outgoing cells directly to FIFO 252. AAL2 Demultiplexing function 268 sends ATM cells having the AAL2 prime protocol to outgoing cell FIFO 252. Transfer cell function 270 receives ATM cells (of either AAL2 protocol or straight ATM protocol) from queue server 230 via out-buffer memory 244 and sends the ATM cells to outgoing cell FIFO 252.

Transfer cell function 270 is described subsequently in more detail in connection with FIG. 13A. AAL2 Demultiplexing function 268 is described subsequently in more detail in connection with FIG. 13B. AAL2' mapping function 262 is described subsequently in more detail in connection with FIG. 13C; ATM mapping function 264 is described subsequently in more detail in connection with FIG. 13D; top priority function 266 is described subsequently in more detail in connection with FIG. 13E; ATM demultiplexing function 260 is described subsequently in more detail in connection with FIG. 13F.

CHU FUNCTION: QUEUE SERVER OVERIEW

Some of the functions of cell router 220 send (via in-buffer memory 242) internal interface packages 246 to queue server 230 for multiplexing and/or queuing. Queue server 230, which comprises one or more digital signal processors, is shown in FIG. 11 as performing various functions, including the function of link multiplexers. In the node in which cell handling unit 32 resides, queue server 230 has a link multiplexer 280 for each extension terminal (ET) link or ET ATM port of the node. The queuing and multiplexing operations of queue server 230 are essentially performed in the link multiplexers 280. FIG. 11 illustrates that the number of link multiplexers 280 is dynamically changeable in accordance with the number of ET ATM ports with CHU support which are active at the node at any instance.

The internal interface packages 246 (containing either ATM cells or AAL2 packets) are extracted from in-buffer memory 242 by the link multiplexers 280. A link multiplexer 280 knows what internal interface package 246 is directed to it by the internal interface header IIH stored with the internal interface package 246. Upon being discharged from a link multiplexer 280, cells multiplexed or queued by queue server 230 are stored in out-buffer memory 244.

Figure 14:
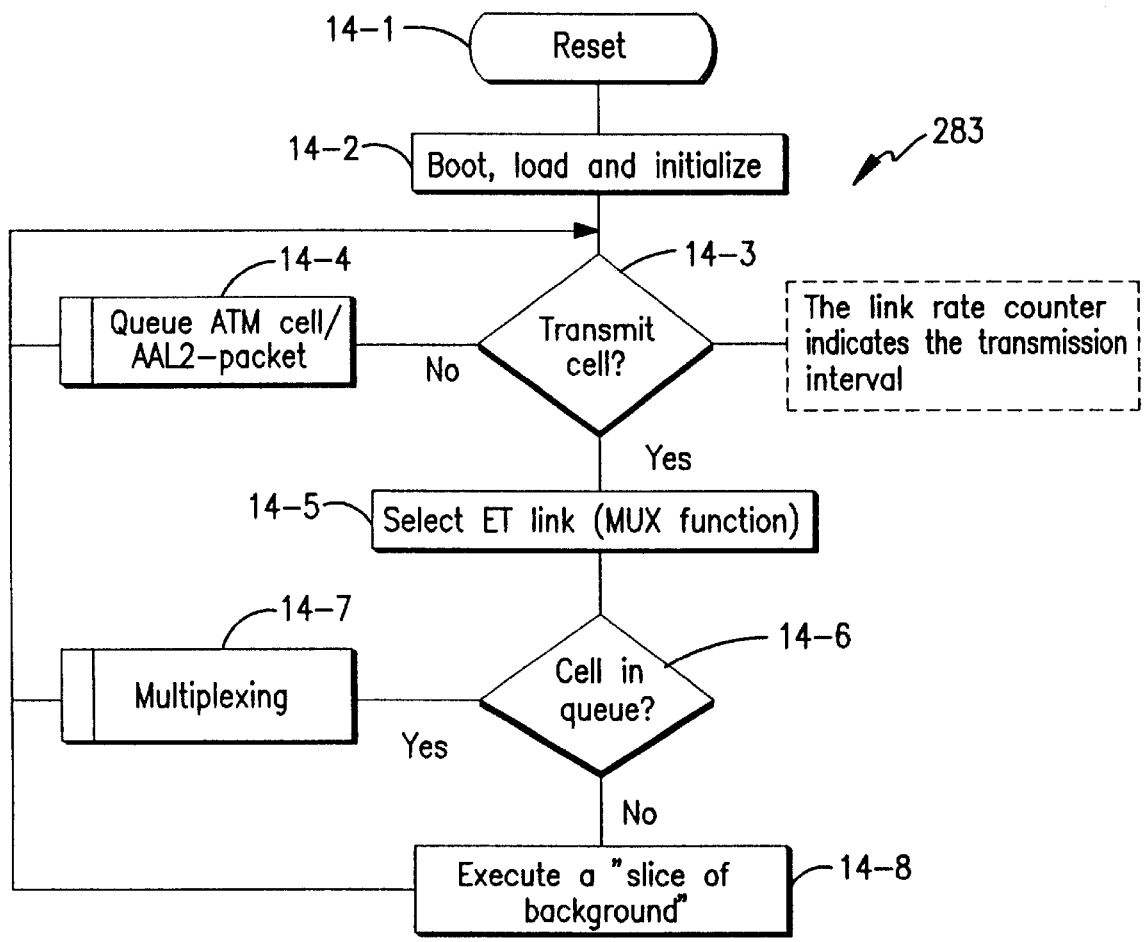
FIG. 14 is a flowchart showing general steps performed by a Queue Server Scheduler function of the queue server of FIG. 11.

In addition to performing the function of link multiplexer 280, queue server 230 has other functions, some of which are indicated in block 230 of FIG. 11. Among these functions are the Queue Server Scheduler function 283 (described in more detail in conjunction with FIG. 14), which calls both Queue Cell/Packet function 284 (see FIG. 14A) and Multiplexing function 286 (see FIG. 14B). The Multiplexing function 286 calls ATM Multiplexing function 288 (see FIG. 14C), which in turn can call AAL2 Multiplexing function 290 (see FIG. 14D). Other functions of queue server 230 are not shown in FIG. 11 but are hereinafter described.

In the illustrated embodiment, the queue server 230 comprises eight digital signal processors, two of which are used by the cell handling unit.

LINK MULTIPLEXER

Figure 12:
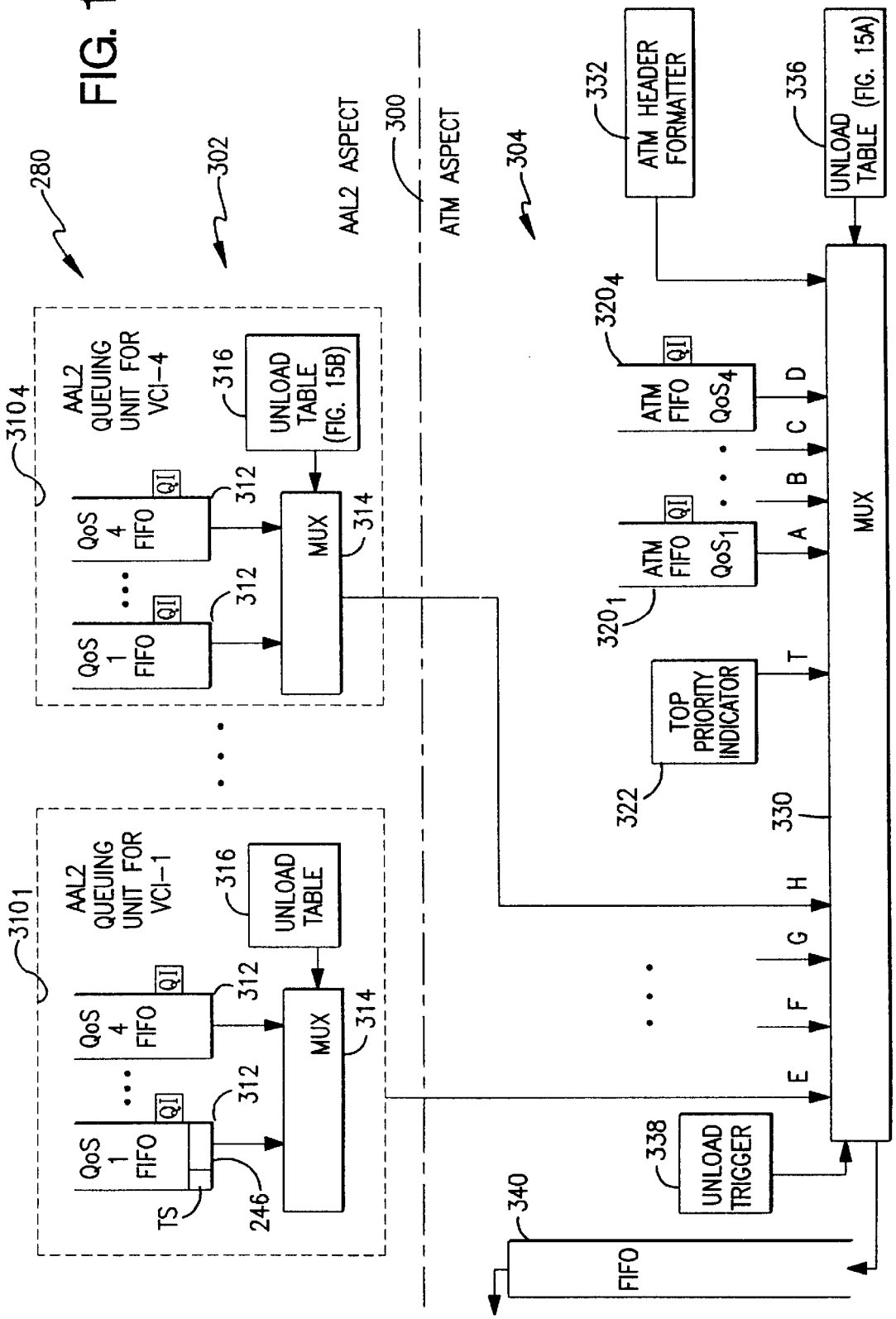
FIG. 12 is a schematic view of a link multiplexer included in a queue server of the cell handling unit of FIG. 11.

Functions of a link multiplexer 280 are illustrated in FIG. 12. Each link multiplexer 280 has both an AAL2 aspect and an ATM aspect. In FIG. 12, line 300 symbolically divides AAL2 aspect 302 from ATM aspect 304. The ATM aspect 304 is also referred to as the first stage of the link multiplexer 280, whereas the AAL2 aspect 302 is also referred to as the second stage of the link multiplexer 280.

AAL2 aspect 302 primarily comprises an AAL2 queuing unit for each of four VCIs, e.g., AAL2 VCI queuing units $310_1$ through $310_4$. A greater or lesser number of AAL2 VCI queuing units 310 can be employed in other embodiments. Each AAL2 VCI queuing unit 310 comprises plural input buffers or FIFOs 312 which receive internal interface packages 246, each internal interface package 246 containing an AAL2 packet. The internal interface packages 246 fed to the AAL2 VCI queuing units 310 from in-buffer memory 242 are the internal interface packages 246 forwarded from AAL2' mapping function 262 of cell router 220 (see FIG. 11).

Within each AAL2 VCI queuing unit 310 a separate input FIFO 312 can be assigned to each different service class (e.g., quality of service type, QoS) handled by the respective VCI. In the illustrated embodiment of FIG. 12, four input FIFOs 312 are provided for each AAL2 VCI queuing units 310, a first input FIFO 312 for handling quality class 1, a second input FIFO 312 for handling quality class 2, and so forth to quality class 4. However, a greater or lesser number of input FIFOs 312 can be provided for each AAL2 VCI queuing unit 310. Moreover, the input FIFOs 312 can be used for classifications other than quality of service type.

The outputs of each of the input buffers or FIFOs 312 within a AAL2 VCI queuing unit 310 are all connected to input ports of an AAL2 VCI multiplexer 314 of that AAL2 VCI queuing unit 310. As explained subsequently, the AAL2 VCI multiplexer 314 of each AAL2 VCI queuing unit 310 selects first-in internal interface packages 246 from the input FIFOs 312 of the AAL2 VCI queuing unit 310 in accordance with an order established in a corresponding AAL2 VCI multiplexer unload table 316, and forwards the selected cell to ATM aspect 304 of link multiplexer 280. An example of an AAL2 VCI multiplexer unload table 316 is shown in FIG. 15B.

ATM aspect 304 of link multiplexer 280 comprises four ATM cell input buffers or FIFOs 320, through 320₄. Each of the ATM cell input FIFOs 320 can be for a different quality class, e.g., ATM cell input FIFO 320, being for quality class 1, ATM cell input FIFO 320₂ being for quality class 2, and so forth up to quality class 4. Each ATM cell input FIFO 320 receives ATM cells via in-buffer memory 242 as a result of operation ATM mapping function 26₄ of cell router 220 (see FIG. 11).

Outputs of the ATM cell input FIFOs 320₁ and 320₂, along with outputs from each of the AAL2 VCI multiplexers 314 of AAL2 aspect 302, are input to respective input terminals of ATM multiplexer 330. In addition, FIG. 12 shows a top priority indication obtained from in-buffer memory 242 being represented as 322. Each of the inputs to ATM multiplexer 330 are labeled for sake of illustration to be compatible with example unload tables described with reference to FIG. 15A and FIG. 15B. The input from top priority indication 322 is labeled as "T". The inputs from ATM cell input FIFOs 320₁ through ATM cell input FIFO 320₄ are respectively labeled as inputs "A" through "D". The inputs from the AAL2 VCI multiplexers 314 of the AAL2 VCI queuing units 310₁ through 310₄ are labeled as inputs "E" through "H", respectively. In addition, another input to ATM multiplexer 330 is fed from an ATM cell header formatter 332. The ATM cell header formatter 332 is used in the AAL2 aspect of the link multiplexer 280. In this regard, when AAL2 packets have been multiplexed into one ATM cell, this function forms the ATM header of the ATM cell to be sent.

ATM multiplexer 330 selects from its various inputs in accordance with a predetermined order stored in ATM multiplexer unload table 336. An example of ATM multiplexer unload table 336 is shown in FIG. 15A. ATM multiplexer 330 outputs an ATM cell to out-buffer memory 244 (see FIG. 11). The out-buffer memory 244 is conceptualized as having a FIFO register for each link multiplexer 280, as depicted by FIFO 340 in FIG. 12. Cells stored in the FIFO 340 of out-buffer memory 244 for the link multiplexer 280 are extracted by Transfer cell function 270 of cell router 220 for sending to outgoing cell FIFO 252 (see FIG. 11).

UNLOAD TABLES

FIG. 15A shows an example unload table 336 for the ATM aspect 304 of a representative link multiplexer 280; FIG. 15B shows an example unload table 316 for the AAL2 aspect 302 of the same link multiplexer 280. In the ATM multiplexer unload table 336 of FIG. 15A and the AAL2 VCI multiplexer unload table 316 of FIG. 15B, the inputs from ATM cell input FIFOs 320₁ through ATM cell input FIFO 320₄ are respectively labeled as inputs "A" through "D"; the inputs from the AAL2 VCI multiplexers 314 of the AAL2 VCI queuing units 310₁ through 310₄ are labeled as inputs "E" through "IF", respectively, as above discussed and illustrated in FIG. 12.

Each row of the unload table 336 and each row of unload table 316 correspond to a priority level. For example, the top row of each table shows the highest priority level. At each transmission opportunity a column of the unload table is traversed in search for a cell to send. In each column, the highest indicated priority input to the multiplexer is checked first. If that priority cannot produce a cell, then the next highest priority is checked, and so forth. Within each unload table a pointer is used to keep track of the columns pointed to for a next transmission opportunity.

CELL ROUTER OPERATION: ROUTER SCHEDULER FUNCTION

Figure 13E:
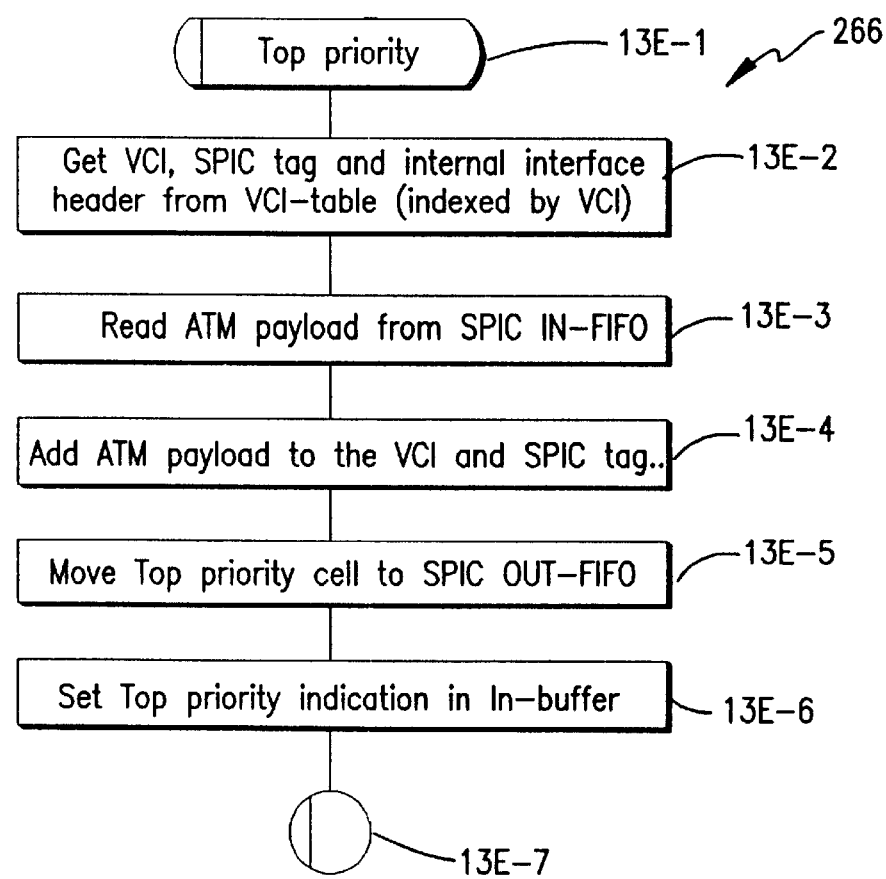
FIG. 13E is a flowchart showing general steps performed by a cell router of the cell handling unit of FIG. 11 in connection with a top priority function.
Figure 13:
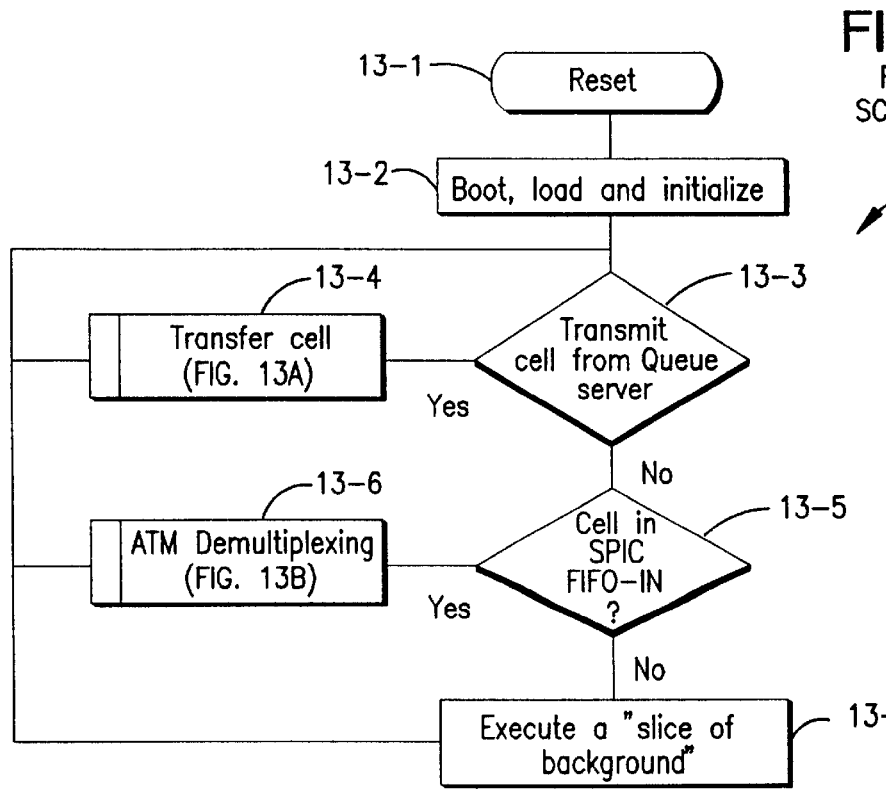
FIG. 13 is a flowchart showing general steps performed by a cell router of the cell handling unit of FIG. 11 in connection with a router scheduler function.

FIG. 13, together with FIG. 13A–FIG. 13F, describe various functions performed by cell router 220 of cell handling unit 32. FIG. 13 particularly shows general steps performed by the Router Scheduler function 258 of cell router 220. Upon reset of cell router 220 (indicated by step 13-1), a boot, load and initialize operation is performed (step 13-2). Thereafter, cell router 220 executes a loop which begins with step 13-3. At step 13-3, cell router 220 determines whether there is a cell in out-buffer memory 244 of queue server 230 which should be transferred out of cell handling unit 32. If such a cell exists for transfer, the Transfer cell function 270 is performed as indicated by step 13-4. General steps involved in Transfer cell function 270 are illustrated and discussed hereafter with reference to FIG. 13A.

If a cell does not exist for transfer out of cell handling unit 32, at step 13-5 cell router 220 determines whether there is a cell in incoming cell FIFO 250 of switch port interface circuit (SPIC) 210 which awaits processing. If such a cell awaits, the ATM demultiplexing function 260 is performed as indicated by at step 13-6 . General steps involved in ATM demultiplexing function 260 are illustrated and discussed hereafter with reference to FIG. 13B. If no such cell exists in incoming cell FIFO 250, at step 13-7 the cell router 220 executes a slice of the background. The background of which a slice is executed at step 1307 includes such things as delivering signals from board processor (BP) 200 to either cell router 220 or queue server 230. Such signals include transmission order tables (e.g., values to be stored in the unload tables 316 and 336 of the link multiplexers 280, for example [see FIG. 12]), control information, and the like. Upon completion of any of Transfer cell function 270 (step 13-4), ATM demultiplexing function 260 (step 13-6), or the background execution of step 13-7, execution loops back to step 13-3.

CELL ROUTER OPERATION: TRANSFER CELL FUNCTION

Figure 13A:
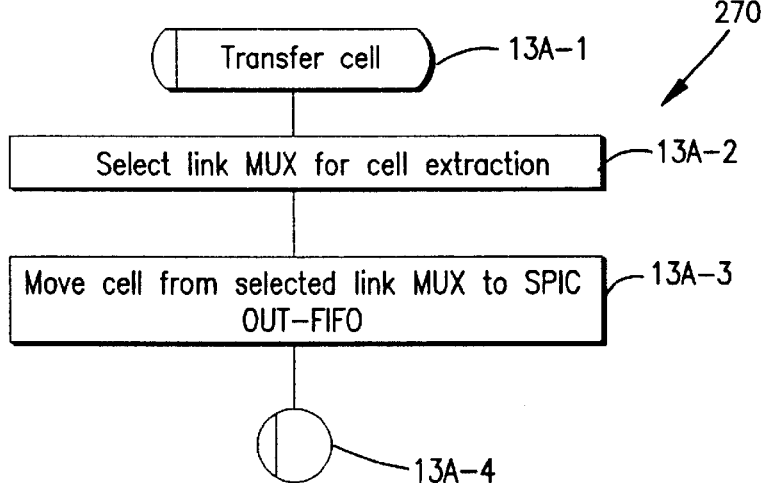
FIG. 13A is a flowchart showing general steps performed by a cell router of the cell handling unit of FIG. 11 in connection with a transfer cell function.

Transfer cell function 270, initiated by cell router 220 at step 13-4 of the Router Scheduler function 258 (see FIG. 13), has general steps which are depicted in FIG. 13A. The beginning of Transfer cell function 270 is depicted by symbol 13A-1. At step 13A-2, one of the link multiplexers 280 is selected to have its outgoing ATM cell FIFO 340 (included in out-buffer memory 244) tapped for transmitting a cell to cell router 220. As queue server 230 has plural link multiplexers 280, Transfer cell function 270 can select the link multiplexers 280 for cell output on any predetermined basis, e.g., in round-robin fashion. After a link multiplexer 280 is selected, at step 13A-3 the selected cell is moved to outgoing cell FIFO 252 of switch port interface circuit (SPIC) 210. After a cell is so transferred, transfer cell function 270 is terminated (as indicated by step 13A-4) until again called.

CELL ROUTER OPERATION: ATM DEMULTIPLEXING FUNCTION

ATM demultiplexing function 260 serves basically to read cells from incoming cell FIFO 250 of switch port interface circuit (SPIC) 210; check that a connection is established; and separate ATM cells received from incoming cell FIFO 250 according to the four handled cell formats (AAL2 prime; AAL5; top priority, and AAL2).

ATM demultiplexing function 260, initiated by cell router 220 at step 13-6 of the Router Scheduler function 258 (see FIG. 13), has general steps which are depicted in FIG. 13B. The beginning of ATM demultiplexing function 260 is depicted by symbol 13B-1. At step 13B-2, a check is made whether a cell awaits in incoming cell FIFO 250 of switch port interface circuit (SPIC) 210. If no cell awaits, ATM demultiplexing function 260 is terminated as indicated by symbol 13B-3. If a cell does reside in incoming cell FIFO 250, the remainder of ATM demultiplexing function 260 is performed beginning with step 13B-4.

At step 13B-4, ATM demultiplexing function 260 reads the header of the awaiting cell from incoming cell FIFO 250 of switch port interface circuit (SPIC) 210. Once the cell header has been read, ATM demultiplexing function 260 looks up the VCI of the incoming cell using combined VCI/CID table 272 (see also FIG. 18 and FIG. 19A–FIG. 19B). At step 13B-6 a validity check is performed relative to the VCI of the incoming cell. If the VCI of the incoming cell is invalid (e.g., out of range or no connection established), at step 13B-7 the incoming cell is discarded using a Remove ATM Cell function. The Remove ATM Cell function is described subsequently in more detail in connection with FIG. 13F-5. Upon completion of the Remove ATM Cell function, ATM demultiplexing function 260 is terminated (step 13B-8).

If the VCI of the incoming cell is valid, the type of the cell is checked at step 13B-9. In this regard, valid VCIs lie in four separate ranges for each of four different cell formats. Therefore, at step 13B-9, the received VCI is compared against these ranges to determine to which of the four formats the cell belongs. In accordance with the cell type check at step 13B-9, one of the four following functions is selected for a macro call: AAL2' mapping function 262 (see FIG. 13C) [step 13B-10]; ATM mapping function 264 (see FIG. 13D) [step 13B-11]; top priority function 266 (see FIG. 13E) [step 13B-12]; and AAL2 Demultiplexing function 268 top priority function 266 (see FIG. 13F) [step 13B-13]. After execution of the appropriate one of these functions, ATM demultiplexing function 260 terminates as indicated by symbol 13B-14.

CELL ROUTER OPERATION: AAL2' MAPPING FUNCTION

AAL2' mapping function 262 serves basically to peel off the ATM format from an ATM cell with the AAL2 prime protocol; add the internal interface header IIH that routes the AAL2 packet included in the incoming cell to the queue server 230 (e.g., the correct DSP in queue server 230) and the correct AAL2 quality of class queue (e.g., one of input FIFOs 312 for the correct AAL2 VCI queuing unit 310); and to write the AAL2 packet to the correct input FIFO 312 of queue server 230.

AAL2' mapping function 262, initiated by cell router 220 at step 13B-10 of ATM demultiplexing function 260 (see FIG. 13B), has general steps which are depicted in FIG. 13C. The beginning of AAL2' mapping function 262 is depicted by symbol 13C-1.

At step 13C-3, AAL2' mapping function 262 obtains an internal interface header from combined VCI/CID table 272. This internal interface header IIH is used, along with the AAL2 packet, to form the internal interface package 246. The internal interface header (IIH) is also used to store the internal interface package 246 in a proper address in in-buffer memory 242 so that the appropriate one of the link multiplexers 280 in queue server 230 can obtain the internal interface package 246. Specifically, this internal interface header IIH is used to route the internal interface package 246 to the correct DSP in queue server 230 and, moreover, to the correct AAL2 quality of class queue (e.g., one of input FIFOs 312) for the correct AAL2 VCI queuing unit 310 of the correct link multiplexer 280 [see FIG. 12].

Step 13C-4 involves AAL2' mapping function 262 obtaining the AAL2 packet from the incoming cell in incoming cell FIFO 250 of switch port interface circuit (SPIC) 210. After the AAL2 packet has been obtained at step 13C-4, the internal interface header IIH procured at step 13C-3 is added thereto at step 13C-5 to form the internal AAL2 interface package 246 (see FIG. 11). At step 13C-6 the internal AAL2 interface package 246 formed at step 13C-5 is moved to in-buffer memory 242 so that it can be obtained by the particular input FIFO 312 of queue server 230 which is addressed by the internal interface header. With the internal interface package 246 thus transferred to in-buffer memory 242, at step 13C-7 the remainder of the awaiting cell in incoming cell FIFO 250 of switch port interface circuit (SPIC) 210 is cleared. Symbol 13C-8 shows AAL2' mapping function 262 then being exited.

CELL ROUTER OPERATION: ATM MAPPING FUNCTION

ATM mapping function 264 serves to perform a switching operation with respect to the VCI and SPIC tag in the header of an ATM cell; to add an internal interface header IIH to the ATM cell; and to write the internal interface package 246 containing the ATM cell and internal interface header IIH into in-buffer memory 242 so that the appropriate link multiplexer 280 can obtain the same.

ATM mapping function 264, initiated by cell router 220 at step 13B-11 of ATM demultiplexing function 260 (see FIG. 13B), has general steps which are depicted in FIG. 13D. The beginning of ATM mapping function 264 is depicted by symbol 13D-1. At step 13D-2, ATM mapping function 264 obtains the VCI value in the header of the next awaiting cell in incoming cell FIFO 250 of switch port interface circuit (SPIC) 210. Further, at step 13D-2, ATM mapping function 264 uses the VCI value from the header as an index to obtain, from combined VCI/CID table 272, a new VCI, a new SPIC tag, and an internal interface header IIH. Then, at step 13D-3, ATM mapping function 264 creates a new ATM header for an outgoing ATM cell. Step 13D-4 shows ATM mapping function 264 obtaining from incoming cell FIFO 250 the ATM payload of the next awaiting ATM cell whose header was read at step 13D-2. At step 13D-5, ATM mapping function 264 adds the SPIC tag and the new ATM header obtained at step 13D-4 to the internal interface header IIH fetched at step 13D-2 to form the internal interface package 246 (see FIG. 11). At step 13D-6 the internal interface package 246 is moved to a location in the in-buffer memory 242 specified by the internal interface header, so that the internal interface package 246 can be extracted by the proper ATM cell input FIFO 320 of the correct link multiplexer 280 in queue server 230 (see FIG. 12). Symbol 13D-7 depicts exiting of ATM mapping function 264.

CELL ROUTER OPERATION: TOP PRIORITY FUNCTION

Top priority function 266 serves to switch VCI and SPIC tag values, and to move a top priority cell to outgoing cell FIFO 252. In addition, top priority function 266 provides an indication to the link multiplexer 280 for the ET link to which the top priority cell is applied that a top priority cell has been processed. This indication is used to control flow of cells on that ET link.

Top priority function 266, initiated by cell router 220 at step 13B-12 of ATM demultiplexing function 260 (see FIG. 13B), has general steps which are depicted in FIG. 13E. The beginning of top priority function 266 is depicted by symbol 13E-1. At step 13E-2, the top priority function 266 obtains the VCI of the next awaiting cell in incoming cell FIFO 250 of switch port interface circuit (SPIC) 210. Further, at step 13E-2, top priority function 266 uses the VCI value from the header as an index to obtain, from combined VCI/CID table 272, a new VCI, a new SPIC tag, and the internal interface header IIH. Then, at step 13E-3, top priority function 266 obtains the ATM payload from the next awaiting cell in incoming cell FIFO 250. Step 13E-4 shows top priority function 266 adding the ATM payload obtained at step 13E-3 to the VCI and SPIC tag fetched at step 13E-2 to form a top priority ATM cell package. At step 13E-5 the top priority ATM cell is moved to outgoing cell FIFO 252. To reflect discharge of the top priority ATM cell at step 13E-5, at step 13E-6 a top priority indicator is set relative to the ET link upon which the top priority ATM cell is discharged (as shown by the broken line in FIG. 11 and top priority indicator 322 in FIG. 12). Symbol 13E-7 shows exiting of top priority function 266.

CELL ROUTER OPERATION: AAL2 DEMULTIPLEXING FUNCTION

Figure 13F:
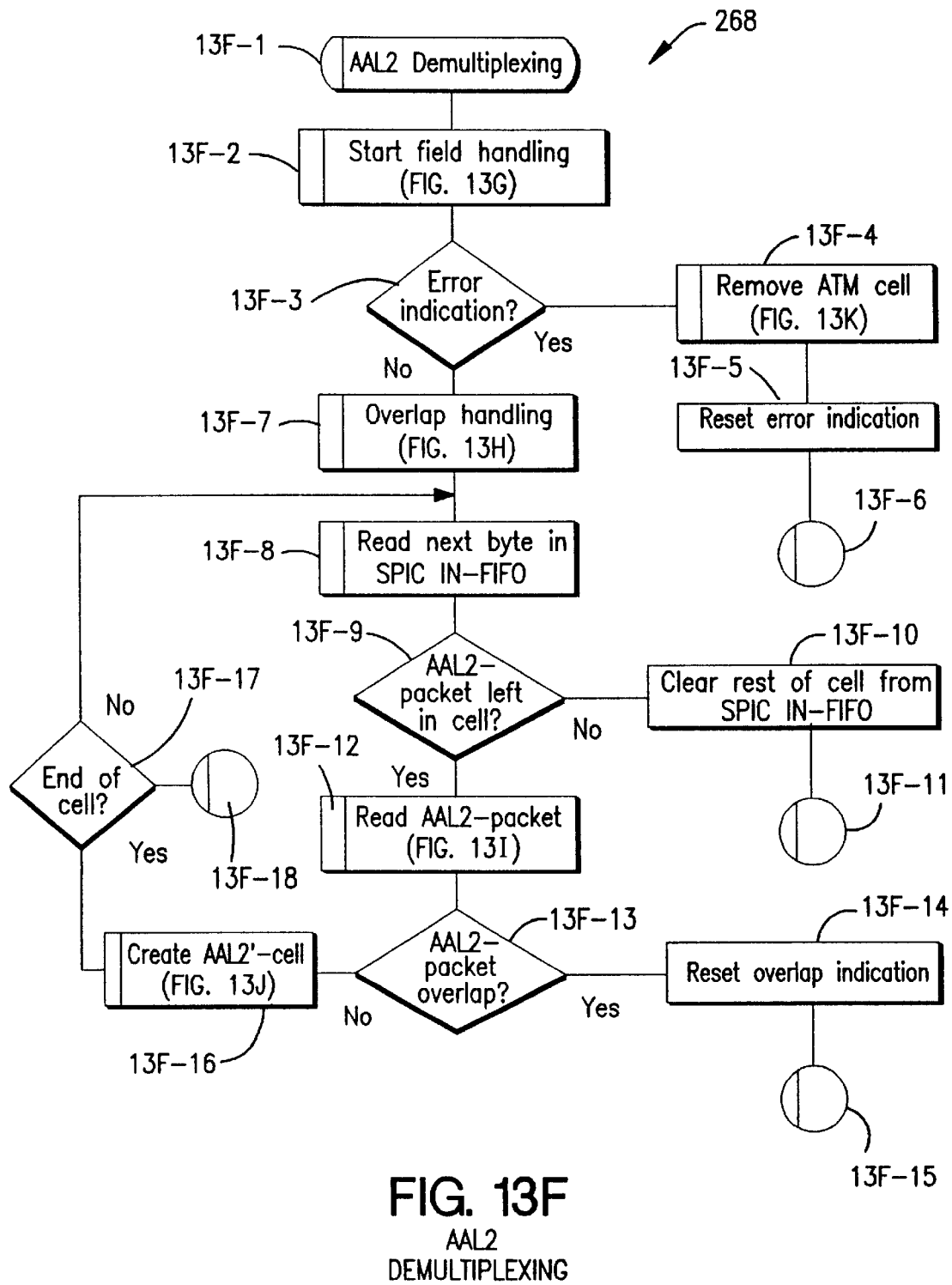
FIG. 13F is a flowchart showing general steps performed by a cell router of the cell handling unit of FIG. 11 in connection with an AAL2 demultiplexing function.

AAL2 Demultiplexing function 268 serves essentially to demultiplex AAL2 packets in ATM cells bearing AAL2 packets into ATM cells having the AAL2 prime protocol. AAL2 Demultiplexing function 268, initiated by cell router 220 at step 13B-13 of ATM demultiplexing function 260 (see FIG. 13B), has general steps which are depicted in FIG. 13F.

The beginning of AAL2 Demultiplexing function 268 is depicted by symbol 13F-1. Step 13F-2 involves calling the Start Field Handling function. The Start Field Handling function of step 13F-2 is discussed subsequently in connection with FIG. 13G. In essence, the Start Field Handling function is used to extract and handle the start field 24 of the ATM cell having AAL2 packets (see FIG. 3 and FIG. 3A).

If the Start Field Handling function provides an error indication (step 13F-3), step 13F-4 and step 13F-5 are performed prior to exiting AAL2 Demultiplexing function 268 (as indicated by symbol 13F-6). At step 13F-4 the Remove ATM Cell function is performed [see FIG. 13K] to remove the next awaiting cell in incoming cell FIFO 250 of switch port interface circuit (SPIC) 210. Step 13F-5 causes reset of an error indication.

When the Start Field Handling function does not return an error indication, at step 13F-7 a Overlap Handling function is called. The Overlap Handling function is discussed in more detail in connection with FIG. 13H. After exiting of the Overlap Handling function, a loop commencing with step 13F-8 is next performed.

The loop commencing at step 13F-8 serves to read the remainder of the payload of the next awaiting ATM cell in incoming cell FIFO 250 (the start field having already been processed at step 13F-2). At step 13F-8, the next byte of the payload is read. Step 13F-9 involves determining whether an AAL2 packet is still left in the payload. If it turns out that the remainder of the payload is padding (see FIG. 3), at step 13F-10 the remainder of the cell is cleared from incoming cell FIFO 250 and AAL2 Demultiplexing function 268 is exited (as indicated by symbol 13F-11). If an AAL2 packet yet remains in the next awaiting ATM cell, the next AAL2 packet of that cell is read using the Read AAL2 Packet function at step 13F-12. The Read AAL2 Packet function is described in more detail in connection with FIG. 13I.

If it is determined at step 13F-13 that the next AAL2 packet read at step 13F-12 overlaps to a following ATM cell in incoming cell FIFO 250, an overlap indication is set at step 13F-14 prior to exiting AAL2 Demultiplexing function 268 (depicted by symbol 13F-15). Otherwise, at step 13F-16 a Create AAL2' Cell function is called. The Create AAL2' Cell function is described in greater detail with respect to FIG. 13J. After the ATM cell with AAL2 protocol is created at step 13F-16, a determination is made at step 13F-17 whether the end of the next awaiting cell in incoming cell FIFO 250 has been encountered. If the end has been encountered, AAL2 Demultiplexing function 268 is exited as indicated by symbol 13F-18. Otherwise, AAL2 Demultiplexing function 268 loops back to step 13F-8 for the reading of the next byte of the next awaiting cell in incoming cell FIFO 250.

CELL ROUTER OPERATION: START FIELD HANDLING FUNCTION

Figure 13G:
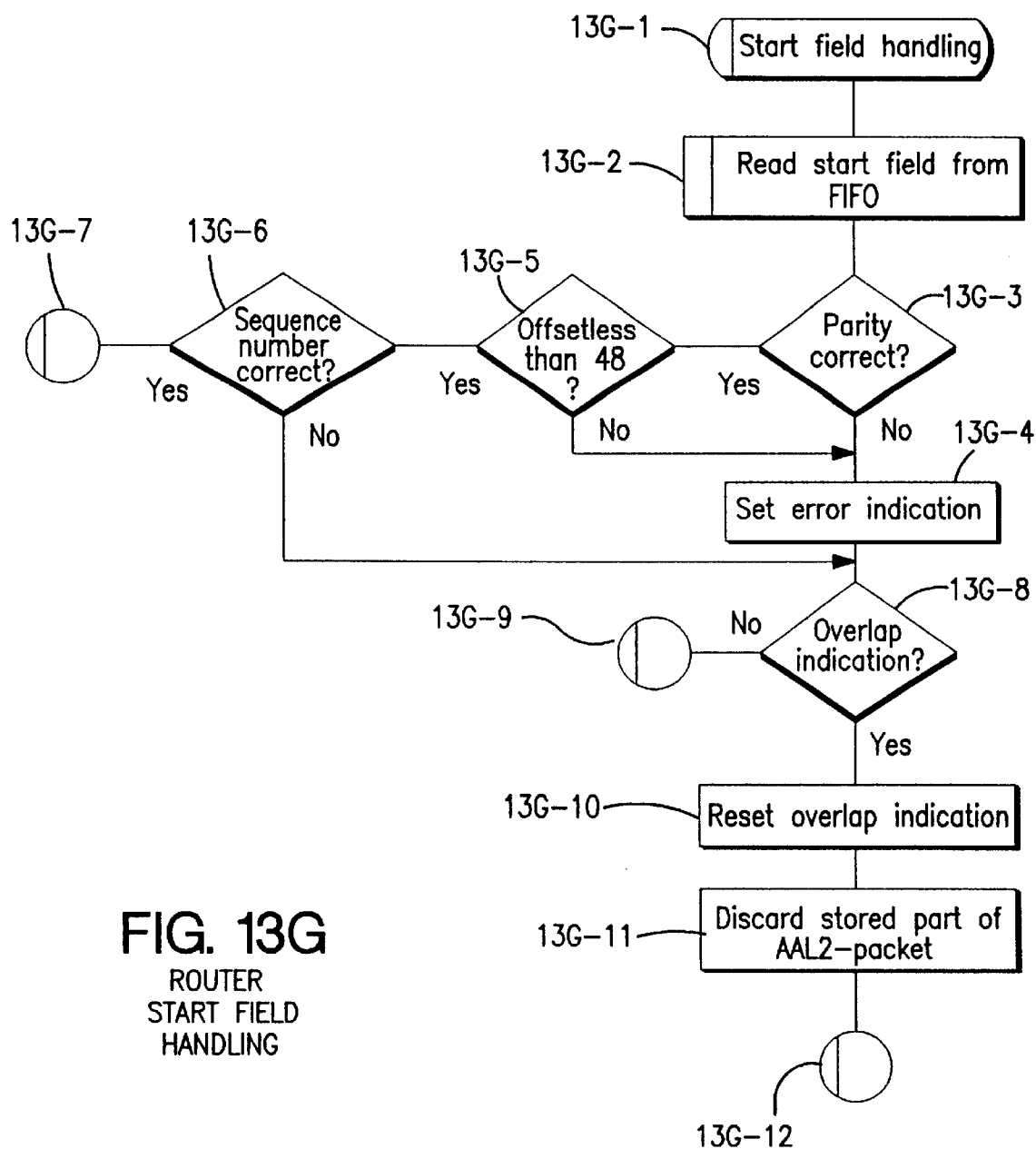
FIG. 13G is a flowchart showing general steps performed by a Start Field Handling function of the cell handling unit of FIG. 11.

The Start Field Handling function serves to check the start offset (see FIG. 3 and FIG. 3A) of an ATM cell having AAL2 packets. The Start Field Handling function is called at step 13F-2 of AAL2 Demultiplexing function 268 (see FIG. 13F). The Start Field Handling function has general steps which are depicted in FIG. 13G.

The beginning of the Start Field Handling function is depicted by symbol 13G-1. Step 13G-2 involves reading the start field 24 from the next awaiting cell in incoming cell FIFO 250 of switch port interface circuit (SPIC) 210. At step 13G-3 the parity of the start field is checked. If the parity of the start field is not correct, an error indication is set as shown at step 13G-4. If the parity is correct, at step 13G-5 a check is made to determine that the offset value is less than forty eight. If the offset value is not less than forty eight, the error indication is set at step 13G-4. If the offset value is less than forty eight, a last check is made at step 13G-6 whether the sequence number is correct. If the sequence number is correct, the Start Field Handling function exits as depicted by symbol 13G-7.

If the Start Field Handling function determines that the sequence number is not correct, inquiry is made at step 13G-8 whether the overlap indication has been set. The overlap indication could have been set by a previous execution of step 13F-14 (see FIG. 13F). If there is no overlap indication set, Start Field Handling function exits as indicated by symbol 13G-9. If the overlap indication has been set step 13G-10 involves resetting the overlap indication. Then, at step 13G-11, the stored part of the AAL2 packet is discarded before existing from the Start Field Handling function (step 13G-12).

CELL ROUTER OPERATION: OVERLAP HANDLING FUNCTION

Figure 13H:
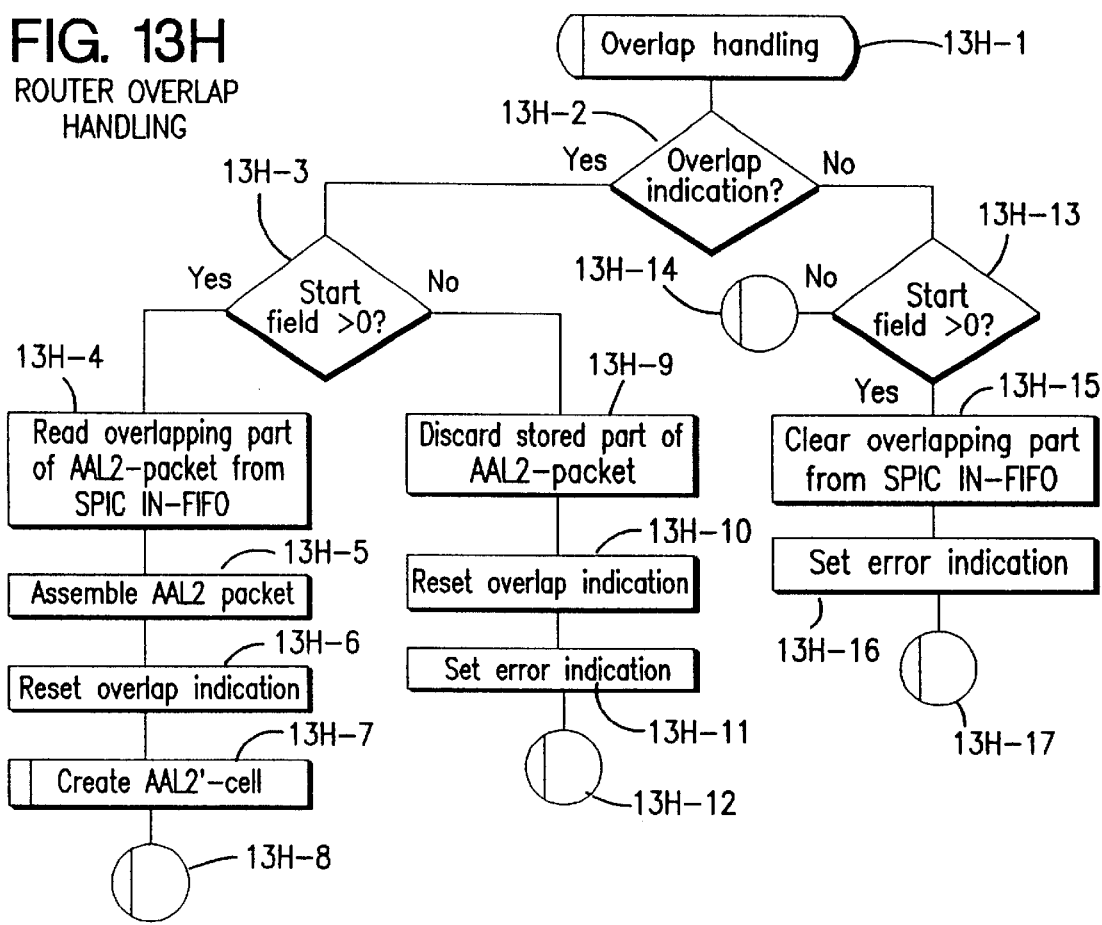
FIG. 13H is a flowchart showing general steps performed by a Overlap Handling function of the cell handling unit of FIG. 11.

The Overlap Handling function, called at step 13F-7 of AAL2 Demultiplexing function 268 (see FIG. 13F), has general steps which are depicted in FIG. 13H. The beginning of the Overlap Handling function is depicted by symbol 13H-1. At step 13H-2 inquiry is made at step 13G-8 whether the overlap indication has been set. The overlap indication could have been set by a previous execution of step 13F-14 (see FIG. 13F).

If there is an overlap indication set, step 13H-3 of the Overlap Handling function is performed. At step 13H-3, it is determined whether the start field of the next awaiting cell in incoming cell FIFO 250 of switch port interface circuit (SPIC) 210 is greater than zero. If the start field is determined at step 13H-3 to be greater than zero, step 13H-4 through step 13H-7 are performed prior to the Overlap Handling function being exited (as indicated by symbol 13H-8). At step 13H-4, the overlapping part of the AAL2 packet is read from incoming cell FIFO 250. Then, at step 13H-5, the AAL2 packet is assembled. Step 13H-6 involves resetting the overlap indication. Then, at step 13H-7, the Create AAL2' Cell function is called. The Create AAL2' Cell function is described in more detail subsequently in connection with FIG. 13J. Upon exiting from the Create AAL2' Cell function, the Overlap Handling function is exited (symbol 13H-8).

If the overlap indication has been set but the start field is not greater than zero, step 13H-9 is performed. At step 13H-9, the stored part of the AAL2 packet is discarded. At step 13H-10 the overlap indication is reset, and an error indication is set at step 13H-11 prior to exiting of the Overlap Handling function as depicted by symbol 13H-12.

When the Overlap Handling function determines that the overlap indication has not been set, a check is made at step 13H-13 whether the start field is greater than zero. If the start field is not greater than zero, the Overlap Handling function is exited as depicted by symbol 13H-14. Otherwise, at step 13H-15, the overlapping part of the packet is cleared from incoming cell FIFO 250 and an error indication set at step 13H-16 prior to exiting of the Overlap Handling function (as indicated by symbol 13H-7).

CELL ROUTER OPERATION: READ AAL2 PACKET FUNCTION

Figure 13I:
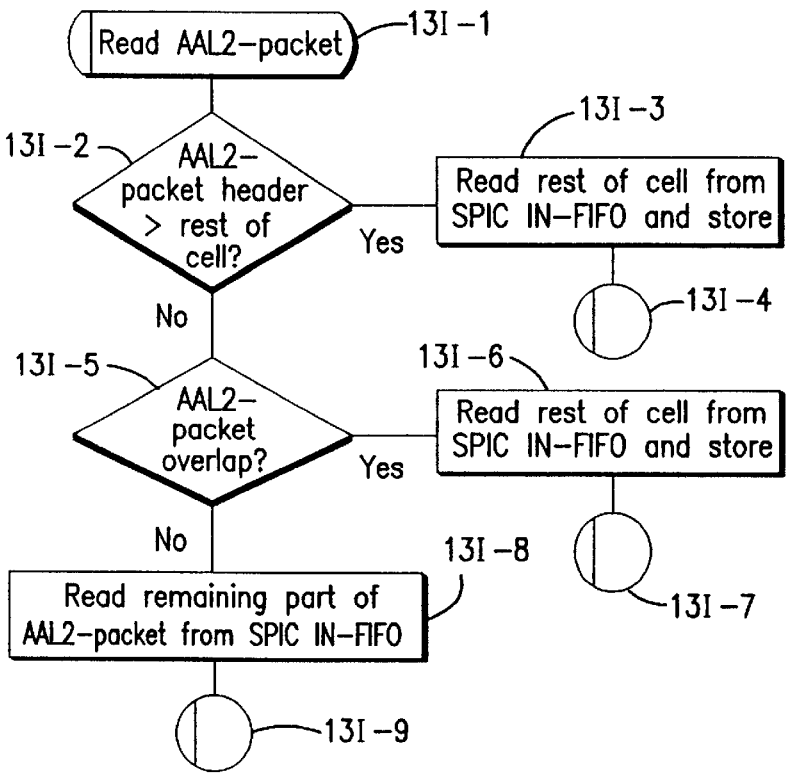
FIG. 13I is a flowchart showing general steps performed by a Read AAL2 Packet function of the cell handling unit of FIG. 11.

The Read AAL2 Packet function, called at step 13F-12 of AAL2 Demultiplexing function 268 (see FIG. 13F), has general steps which are depicted in FIG. 13I. The beginning of the Read AAL2 Packet function is depicted by symbol 13I-1. Step 13I-2 it is determined whether the AAL2 packet header is greater than the remainder of the ATM cell. If the determination of step 13I-2 is affirmative, the rest of the cell is read from incoming cell FIFO 250 at step 13I-3 and stored (in an allocated memory space [of 47 octet length] for overlapping AAL2 packets) prior to exiting of the Read AAL2 Packet function as shown by symbol 13I-4. On the other hand, if the AAL2 packet header is not greater than the remainder of the ATM cell, a determination is made at step 13I-5 whether there is an AAL2 packet overlap by checking an overlap indicator. The overlap indicator is set in a data structure holding an instance of the demultiplexing object. If it is determined at step 13I-5 that an AAL2 packet overlap exists, the rest of the cell is read from incoming cell FIFO 250 at step 13I-6 so that the AAL2 packet can be reassembled and sent in a cell with the AAL2 prime format prior to exiting of the Read AAL2 Packet function as shown by symbol 13I-7. In the case of no AAL2 packet overlap, the remaining part of the AAL2 packet is read from incoming cell FIFO 250 prior to exiting of the Read AAL2 Packet function as depicted by symbol 13I-9.

CELL ROUTER OPERATION: CREATE AAL2 CELL FUNCTION

Figure 13J:
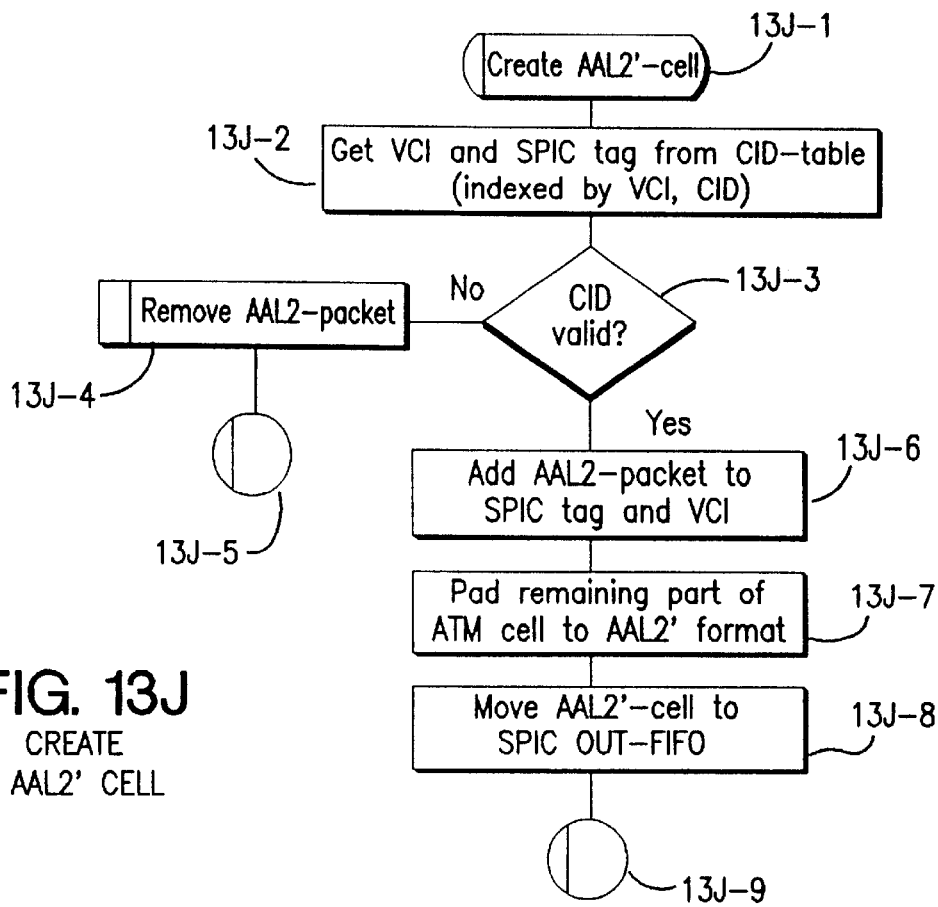
FIG. 13J is a flowchart showing general steps performed by a Create AAL2' Cell function of the cell handling unit of FIG. 11.

The Create AAL2 Cell function is called at step F13-16 of AAL2 Demultiplexing function 268 (see FIG. 13F) and at step 13H-7 of Overlap Handling function [see FIG. 13H]. The Create AAL2 Cell function has general steps which are depicted in FIG. 13J.

The beginning of the Create AAL2 Cell function is depicted by symbol 13J-1. Step 13J-2 the Create AAL2' Cell function obtains the new VCI and new SPIC tag from the CID table. The CID table is indexed by both VCI and CID. If the CID is not valid (determined at step 13J-3), the Remove AAL2 Packet function is invoked prior to exiting from the Create AAL2' Cell function (as indicated by step 13J-5). If the CID is valid, at step 13J-6 the AAL2 packet is added to the new SPIC tag and new VCI to form a new ATM cell. Since the new ATM cell formed by the Create AAL2' Cell function has the AAL2 prime protocol, the remainder of the payload is padded with zeroes at step 13J-7. Then, at step 13J-8, the newly created AAL2 prime cell is moved to outgoing cell FIFO 252 prior to exiting from the Create AAL2' Cell function as indicated by step 13J-9.

CELL ROUTER OPERATION: REMOVE ATM CELL FUNCTION

Figure 13K:
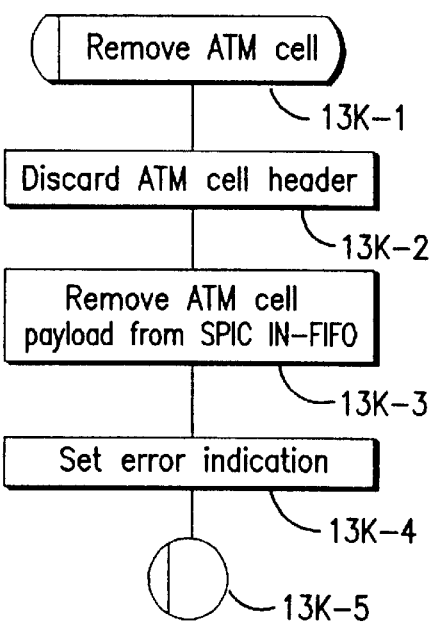
FIG. 13K is a flowchart showing general steps performed by a Remove ATM Cell function of the cell handling unit of FIG. 11.

The Remove ATM Cell function basically serves to remove the next awaiting ATM cell in incoming cell FIFO 250 if that cell has an invalid VCI or the connection is not established. The Remove ATM Cell function is called at step 13B-7 of ATM demultiplexing function 260 (see FIG. 13B) and step 13F-4 of AAL2 Demultiplexing function 268 (see FIG. 13F). The Remove ATM Cell function has general steps which are depicted in FIG. 13K.

The beginning of the Remove ATM Cell function is depicted by symbol 13K-1. Step 13K-2 involves discarding the header of the next awaiting ATM cell in incoming cell FIFO 250. Then, at step 13K-3, the payload of the next awaiting ATM cell is removed from incoming cell FIFO 250. An error indication is set (step 13K-4) before the Remove ATM Cell function is exited (as depicted by step 13K-5).

CELL ROUTER OPERATION: REMOVE AAL2 PACKET FUNCTION

Figure 13L:
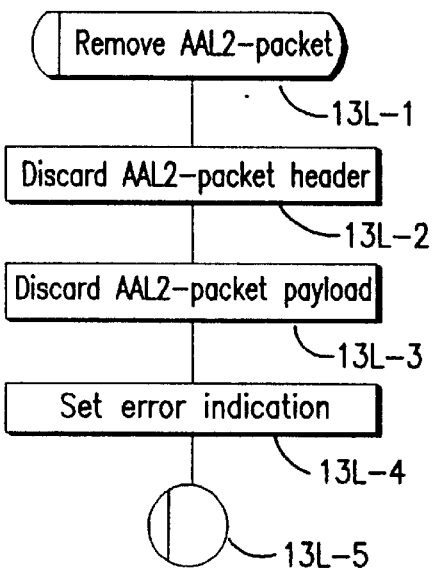
FIG. 13L is a flowchart showing general steps performed by a Remove AAL2 Packet function of the cell handling unit of FIG. 11.

The Remove AAL2 Packet function basically serves to remove an AAL2 packet in the next awaiting ATM cell in incoming cell FIFO 250 if that cell has an invalid VCI, or if the packet has an invalid CID, or if the connection is not established. The Remove AAL2 Packet function, called at step 13J-4 of Create AAL2' Cell function [see FIG. 13J], has general steps which are depicted in FIG. 13L. The beginning of the Remove AAL2 Packet function is depicted by symbol 13L-1. Step 13L-2 involves Remove AAL2 Packet function discarding the header of the AAL2 packet of the next awaiting ATM cell in incoming cell FIFO 250. At step 13L-3 the payload of the AAL2 packet of the next awaiting cell is discarded. Then, an error indication is set at step 13L-4 prior to the Remove AAL2 Packet function being exited as indicated by step 13L-5.

QUEUE SERVER OPERATION: SCHEDULER FUNCTION

Various functions of cell router 220 have been described above. Next described are functions performed by queue server 230. The Queue Server Scheduler function 283 of queue server 230 has basic steps illustrated in FIG. 14. After a reset (indicated by step 14-1) and booting, loading, and initializing (reflected by step 14-2), a loop beginning with step 14-3 is repetitively executed.

At step 14-3 Queue Server Scheduler function 283 of queue server 230 determines whether it is time to transmit a cell via out-buffer memory 244 to cell router 220. In particular, at step 14-3 the Queue Server Scheduler function 283 checks whether the cell transmission rate on any of the physical links now permits discharge of an ATM cell from in-buffer memory 242 destined for that physical link. If it is not time to transmit a cell, at step 14-4 the Queue Cell/Packet function 284 is invoked to read an internal interface packet 246 (e.g., an ATM cell or AAL2 packet) from in-buffer memory 242, and e.g., to move the internal interface packet 246 into an appropriate one of the FIFOs 312 or 320. The appropriate one of the FIFOs 312 or 320 is specified in the internal interface header IIH accompanying that internal interface packet 246 (described in more detail in connection with FIG. 14A).

Step 14-3's checking of the cell transmission rate and determining whether to permit discharge of an ATM cell from in-buffer memory 242 is described in more detail subsequently in connection with a Link Rate Counter function. If it is determined at step 14-3 that it is time for a particular physical link (via its extension terminal ET) to accept an ATM cell, the Queue Server Scheduler function 283 obtains at step 14-5 an indication of particular one of the link multiplexers 280 corresponding to the time-eligible extension terminal ET. Then, the link multiplexer 280 for time-eligible ET link is checked at step 14-6 to ascertain whether its queues (e.g., input FIFOs 312 and ATM cell input FIFOs 320) are loaded in order to form a cell. If the determination at step 14-6 is affirmative, the Multiplexing function 286 is invoked at step 14-7. Invocation of the Multiplexing function 286, which calls other functions, ultimately results in preparation of an ATM cell from the link multiplexer 280 corresponding to the time-eligible extension terminal ET link, and discharge of that ATM cell from out-buffer memory 244.

If it is determined at step 14-6 that the queues of the selected link multiplexer 280 are not ready, a slice of the background is executed (as indicated by step 14-8) prior to looping back to step 14-3.

Thus, Queue Server Scheduler function 283 serves to supervise the queuing of cells within the link multiplexers 280. In connection with the queuing supervision, Queue Server Scheduler function 283 calls upon the Queue Cell/Packet function 284. In connection with the governing of cell transmission to cell router 220, the Queue Cell/Packet function 284 calls upon the Multiplexing function 286.

QUEUE SERVER OPERATION: QUEUE CELL/PACKET FUNCTION

All internal interface packages 246 received from functions of cell router 220 (e.g., from AAL2' mapping function 262 and ATM mapping function 264) are stored in-buffer memory 242. From in-buffer memory 242 the cells/packets are distributed to an appropriate one of the link multiplexers 280 based on the internal interface header IIH carried with the internal interface packet.

Figure 14A:
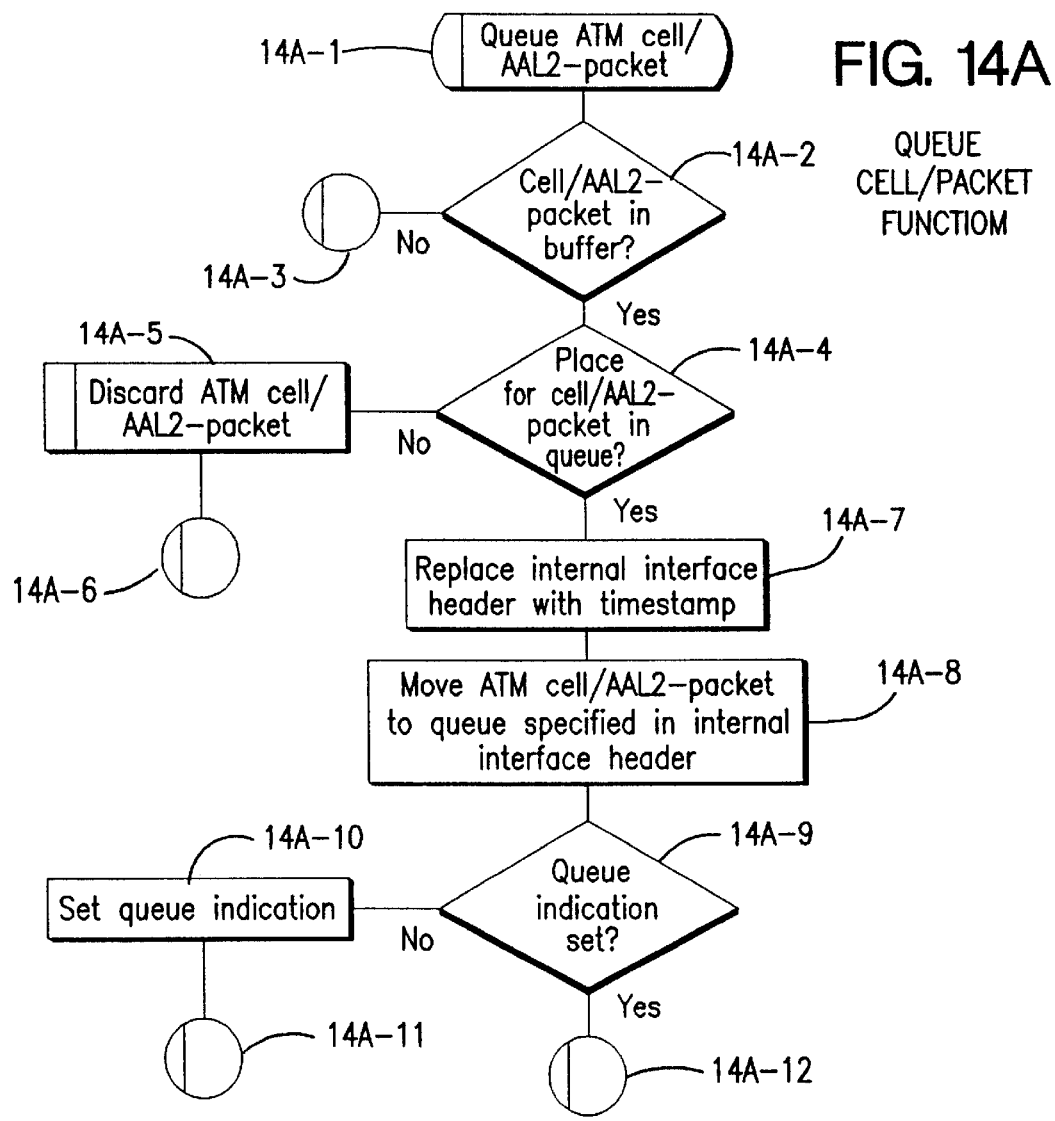
FIG. 14A is a flowchart showing general steps performed by a Queue Cell/Packet function of the queue server of FIG. 11.

Basic steps of Queue Cell/Packet function 284 are shown in FIG. 14A. Symbol 14A-1 reflects initiation of the Queue Cell/Packet function 284. Step 14A-2 shows Queue Cell/Packet function 284 inquiring whether an internal interface package 246 (e.g., an internal interface header IIH with either an ATM cell or an AAL2 packet) is available from in-buffer memory 242 (see FIG. 11). If no internal interface package 246 is available, Queue Cell/Packet function 284 exits as indicated by symbol 14A-3. If an internal interface package 246 is available from in-buffer memory 242, at step 14A-4 a determination is made whether to place the internal interface package 246 in one of the queues or FIFOs 312 or 320 (see FIG. 12). If the internal interface package 246 is not to be inserted into a queue or FIFO, an appropriate discard function is invoked at step 14A-5, i.e., either the Queue Discard ATM cell function (see FIG. 14I) or the Discard ATM AAL2 packet function (see FIG. 14J). Upon completion of the appropriate discard function, Queue Cell/Packet function 284 is exited as reflected by step 14A-6.

When an internal interface package 246 is to be queued by Queue Cell/Packet function 284, at step 14A-7 the internal interface header IIH which was included in the internal interface package 246 is replaced with a time stamp (TS) [see FIG. 12]. Then, at step 14A-8, the internal interface package 246 (including either a cell or packet) is moved to the appropriate one of the FIFOs, e.g., one of the input FIFOs 312 for an AAL2 packet or one of the ATM cell input FIFOs 320 for an ATM cell, as specified in the internal interface header of the appropriate one of the link multiplexers 280.

With respect to the substitution in step 14A-7 of a time stamp (TS) for the internal interface header IIH, the input FIFO 312 for service class 1 of the AAL2 VCI queuing unit $310_1$ in FIG. 12 shows that an internal interface package 246 containing an AAL2 packet has its internal interface header IIH replaced with time stamp TS and stored at the head of that input FIFO 312. In view of this operation, the Queue Cell/Packet function 284 is also known as the Time Stamping function. Although not shown as such in FIG. 12, it should be understood that each of the FIFOs 312 and 320 in FIG. 12 may have numerous internal interface packages 246 stored therein, with each of the internal interface packages 246 having a corresponding time stamp TS as the one indicated in FIG. 12. It should further be understood that the time stamp TS can be added to or concatenated with the internal interface package 246, and need not necessarily replace the internal interface header (IIH).

At step 14A-9 a check is made whether a queue indication (QI) has been set for the FIFO which received the cell or packet moved at step 14A-8. Each of FIFOs 312 and 320 in FIG. 12 are provided with a queue indication (QI), which is a bit corresponding to the associated FIFO stored in a memory.

The queue indication (QI) is set as long as the appropriate FIFO has at least one entry (e.g., a cell or packet, as the case may be). If the queue indication (QI) has not been set, the queue indication (QI) is set at step 14A-10 prior to exiting of Queue Cell/Packet function 284 (reflected by step 14A-11). If the queue indication (QI) has been set, the Queue Cell/Packet function 284 is simply exited at step 14A-12.

QUEUE SERVER OPERATION: MULTIPLEXING FUNCTION

Figure 14B:
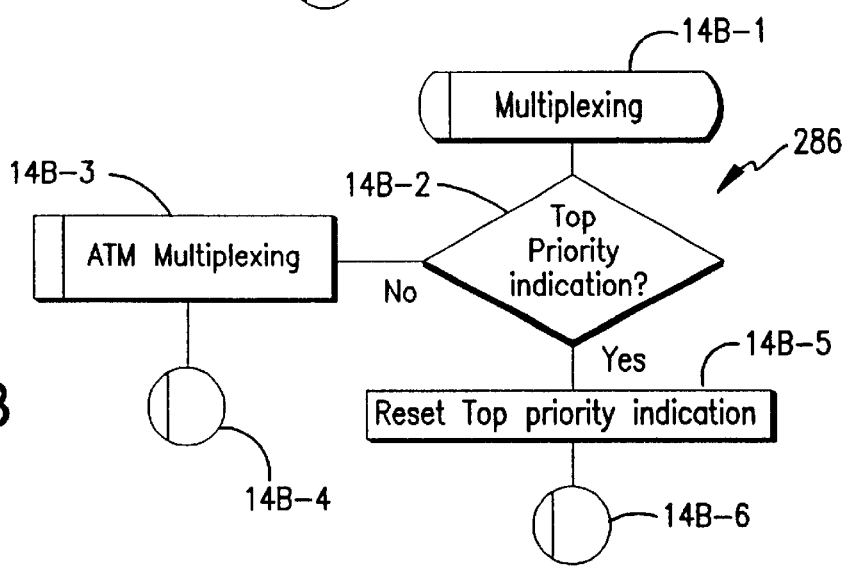
FIG. 14B is a flowchart showing general steps performed by a Multiplexing function of the queue server of FIG. 11.

Multiplexing function 286 is invoked by Queue Server Scheduler function 283 at step 14-7. Basic steps performed by Multiplexing function 286 are shown in FIG. 14B. Symbol 14B-1 reflects initiation of the Multiplexing function 286. Step 14B-2 inquires whether a top priority indication has been set (see top priority indication 322 in FIG. 12). A top priority indication for an ATM cell would have been indicated in in-buffer memory 242 at step 13E-6 of the top priority function 266 of cell router 220 (see FIG. 13E). If the top priority indication 322 has not been set, ATM Multiplexing function 288 is invoked at step 14B-3. ATM Multiplexing function 288 multiplexes ATM cells belonging to different quality classes on the ATM aspect 304, and calls the AAL2 Multiplexing function 290 for forming ATM cells with multiplexed AAL2 packets (the AAL2 aspect 302). Upon completion of ATM Multiplexing function 288, Multiplexing function 286 is exited as indicated by step 14B-4. If the top priority indication 322 has been set, at step 14B-5 the top priority indication 322 is reset prior to exiting from Multiplexing function 286 (as indicated by step 14B-6).

QUEUE SERVER OPERATION: ATM MULTIPLEXING FUNCTION

Figure 14C:
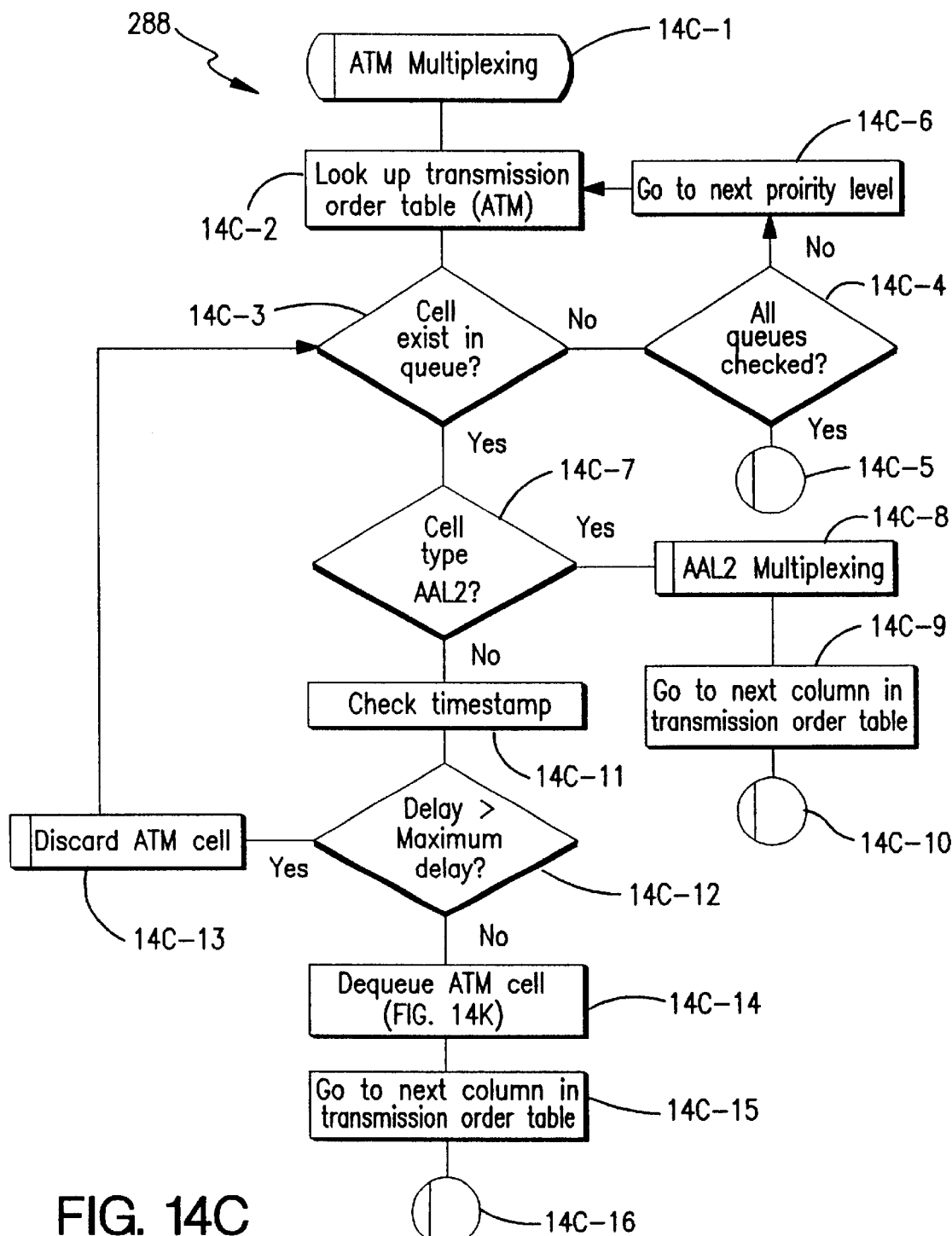
FIG. 14C is a flowchart showing general steps performed by a ATM Multiplexing function of the queue server of FIG. 11.

ATM Multiplexing function 288 is called by Multiplexing function 286 (see step 14B-3 of FIG. 14B). At the time that ATM Multiplexing function 288 has been invoked, Multiplexing function 286 has selected the particular link multiplexer 280 (serving a corresponding ET link) from which a cell is to be multiplexed out. Basic steps performed by ATM Multiplexing function 288 are shown in FIG. 14C.

Symbol 14C-1 reflects initiation of the ATM Multiplexing function 288. Step 14C-2 is the beginning of a potential loop. At step 14C-2, ATM Multiplexing function 288 consults the unload table 336 for the link multiplexer 280 (see FIG. 12), and particularly to the column thereof pointed to for this cell sending opportunity. Upon the first execution of step 14C-3, ATM Multiplexing function 288 checks for the highest priority level for the pointed-to column of the unload table 336 to determine if the FIFO thereof has a cell to unload. If a cell does not exist in the highest ranking FIFO of the highest priority level, other FIFOs of descending priority in the same column are checked for presence of a cell (with reference to the queue indication (QI)s for the FIFOs). For example, with reference to ATM multiplexer unload table 336 of FIG. 15A, if no internal interface package 246 is available in the input FIFO 312 for service class 1 of AAL2 VCI queuing unit 310, (corresponding to input "E" to ATM multiplexer 330 in FIG. 12), then a FIFO 312 corresponding to input "F" is checked until a FIFO with a set queue indication (QI) is found.

Thus, it is determined at step 14C-4 that the FIFO of the highest priority level of the pointed-to column does not have a cell present, ATM Multiplexing function 288 devolves to the next lower priority level of the same column as indicated by step 14C-6 and again consults ATM multiplexer unload table 336 (step 14C-2) to access the next lower priority level of the same column. For example, in the scenario of FIG. 15A, the FIFOs for service class 2 of the link multiplexer 280 of the pointed-to column is checked (shown in the second row of the unload table 336) for a loaded FIFO. Thus, the steps 14C-3 through step 14C-6 are repeated for the next lower priority level, looking for a FIFO with an internal interface package 246.

If it is finally determined at none of the FIFOs of the link multiplexer 280 has an internal interface package 246 present, ATM Multiplexing function 288 is exited as indicated by step 14C-5. However, if an internal interface package 246 is found in a FIFO in accordance with this strategy, step 14C-7 is performed.

At step 14C-7 it is determined whether the queue for which an internal interface package 246 was found to exist at step 14C-3 was a queue in AAL2 aspect 302 of queue server 230, i.e., one of the FIFOs 312 (see FIG. 12). If the ready queue is indeed one of the FIFOs 312 which handles AAL2 packets, the AAL2 Multiplexing function 290 is called (as indicated by step 14C-8) to form an ATM cell having multiple AAL2 packets. The ATM Multiplexing function 288 is discussed in further detail below in connection with FIG. 14D. Upon completion of the AAL2 Multiplexing function 290, ATM Multiplexing function 288 goes to the next column in unload table 336 (see FIG. 15A). Thus, a pointer set for the next call to this table, with processing resuming at this pointer for the next call of ATM multiplexing function 288. Thereafter, ATM Multiplexing function 288 exits as indicated by step 14C-10.

If the queue determined at step 14C-7 for which a cell is available is not an AAL2 queue, but instead is an ATM queue (i.e., one of queues 320), step 14C-11 is next performed. At step 14C-11, the time stamp TS of the next awaiting cell in the available queue (e.g., FIFO 320) is checked. As previously indicated, the time stamp TS provides an indication of the age of the content of cell in the queue next awaiting readout. At step 14C-12 the time stamp TS of the selected queue is compared with a value indicative of the current time. If the time stamp TS is older than the current time value by a predetermined amount, AAL2 Multiplexing function 290 realizes at step 14C-14 that the delay in the queue is greater than a predetermined maximum permissible delay.

If the delay is greater than permitted, at step 14C-13 the Discard ATM Cell function is invoked to delete the aged ATM cell. The Discard ATM Cell function is described with reference to FIG. 14I. If an aged cell is discarded by Discard ATM Cell function at step 14C-13, AAL2 Multiplexing function 290 loops back to step 14C-3 to see if another (hopefully more recent) cell exists in the same queue.

Figure 14D:
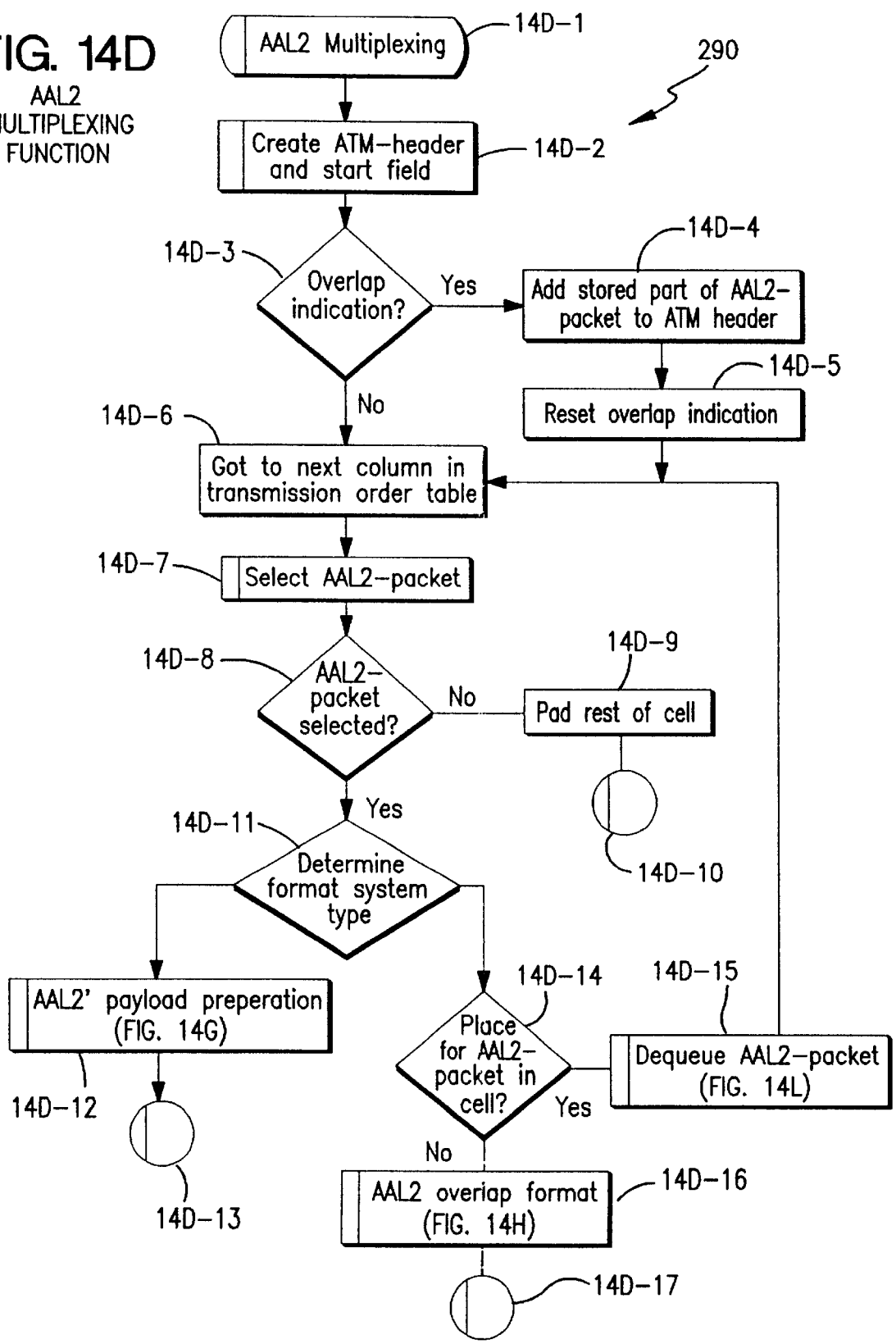
FIG. 14D is a flowchart showing general steps performed by a AAL2 Multiplexing function of the queue server of FIG. 11.
Figure 14E:
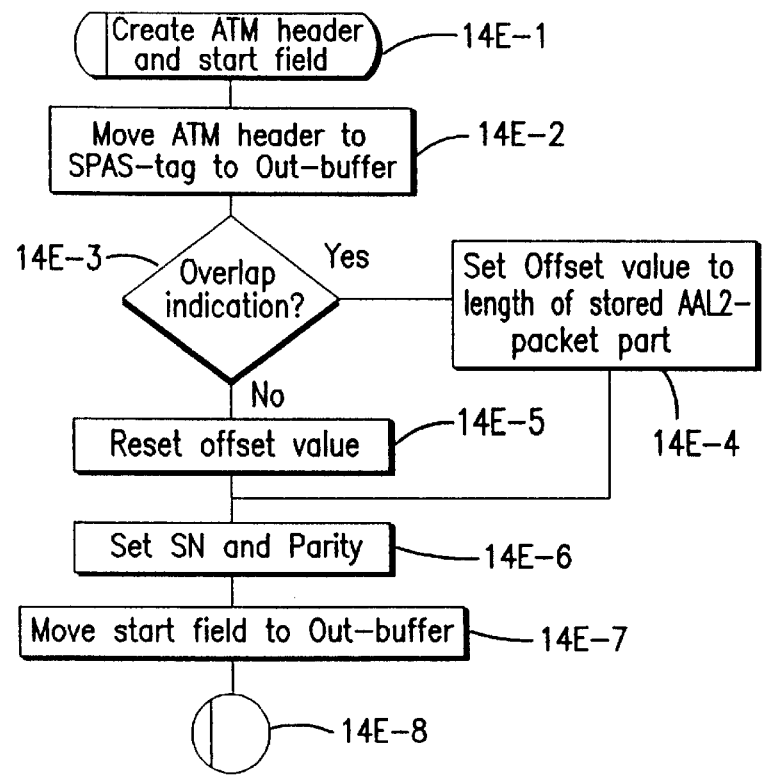
FIG. 14E is a flowchart showing general steps performed by a Create ATM Header and Start Field function of the queue server of FIG. 11.
Figure 14F:
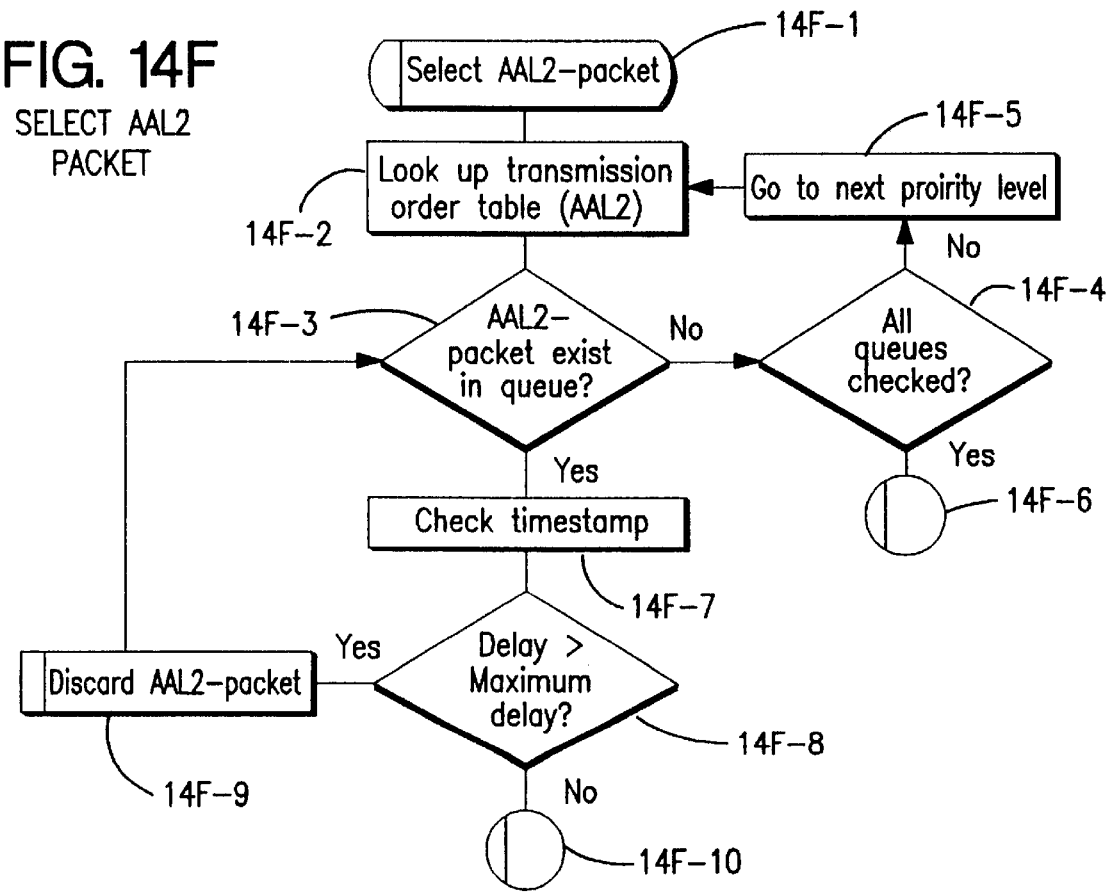
FIG. 14F is a flowchart showing general steps performed by a Select AAL2 Packet function of the queue server of FIG. 11.
Figure 14G:
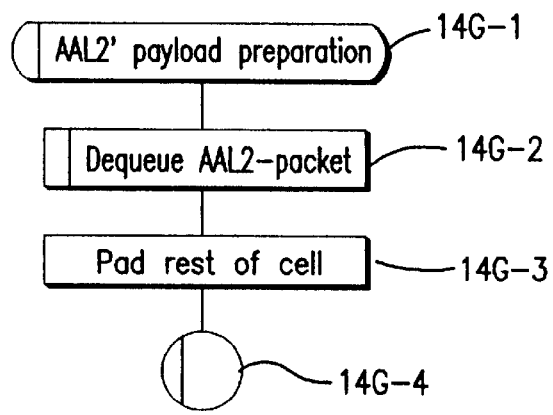
FIG. 14G is a flowchart showing general steps performed by a AAL2 Prime Payload Preparation function of the queue server of FIG. 11.
Figure 14H:
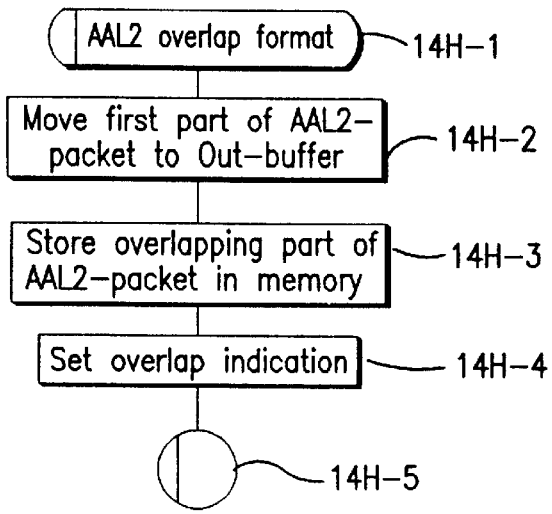
FIG. 14H is a flowchart showing general steps performed by a AAL2 Overlap Payload Preparation function of the queue server of FIG. 11.
Figure 14I:
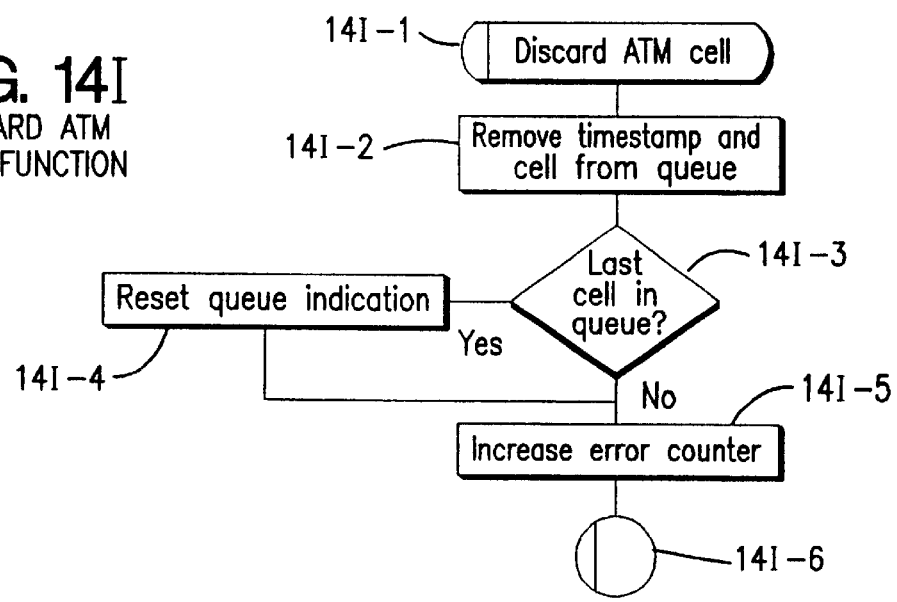
FIG. 14I is a flowchart showing general steps performed by a Discard ATM Cell function of the queue server of FIG. 11.
Figure 14J:
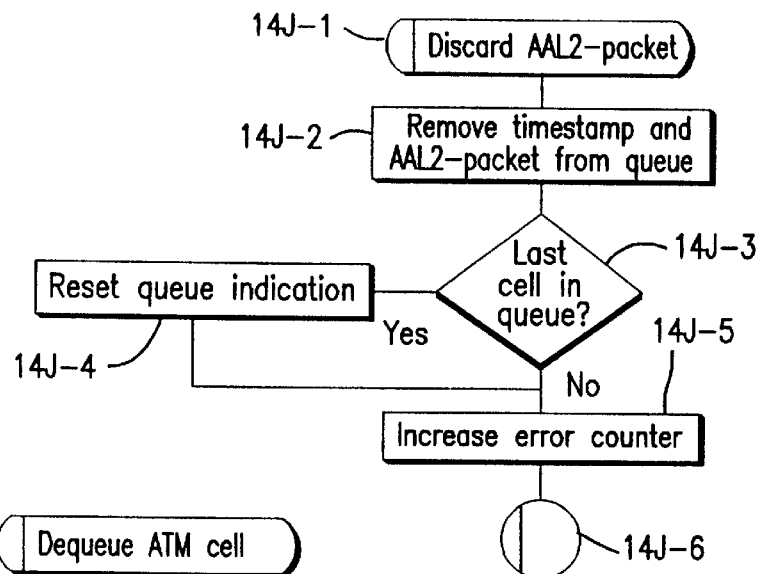
FIG. 14J is a flowchart showing general steps performed by a Discard AAL2 Packet function of the queue server of FIG. 11.
Figure 14K:
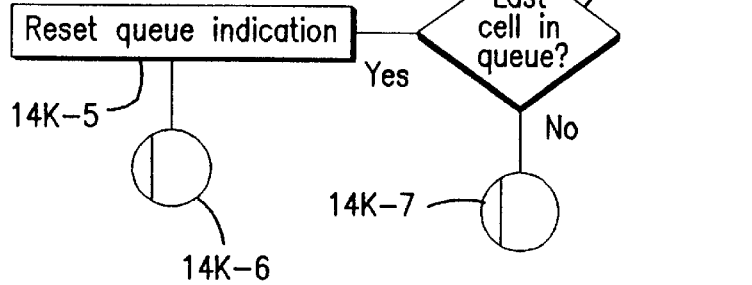
FIG. 14K is a flowchart showing general steps performed by a Dequeue ATM Cell function of the queue server of FIG. 11.

If it is determined at step 14C-12 that the cell in the selected queue is not excessively aged, the cell is dequeued at step 14C-14 by invocation of the Dequeue ATM Cell function (described in FIG. 14K). Dequeuing of the cell effectively moves the cell into outgoing ATM cell FIFO 340 (see FIG. 12). After dequeuing of the cell, AAL2 Multiplexing function 290 proceeds to the next column in unload table 316 (see FIG. 15B) prior to exiting (the exiting indicated by step 14C-16).

QUEUE SERVER OPERATION: AAL2 MULTIPLEXING FUNCTION

AAL2 Multiplexing function 290, called at step 14C-8 of ATM Multiplexing function 288 (see FIG. 14C), has the basic steps shown in FIG. 14D. Step 14D-1 reflects initiation of AAL2 Multiplexing function 290. AAL2 Multiplexing function 290 basically serves to multiplex AAL2 packets stored in the FIFOs 312 and belonging to different quality classes into ATM cells (see FIG. 12) having the AAL2 protocol. The multiplexing is performed according to unload table 316 (see FIG. 15B for an example).

Since AAL2 Multiplexing function 290 prepares an ATM cell having the AAL2 protocol, an ATM header and start field for the forming cell must be generated. To this end, at step 14D-2 the AAL2 Multiplexing function 290 calls the Create ATM-Header and Start Field function. Various details of the Create ATM-Header and Start Field function are shown in FIG. 14E and discussed hereinafter.

At step 14D-3 AAL2 Multiplexing function 290 inquires whether there is an overlap indication. An overlap indication exists when part of an AAL2 packet is stored in memory (there being a potential of one overlap indication per VCI). If an overlap indication exists, two actions are taken: (1) at step 14D-4 the stored part of the AAL2 packet is added to the ATM header created at step 14D-2; (2) at step 14D-5 the overlap indication is reset prior to performing step 14D-6.

At step 14D-6 an advancement is made to the next column in unload table 316 (see FIG. 15B). Then, for the purposes of obtaining an AAL2 packet, at step 14D-7 the Select AAL2 Packet function is executed. The Select AAL2 Packet function is described subsequently in more detail in conjunction with FIG. 14F. At step 14D-8, AAL2 Multiplexing function 290 determines whether calling of the Select AAL2 Packet function at step 14D-7 resulted in any AAL2 packet being selected (e.g., whether an AAL2 packet existed in any of the FIFOs 312). If no AAL2 packet existed, at step 14D-9 the rest of the ATM cell being formed is padded (e.g., filled with zeroes) prior to exiting of AAL2 Multiplexing function 290 (as indicated by step 14D-10).

If invocation of the Select AAL2 Packet function provided an AAL2 packet, at step 14D-11 a determination is made as to what type of format system is in effect. If the AAL2 prime format is in effect, i.e., if ATM cells with AAL2 prime protocol are being formed, at step 14D-12 the AAL2' Payload Preparation function is called prior to exiting of AAL2 Multiplexing function 290 (step 14D-13). The AAL2' Payload Preparation function, described in more detail in connection with FIG. 14G, essentially forms an ATM cell with the AAL2 prime protocol by moving an AAL2 packet from one of the FIFOs 312 to outgoing ATM cell FIFO 340 and padding the remainder of the cell with zeroes.

If it is determined at step 14D-11 that the AAL2 prime format is not in effect, at step 14D-14 a check is made whether there is a place in the ATM cell being formed for an AAL2 packet. If there is room for an AAL2 packet in the forming ATM cell, at step 14D-15 the Dequeue AAL2 Packet function is called prior to returning returning to step 14D-6 for moving to the next column in unload table 316. The Dequeue AAL2 Packet function is discussed in more detail in connection with FIG. 14L. If there is insufficient room in the forming ATM cell for an AAL2 packet, at step 14D-16 the AAL2 Overlap Format function is called prior to exiting from AAL2 Multiplexing function 290 (the exiting indicated by step 14D-17). The AAL2 Overlap Format function is described in more detail below with reference to FIG. 14H.

QUEUE SERVER OPERATION: CREATE ATM HEADER AND START FIELD FUNCTION

Basic steps involved with the Create ATM-Header and Start Field function are described in FIG. 14E. The Create ATM-Header and Start Field function is called by the AAL2 Multiplexing function 290 as shown by step 14D-2 of FIG. 14D. Initiation of the Create ATM-Header and Start Field function is reflected by symbol 14E-1. At step 14E-2, the Create ATM-Header and Start Field function moves a preconfigured ATM header (with VPI and VCI) and SPAS tag through multiplexer 330 to outgoing ATM cell FIFO 340 (see FIG. 12). The ATM header and SPAS flag are preconfigured when the connection is established, e.g., the connection between cell handling unit 44-32 and extension terminal 44-34. Then, at step 14E-3, a check is made whether the overlap indication is set. If the overlap indication is set, at step 14E-4 an offset value (OSF) [see FIG. 3A] is set to be equal to the length of the stored part of the AAL2 packet. If the overlap indication is not set, it is reset at step 14E-5. After either step 14E-4 or step 14E-5, the cell sequence number (SN) and parity (P) [see FIG. 3A] are generated at step 14E-6. Then, at step 14E-7, the entire start field—the offset value (OSF), the sequence number (SN), and parity (P)—are moved to outgoing ATM cell FIFO 340.

QUEUE SERVER OPERATION: SELECT AAL2 PACKET FUNCTION

Basic steps involved in the Select AAL2 Packet function are shown in FIG. 14F. The Select AAL2 Packet function is called by AAL2 Multiplexing function 290 at step 14D-7 (see FIG. 14D). Operations performed by the Select AAL2 Packet function include (1) selecting from which quality class the next AAL2 packet should be extracted; and (2) checking the time stamp associated with the selected AAL2 packet to ensure that it is not too old. Initiation of the Select AAL2 Packet function is indicated by symbol 14F-1.

Step 14F-2 of the Select AAL2 Packet function involves consulting the unload table 316 (see FIG. 12 and FIG. 15B) to determine the next queue (e.g., one of the FIFOs 312) from which an AAL2 packet should be extracted in accordance with the strategy stored in the unload table 316. If it is determined at step 14F-3 that an AAL2 packet does not exist in the queue indicated by unload table 316, the queue of the next highest priority level (identified per unload table 316) is checked for a ready AAL2 packet. If the queue of the next highest priority level does not have a ready AAL2 packet, a devolution occurs to the next lower priority level (step 14F-5), and the loop commencing with step 14F-2 is again executed but with respect to the next lower priority level. If all queues of the pointed-to column are without an available AAL2 packet (determined at step 14F-4), the Select AAL2 Packet function is exited (indicated by step 14F-6).

When a queue with an available AAL2 packet is located at step 14F-3, the time stamp associated with the available AAL2 packet is examined at step 14F-7. If the time stamp indicates that the AAL2 packet is too old (step 14F-8), the Discard AAL2 Packet function is called at step 14F-9 for the purpose of discarding the excessively aged AAL2 packet. When an AAL2 packet is discarded, the Select AAL2 Packet function loops back to step 14F-3 to determine if another AAL2 packet is available in the same queue (FIFO 312). If the AAL2 packet residing in the queue determined at step 14F-3 is not too old, the Select AAL2 Packet function exits as indicated by step 14F-10.

QUEUE SERVER OPERATION: AAL2' FORMAT FUNCTION

Basic steps involved in the AAL2' Payload Preparation function are illustrated in FIG. 14G. The AAL2' Payload Preparation function is called at step 14D-12 of the AAL2 Multiplexing function 290 (see FIG. 14D). The AAL2' Payload Preparation function serves essentially to move an AAL2 packet from the selected one of the FIFOs 312 to outgoing ATM cell FIFO 340, and to pad the remainder of the ATM cell with zeroes. Initiation of the AAL2' Payload Preparation function is depicted by symbol 14G-1. Step 14G-2 involves calling the Dequeue AAL2 Packet function (which is described in more detail in connection with FIG. 14L. The Dequeue AAL2 Packet function serves to unload the AAL2 packet from the appropriate input FIFO 312 and move the unloaded AAL2 packet into outgoing ATM cell FIFO 340. After completion of the Dequeue AAL2 Packet function, the remainder of the ATM cell being formed in outgoing ATM cell FIFO 340 is padded (e.g., with zeroes) as indicated by step 14G-3. Then, at step 14F-4, the AAL2' Payload Preparation function is exited.

QUEUE SERVER OPERATION: AAL2 OVERLAP FORMAT FUNCTION

The AAL2 Overlap Format function has basic steps shown in FIG. 14H. In essence, the AAL2 Overlap Format function serves to split an AAL2 packet, putting the beginning of the AAL2 packet in an end of the ATM cell being formed in outgoing ATM cell FIFO 340 and storing the remainder of the AAL2 packet (the portion that would not fit in the ATM cell being formed) in a partial packet or overlap packet holding location in memory discussed above. Symbol 14H-1 reflects initiation of the AAL2 Overlap Format function. At step 14H-2, as much of the AAL2 packet as will fit at the end of the ATM cell being formed in outgoing ATM cell FIFO 340 is moved to outgoing ATM cell FIFO 340. Then, at step 14H-3, the remainder of the AAL2 packet (i.e., the part that would not fit in outgoing ATM cell FIFO 340), is stored in the partial packet holding location. Since an AAL2 packet is being split or overlapped into two cells, the overlap indication is set at step 14H-4 prior to exiting of the AAL2 Overlap Format function (as indicated by step 14H-5).

QUEUE SERVER OPERATION: DISCARD ATM CELL FUNCTION

The Discard ATM Cell function has basic steps described in FIG. 14I. The Discard ATM Cell function is called either from step 14A-5 of the Queue ATM Cell/AAL2 Packet Function 284 (see FIG. 14A) or step 14C-13 of the ATM Multiplexing function 288 (see FIG. 14C). The Discard ATM Cell function serves to discard an ATM cell due to excessive delay or overflow in the particular queue (e.g., one of the FIFOs 320) for which the Discard ATM Cell function was called. Initiation of the Discard ATM Cell function is depicted by symbol 14I-1. At step 14I-2, the Discard ATM Cell function removes the time stamp and next awaiting cell from the particular queue 320 for which the Discard ATM Cell function is called. If it is determined at step 14I-3 that the discarded cell was the last in that FIFO 320, the queue indication (QI) for that FIFO is reset at step 14I-4. Then, at step 14I-5, an error counter is incremented for the queue (e.g., FIFO 320) for which an ATM cell was discarded. The Discard ATM Cell function is then exited as indicated by step 14I-6.

QUEUE SERVER OPERATION: DISCARD AAL2 PACKET FUNCTION

The basic steps of Discard AAL2 Packet function are shown in FIG. 14J. The Discard AAL2 Packet function is called either at step 14A-5 of Queue ATM Cell/AAL2 Packet Function 284 (see FIG. 14A) or step 14F-9 of the Select AAL2 Packet function (see FIG. 14F). The Discard AAL2 Packet function serves to discard an AAL2 packet due to excessive delay or overflow in the particular queue (e.g., one of the FIFOs 312) for which the Discard ATM Cell function was called. Steps 14J-1 through 14J-6 of the Discard AAL2 Packet function are analogous to steps 14I-1 through 14I-6, respectively, of the Discard ATM Cell function of FIG. 14J, it being understood that the Discard AAL2 Packet function pertains to AAL2 packets in FIFOs 312 rather than to ATM cells in FIFOs 320.

QUEUE SERVER OPERATION: DEQUEUE ATM CELL FUNCTION

The basic steps of Dequeue ATM Cell function are shown in FIG. 14K. The Dequeue ATM Cell function is called at step 14C-14 of the ATM Multiplexing function 280 (see FIG. 14). Initiation of the Dequeue ATM Cell function is depicted by step 14K-1. At step 14K-2, the time stamp is cleared for the queue (e.g., FIFO 320) selected at step 14C-3. Then, at step 14K-3, the ATM cell from the selected queue (e.g., FIFO 320) is moved through multiplexer 330 to outgoing ATM cell FIFO 340. If the ATM cell so moved is the last cell in the queue (determined at step 14K-4), the queue indication (QI) for that queue is reset (step 14K-5) prior to exiting from Dequeue ATM Cell function (depicted by step 14K-6). If the queue which contained the ATM cell moved to outgoing ATM cell FIFO 340 has further cells, the queue indication (QI) need not be reset, so exiting of the Dequeue ATM Cell function occurs as indicated by step 14K-7.

QUEUE SERVER OPERATION: DEQUEUE AAL2 PACKET FUNCTION

Figure 14L:
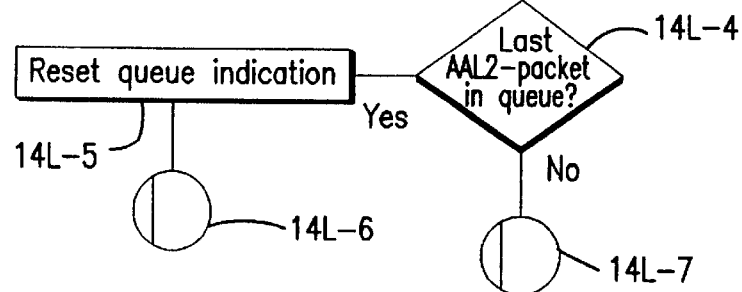
FIG. 14L is a flowchart showing general steps performed by a Dequeue AAL2 Packet function of the queue server of FIG. 11.

The basic steps of Dequeue AAL2 Packet function are shown in FIG. 14L. The Dequeue AAL2 Packet function is called either at step 14D-15 of the AAL2 Multiplexing function 290 (see FIG. 14D) or step 14G-2 of the AAL2' Payload Preparation function (see FIG. 14G). Steps 14L-I through 14L-7 of the Dequeue AAL2 Packet function are analogous to steps 14K-1 through 14K-7 of the Dequeue ATM Cell function of FIG. 14K, it being understood that the Dequeue AAL2 Packet function is called from different locations and involves AAL2 packets being moved out of FIFOs 312 rather than ATM cells being moved out of FIFOs 320.

CHU: SUMMARY OF OPERATIONS

The cell handling unit 32 thus performs many operations, including: (1) demultiplexing of incoming ATM cells having the AAL2 protocol (e.g., variable number of AAL2 packets in the ATM cell payload) into ATM cells having the AAL2 prime protocol; (2) queuing and multiplexing of ATM cells having the AAL2 prime protocol into ATM cells having the AAL2 protocol; (3) queuing of ATM cells; and (4) handling of top priority ATM cells. Each of these operations are summarized below with reference to the various functions detailed above.

OPERATION SUMMARY: DEMULTIPLEXING OF AAL2 PROTOCOL CELLS INTO AAL2 PRIME PROTOCOL CELLS

The demultiplexing of incoming ATM cells having the AAL2 protocol can occur, for example, when ATM cells with the AAL2 protocol are received at base station controller 44 from base station 42 over the super A interface 54 (see FIG. 5). In such an instance, the AAL2 packets need to be extracted into a cell format which can be switched through the ATM switch 44-30 to other units which do not handle ATM cells with multiple AAL2 packets (such as, for example, diversity handover (DHO) unit 60).

In the demultiplexing of incoming ATM cells having the AAL2 protocol, when it is determined at step 13-5 of the Router Scheduler function (see FIG. 13) that an incoming cell awaits in incoming cell FIFO 250 of switch port interface circuit (SPIC) 210, the ATM demultiplexing function 260 is called (step 13-6). After checking the validity of the incoming cell (at step 13B-6), and (at step 13B-9) determining that the incoming cell has the AAL2 protocol in need of demultiplexing, the AAL2 Demultiplexing function 268 is called at step 13B-13. The AAL2 Demultiplexing function 268 (see FIG. 13F) checks the start field in the payload of the incoming ATM cell by calling the Start Field Handling function (see FIG. 13G). Further, it is determined (by calling [at step 13F-7] the Overlap Handling function [see FIG. 13H] whether the overlap indication has been set, thereby indicating that AAL2 packet contents partially resident in a previous incoming ATM cell has yet to be handled.

Assuming no overlap indication has been set, the AAL2 Demultiplexing function 268 (see FIG. 13F) processes one or more whole AAL2 packets residing in the payload of the incoming ATM cell. Each whole AAL2 packet is processed by a loop of operations commencing at step 13F-8. In processing an AAL2 packet, at step 13F-12 the AAL2 Demultiplexing function 268 reads the AAL2 packet by calling the Read AAL2 Packet function (see FIG. 13I). The Create AAL2' Cell function is then called (step 13F-16) to form an AAL2 prime protocol payload using the AAL2 packet read at step 13F-12.

The Create AAL2' Cell function (see FIG. 13J) serves to get a new VCI and SPIC tag for the ATM cell being formed by consulting combined VCI/CID table 272 (see step 13J-2, and also FIG. 18, FIG. 19A, and FIG. 19B) using the CID value in the AAL2 packet header. At step 13J-6 the Create AAL2' Cell function adds the AAL2 packet obtained at step 13F-12 to the new VCI and SPIC tag to form an AAL2 prime payload, and at step 13J-7 pads the remainder of the payload. The ATM cell with the thusly-constructed AAL2 prime protocol payload is then moved to outgoing cell FIFO 252 (step 13J-8).

The procedure of processing AAL2 packets residing in the incoming ATM cell continues to the end of the incoming cell (as determined at step 13F-17), creating a new ATM cell with AAL2 prime protocol for each AAL2 packet. However, if the incoming ATM cell with AAL2 protocol ends with an incomplete AAL2 packet, an overlap indication is set (step 13F-14). Setting of the overlap indication sets up a situation in which the incomplete AAL2 packet can be completed and reassembled by the Overlap Handling function upon receipt of a subsequent ATM cell with AAL2 protocol.

As indicated above, an overlap could occur if the payload of the incoming ATM cell begins with a portion of a packet which bridged this incoming ATM cell and a previous ATM cell. If there is an overlap indication, the Overlap Handling function (FIG. 13H) performs various operations. Among these operations are: (1) reading (at step 13H-4) the overlapping part of the AAL2 packet from incoming cell FIFO 250; (2) assembling (at step 13H-5) the AAL2 packet using the part read at step 13H-4 and a part stored from a previous ATM cell; and (3) calling (at step 13H-7) the Create AAL2' Cell function. Concerning an overlap indication, the Create AAL2' Cell function performs in similar manner as with whole packets, it being understood that the ATM payload built at step 13J-6 thereof involves adding the new VCI and SPIC tag obtained at step 13H-2 to a payload formed from the portion of the AAL2 packet left over from the previous ATM cell and the portion of the AAL2 packet obtained at the beginning of the ATM cell awaiting in FIFO 250.

In the event that an AAL2 packet header is split between two ATM cells, the Read AAL2 Packet function (see FIG. 13I) is invoked.

OPERATION SUMMARY: MULTIPLEXING OF AAL2 PACKETS INTO AN ATM CELL

There are times when an ATM cell with AAL2 prime protocol is received at a node, and the whole packet(s) in the payload of the received cell must be multiplexed into ATM cells with AAL2 protocol. Such can occur, for example, for ATM cells with AAL2 prime protocol received at base station controller 44 from mobile switching center (MSC) 46 over interface 58 (see FIG. 5). The payloads of these ATM cells with AAL2 prime protocol packets must be multiplexed into ATM cells with AAL2 packets for application over interface 54 to the base stations 42.

When it is determined at step 13-5 of the Router Scheduler function (see FIG. 13) that an incoming cell awaits in incoming cell FIFO 250 of switch port interface circuit (SPIC) 210, the ATM demultiplexing function 260 is called (step 13-6). After checking the validity of the incoming cell (at step 13B-6), and (at step 13B-9) determining that the incoming cell has the AAL2 prime protocol with an AAL2 packet in need of multiplexing, the AAL2' Mapping function is invoked at step 13B-10.

AAL2' mapping function 262 (see FIG. 13C) essentially creates an internal interface package 246 (which includes the AAL2 packet which needs to be multiplexed) for transmission to queue server 230. In so doing, AAL2' mapping function 262 obtains an internal interface header (IIH) from combined VCI/CID table 272, using the VCI of the incoming ATM cell as an index (step 13C-3). The internal interface header (IIH) and the AAL2 packet from the AAL2 prime protocol cell are assembled to form the internal interface package 246, which is written to in-buffer memory 242 (step 13C-6) so that it can be available to queue server 230.

Queue server 230 functions to multiplex the AAL2 packet stored in the internal interface package 246 in-buffer memory 242 into an ATM cell with AAL2 format, and to provide the ATM cell with AAL2 format with a header that will direct the ATM cell to a specified ET link (see FIG. 5). The ATM cell is formed in outgoing ATM cell FIFO 340 of the link multiplexer 280 corresponding to the specified ET link, the outgoing ATM cell FIFO 340 being included in out-buffer memory 244.

When it is time for an internal interface package 246 to be transmitted from in-buffer memory 242 to queue server 230 (determined at step 14-3), the Queue ATM Cell/AAL2 Packet function is invoked (see FIG. 14A). In accordance with the outgoing VCI to be assigned to the ATM cell bearing the AAL2 packet, the internal interface package 246 is directed to one of the AAL2 VCI queuing units 310. In view of the service class associated with the internal interface package 246, the internal interface package 246 is stored in a class-specific one of the input FIFOs 312 in the AAL2 VCI queuing unit 310 to which it is directed (see FIG. 12). When the internal interface package 246 is stored into an appropriate one of the input FIFOs 312, a current time stamp (TS) value replaces the internal interface header (IIH).

When an ATM cell is to be constructed from AAL2 packets contained in the internal interface packages 246 stored in the input FIFOs 312, the Queue Server Scheduler calls the Multiplexing function at step 14-7, which in turn calls the ATM Multiplexing function of FIG. 14C. The ATM Multiplexing function checks the unload table 336 to determine when the particular AAL2 VCI queuing unit 310 in which the internal interface package 246 has been stored is to be tapped for unloading (see step 14C-7). When it is determined that an AAL2 packet contained in an internal interface package 246 is to be unloaded, the AAL2 Multiplexing function is invoked at step 14C-8. The AAL2 Multiplexing function (see FIG. 14D) proceeds to form an ATM header for the newly forming cell by calling the Create ATM Header and Start Field function (see FIG. 14E). The unload table 316 is then consulted for determining the particular input FIFO 312 next to be unloaded for the tapped AAL2 VCI queuing unit 310. It is assumed at this juncture that an internal interface package 246 does reside in the selected input FIFO 312 (based on the queue indication [QI]), and that the internal interface package 246 is not excessively aged (see step 14F-8).

When a input FIFO 312 has been selected in the manner described above, the AAL2 Multiplexing function determines (step 14D-4) whether the cell being formed has enough room in its payload to accommodate the AAL2 packet of the internal interface package 246. When room does exist, the AAL2 packet of the internal interface package 246 is unloaded from the input FIFO 312 (by calling the Dequeue AAL2 Packet function [see FIG. 14L]). Unloading of the AAL2 packet involves moving the AAL2 packet into outgoing ATM cell FIFO 340 where the cell is being formed, clearing the time stamp (TS) associated with the internal interface package 246, and determining whether the queue indication need be set for the FIFO 312 from which the AAL2 packet was unloaded (see FIG. 14L). The AAL2 Multiplexing function then continues to fill the payload of the cell being formed until the AAL2 packet of the next internal interface package 246 will not entirely fit within the ATM cell being formed. When the fit is not exact, AAL2 Multiplexing function calls the AAL2 Overlap Format function at step 14D-16. The AAL2 Overlap Format function (see FIG. 14H) moves the part of the AAL2 packet which will fit into the payload into the payload, and stores the remainder for use with a subsequent ATM cell.

Thus, queue server 230 forms, in outgoing ATM cell FIFO 340 of the link multiplexer 280 corresponding to the selected ET link, an outgoing ATM cell having AAL2 protocol, the outgoing ATM cell being formed from AAL2 packets received in incoming ATM cells having the AAL2 prime protocol. The thusly-formed ATM cell, stored in outgoing ATM cell FIFO 340, is taken out of outgoing ATM cell FIFO 340 when the Router Scheduler function determines (at step 13-3) that such ATM cell is to be transmitted to it from queue server 230. To do so, the Router Scheduler function calls the Transfer Cell function (see FIG. 13A), which selects the particular link multiplexer 280 from which an ATM cell is to be extracted and moves such ATM cell to outgoing cell FIFO 252.

OPERATION SUMMARY: QUEUING OF ATM CELLS

Some ATM cells need not be multiplexed or demultiplexed prior to being directed further through the ATM switch 30, e.g., in route to another board attached to the ATM switch 30 such as an ET board 34. Nevertheless, the cell handling unit 32 of the present invention provides a convenient and centralized pool for handling queuing operations for numerous ET links.

The manner in which cell router 220 provides an internal interface package 246 to queue server 230 is understood from the multiplexing discussion provided above, it being understood that the internal interface package 246 provided includes [along with the internal interface header (IIH)] an ATM cell rather than an AAL2 packet. In this respect, the Router Scheduler function (see FIG. 13) calls the ATM Demultiplexing function (see FIG. 13B), which at step 13B-11 calls the ATM Mapping function at step 13B-11. The ATM Mapping function (see FIG. 13D) creates the internal interface header (IIH), creates an new ATM header for the outgoing ATM cell (step 13D-3), and forms the internal interface package 246 using the payload of the incoming ATM cell, the new ATM header, and the internal interface header (IIH). The ATM Mapping function then moves the internal interface package 246 to in-buffer memory 242.

Queue server 230 functions to distribute the ATM cells stored in the internal interface package 246 in-buffer memory 242 into the queuing system shown in FIG. 12 for the appropriate one of the link multiplexers 280. As in the case of multiplexing, the ATM cell eventually resides in the outgoing ATM cell FIFO 340 for the appropriate link multiplexer 280.

When it is time for an internal interface package 246 to be transmitted from in-buffer memory 242 to queue server 230 (determined at step 14-3), the Queue ATM Cell/AAL2 Packet function is invoked (see FIG. 14A). In accordance with the outgoing VCI to be assigned to the ATM cell bearing the AAL2 packet, the internal interface package 246 is directed to one of the ATM cell input FIFOs 320 in accordance with the service class indicated in the new ATM header (see FIG. 12). When the internal interface package 246 is stored into an appropriate one of the input FIFOs 312, a current time stamp (TS) value replaces the internal interface header (IIH).

When an ATM cell is to be extracted from queue server 230, the Queue Server Scheduler calls the Multiplexing function at step 14-7, which in turn calls the ATM Multiplexing function of FIG. 14C. The ATM Multiplexing function checks the unload table 336 to determine when the particular ATM cell input FIFO 320 in which the internal interface package 246 has been stored is to be tapped for unloading (see step 14C-7). It is assumed at this juncture that an internal interface package 246 does reside in the selected input FIFO 320 (based on the queue indication [QI]), and that the internal interface package 246 is not excessively aged (see step 14C-12).

When an input FIFO 320 has been selected in the manner described above, the ATM Multiplexing function unloads the ATM cell from the internal interface package 246 from the ATM cell input FIFO 320 (by calling the Dequeue ATM Packet function [see FIG. 14K]). Unloading of the ATM cell involves moving the ATM cell into outgoing ATM cell FIFO 340 where the cell is being formed, clearing the time stamp (TS) associated with the internal interface package 246, and determining whether the queue indication need be reset for the FIFO 320 from which the ATM cell was unloaded (see FIG. 14K).

Thus, queue server 230 eventually routes the newly formed ATM cell to the outgoing ATM cell FIFO 340 of the link multiplexer 280 corresponding to the selected ET link. The thusly-formed ATM cell, stored in outgoing ATM cell FIFO 340, is taken out of outgoing ATM cell FIFO 340 when the Router Scheduler function determines (at step 13-3) that such ATM cell is to be transmitted to it from queue server 230. To do so, the Router Scheduler function calls the Transfer Cell function (see FIG. 13A), which selects the particular link multiplexer 280 from which an ATM cell is to be extracted and moves such ATM cell to outgoing cell FIFO 252.

OPERATION SUMMARY: HANDLING TOP PRIORITY CELLS

While most ATM cells handled by a node should be queued prior to transmission on one of the ET links connecting the node to another node, some ATM cells may not need to be queued. Such "top priority" ATM cells should instead avoid queue server 230 of cell handling unit 32. To cater to this possibility, cell router 220 of cell handling unit 32 is provided with top priority function 266. Operation of top priority function 266 in context of cell router 220 is now explained.

Receipt of a top priority ATM cell at cell handling unit 32 is initially handled in the same manner as other ATM cells aforedescribed. In this regard, when it is determined at step 13-5 of the Router Scheduler function (see FIG. 13) that an incoming cell awaits in incoming cell FIFO 250 of switch port interface circuit (SPIC) 210, the ATM demultiplexing function 260 is called (step 13-6). After checking the validity of the incoming cell (at step 13B-6), and (at step 13B-9) determining that the incoming cell is a top priority cell, the top priority function 266 is invoked at step 13B-12.

The top priority function 266 (see FIG. 13E) obtains a new VCI and SPIC tag for the outgoing top priority ATM cell from combined VCI/CID table 272 (step 13E-2), along with an internal interface header (IIH)n Although the top priority function 266 does not send a payload to queue server 230, the top priority function 266 nevertheless does obtain an internal interface package 246 for transmission to queue server 230 via in-buffer memory 242 to be used for the setting of th e top priority indication 322 (see FIG. 12). In essence, top priority function 266 obtains the payload from the incoming ATM cell, adds thereto the new VCI and SPIC tag (see step 13E-4), and moves the thusly reconstructed ATM cell to outgoing cell FIFO 252 (step 13E-5). Such a top priority cell therefore need not be queued in the queuing scheme of queue server 230.

CHU: CELL ROUTING AND QUEUING MANAGEMENT

As explained and exemplified above, cell handling unit 32 includes queue server 230. Queue server 230 provides a centralized or pooled resource for queuing of outgoing ATM cells. In this regard, queue server 230 includes plural link multiplexers 280, each link multiplexer 280 having the queuing scheme shown in FIG. 12. A link multiplexer 280 with its associated queuing scheme can be allocated to each outgoing ET link that requires queue administration.

Figure 16A:
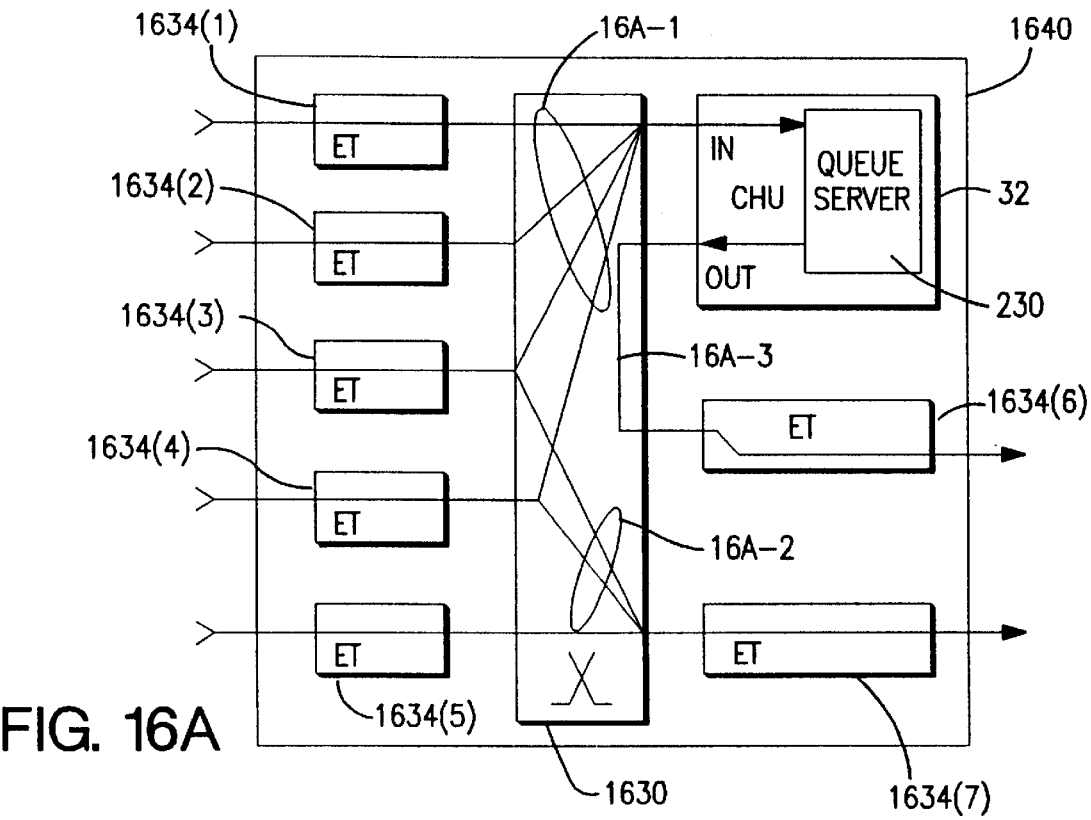
FIG. 16A, FIG. 16B, FIG. 17A, and FIG. 17B are schematic views of a cell routing scenarios of the invention.

FIG. 16A shows potential routings of ATM cells through an ATM switching node 1640 whereat a cell handling unit 32 resides. ATM switching node 1640 can be, for example, any of the nodes discussed previously, including base station $42_1$, base station controller 44, or mobile switching center (MSC) 46 of FIG. 5, and represents (albeit in simplified manner) the structures and operations previously described. The cell handling unit 32 of FIG. 16A is connected to a port of the ATM switch 1630. Extension terminals (ET) 1634(1) through 1634(5) are shown as connecting input links to node 1640 to the ATM switch 1630. Extension terminals (ET) 1634(6) and 1634(7) are shown as connecting node 1640 to output links. It should be understood that, in general, extension terminals (ET) have both input and output links connected thereto, but for sake of simplification in the present discussion the input links handled by extension terminals (ET) 1634(1) through 1634(5) and output links handled by extension terminals (ET) 1634(6) and 1634(7) are emphasized. Moreover, it should be understood that each of the input or output links can handle a number of ATM-VCCs.

In the particular scenario of FIG. 16A, the physical output handled by extension terminal (ET) 1634(7) does not require advanced queuing. On the other hand, the physical output handled by extension terminal (ET) 1634(6) does require advanced queuing. Neither extension terminal (ET) 1634(6) nor extension terminal (ET) 1634(7) has on-board provision for advanced queuing management. Since the physical output link handled by extension terminal (ET) 1634(6) requires queuing, all ATM VCCs destined to extension terminal (ET) 1634(6) are routed through the ATM switch 1630 to the centralized queue server 230 provided in cell handling unit 32, as indicated by switching lines 16A-1 in FIG. 16A. After being subject to queuing management in cell handling unit 32, outbound ATM cells destined for extension terminal (ET) 1634(6) are routed through the ATM switch 1630 to extension terminal (ET) 1634(6), as indicated by switching line 16A-3. In contrast, the ATM VCCs destined to extension terminal (ET) 1634(7) which does not require queuing management are routed through the ATM switch 1630 directly to extension terminal (ET) 1634(7), as indicated by switching lines 16A-2.

In the embodiment of FIG. 16A, queue server 230 provides a centralized advanced queue management resource which can be utilized for output links requiring such management, but bypassed by ATM cells destined for output links not requiring such management.

Figure 16B:
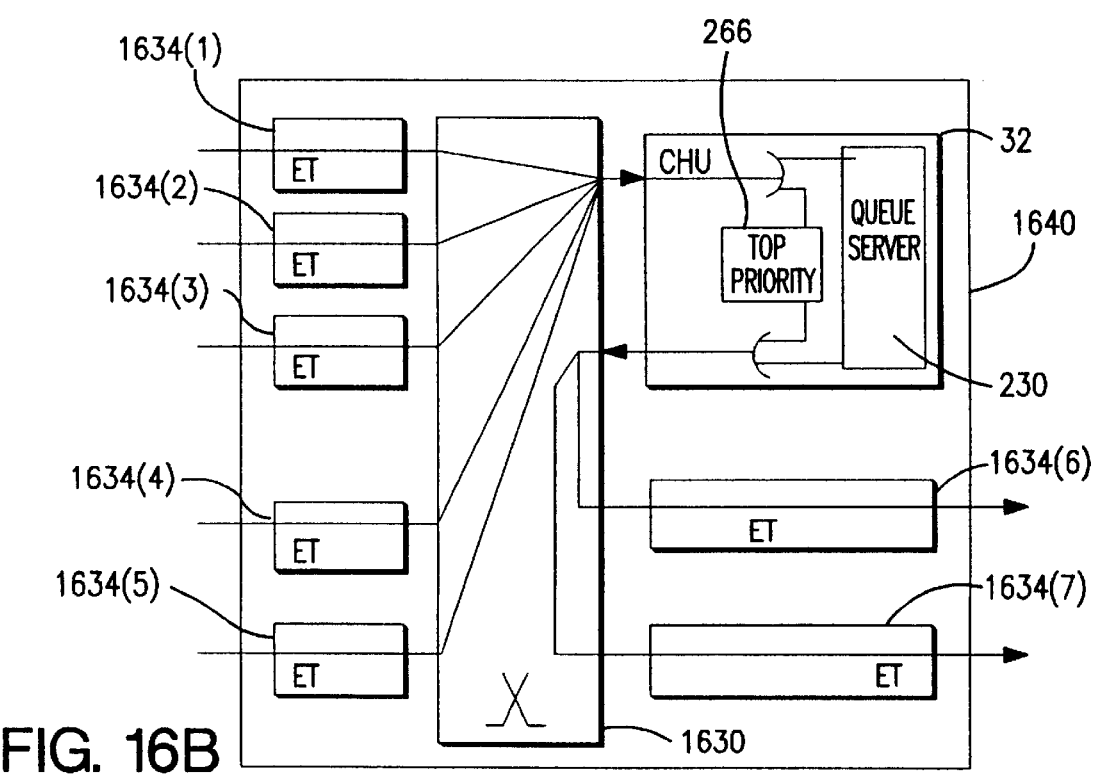

The embodiment of FIG. 16B has essentially the same nodal structure as the embodiment of FIG. 16A, but employs a slightly different approach in cell routing. The embodiment of FIG. 16B features the top priority function 266 previously described e.g., with reference to FIG. 11 and FIG. 13E. In the embodiment of FIG. 16B, essentially all incoming ATM cells are routed through the ATM switch 1630 to cell handling unit 32. At the cell handling unit 32, ATM cells which are denoted as being of "top priority" are not forwarded to queue server 230, but instead are provided with expedited handling by virtue of the top priority function 266. The top priority function 266 essentially provides the top priority ATM cells with the new VCI and SPIC tag for reaching the queue-unnecessary destination [e.g., extension terminal (ET) 1634(7)], and forward such cells to outgoing cell FIFO 252 (see FIG. 11) without routing through the queuing scheme of queue server 230. However, in connection with the top priority function 266 a top priority indication 322 is provided to queue server 230 so that queue server 230 can compensate in the coordination of output of further ATM cells.

Figure 17A:
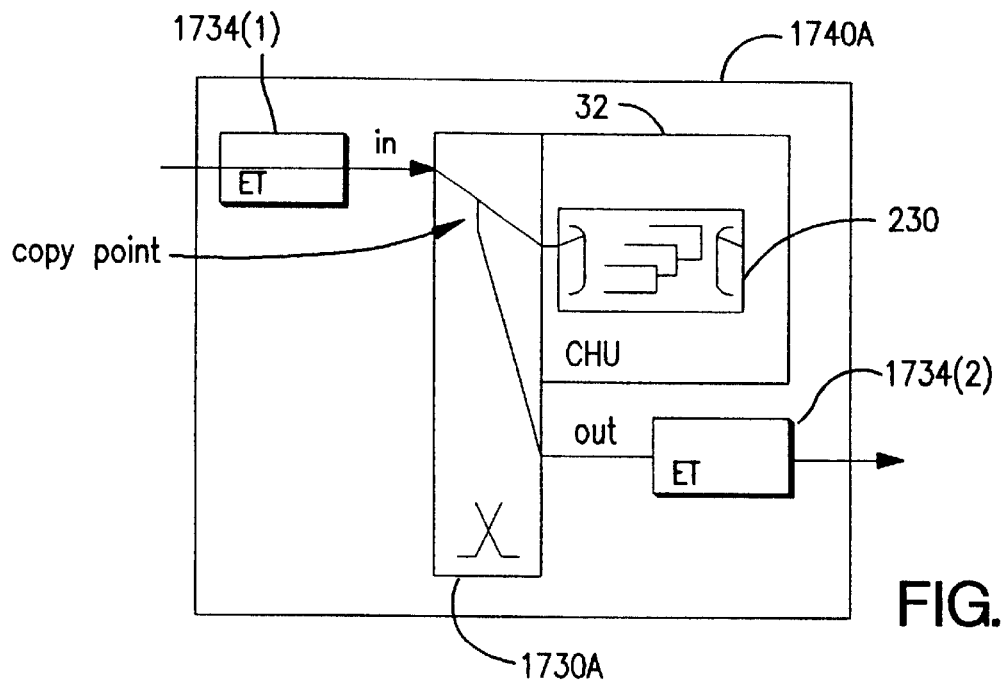

FIG. 17A shows an ATM switching node 1740A which utilizes a point-to-multipoint capability in conjunction with routing of top priority cells. In point-to-multipoint processing, a copy of a incoming ATM cell is provided to more than one ATM-VCC. In FIG. 17A, the ATM switch 1730A serves as the copy agent. ATM cells inbound from extension terminal (ET) 1734(1) are copied by the ATM switch 1730 and routed through the ATM switch 1730 to each of extension terminal (ET) 1734(2) and cell handling unit 32. In cell handling unit 32, the received copy of the ATM cell is not stored in any of the queues of queue server 230, but instead is used to provide an indication of queue server 230 that a high priority ATM cell from the specified ATM-VCC has been directly routed to extension terminal (ET) 1734(2).

Figure 17B:
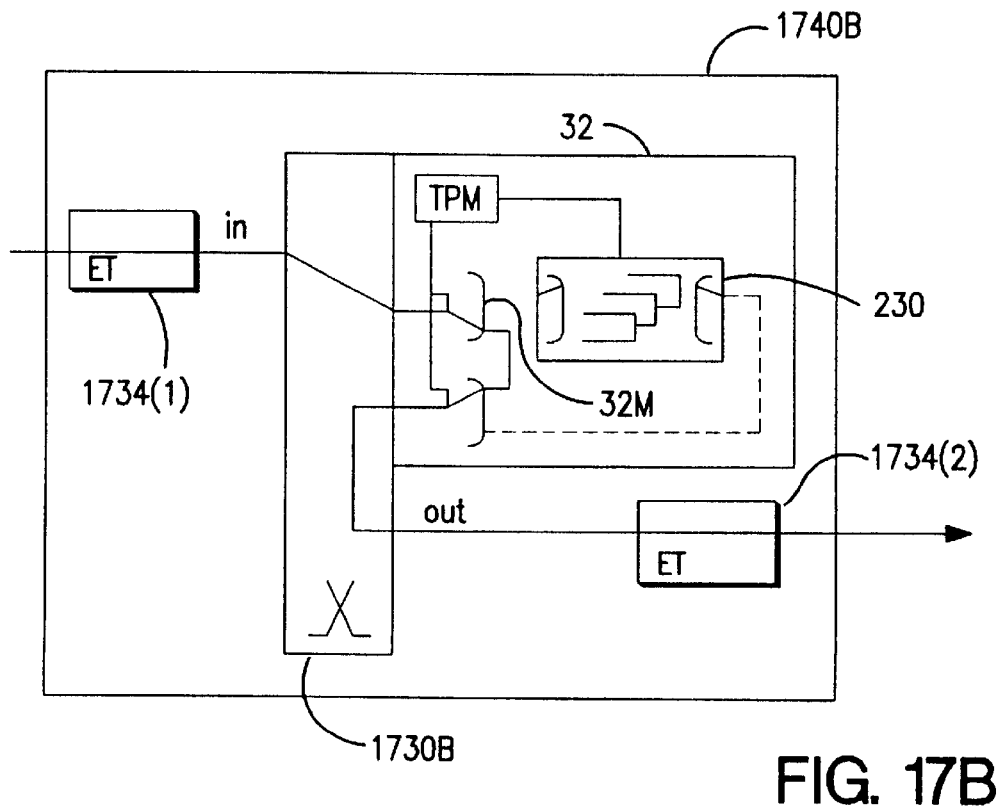

FIG. 17B shows a variation of the embodiment of FIG. 17A in a case in which the ATM switch 1730B does not have multipoint copying capability. In node 1740B of FIG. 17B, the incoming top priority ATM cell is routed to cell handling unit 32. At the input of cell handling unit 32 a top priority monitor (TPM) monitors the headers of each incoming ATM cell to determine if it belongs to the top priority VCC. If a cell belongs to the top priority VCC as determined by the top priority monitor (TPM), a top priority multiplexer 32M routes such cells directly to the output of the cell handling unit 32. Queue server 230 is advised that a top priority cell has short circuited queue server 230.

The centralized, pooled advanced queuing management provided by queue server 230 of cell handling unit 32 thus advantageously avoids requiring advanced queuing management at each output link (e.g., at each extension terminal ET).

COMBINED VCI/CID TABLE

An example of the combined VCI/CID table 272 illustrated as included in cell router 220 is shown in FIG. 18. As shown in FIG. 18, combined VCI/CID table 272 is conceptualized as having ten columns, referenced as columns (1) through (10). Column (1) contains CID values (see FIG. 2); column (2) contains incoming VCI values; column (3) contains a connection type indicator; column (4) contains an ET-link value; column (5) contains an AAL2-link value; column (6) contains a table offset value; column (7) contains an outgoing VPI value; column (8) contains an outgoing VCI value; column (9) contains an outgoing (SPIC) tag value; and column (10) contains an internal interface header (IIH). The combined VCI/CID table 272 is also conceptualized as having rows, with the rows grouped into table portions or intervals, particularly table portion $1802_0$ and table intervals $1802_A$ through $1802_H$. Each row of an interval is deemed a subinterval of that interval.

For sake of simplicity, the combined VCI/CID table 272 of FIG. 18 does not necessarily show values in all columns. Values are provided only in columns useful for illustrating the principles of the invention. Moreover, it should be understood that the VCI values utilized in combined VCI/CID table 272 are node-internal VCI values. For a cell incoming to a node, the VCI values of the incoming cell are changed at the extension terminal, for example, into internal VCI values for use within the node. The internal VCI value enables routing of the cell through the ATM switch 30 to cell handling unit 32. The cell handling unit 32, using combined VCI/CID table 272, assigns an new internal VCI which enables the cell to be routed out of cell handling unit 32 and through the ATM switch 30 to another board of the node. Prior to exiting from the node, the last-utilized internal VCI value is changed to an external VCI value which enables routing of the cell to another node of the ATM network.

Figure 19A:
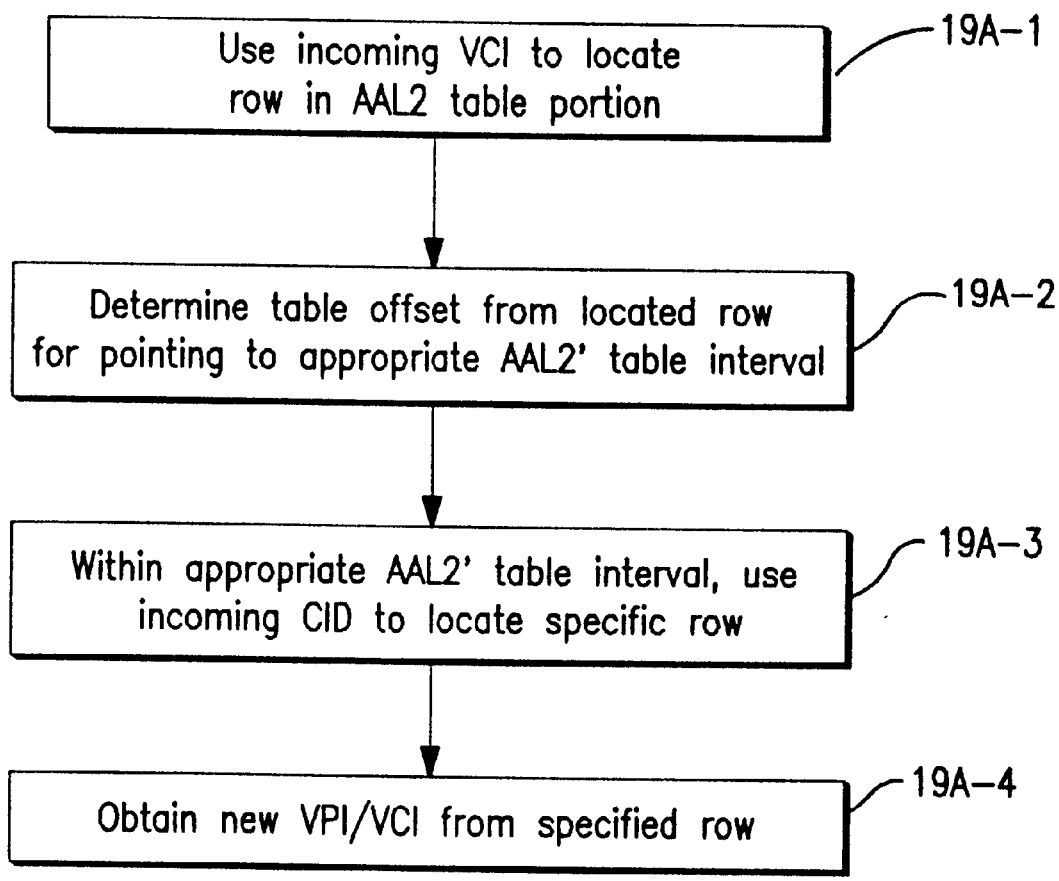
FIG. 19A is a flowchart showing basic steps for utilizing the combined VCI/CID table of FIG. 18 in connection with a demultiplexing operation.

FIG. 19A shows steps utilized for obtaining VPI/VCI information when an ATM cell having AAL2 protocol is demultiplexed into one or more ATM cells having AAL2 prime protocol (e.g., in the manner above illustrated by FIG. 4). In the demultiplexing operation, the AAL2 portion of combined VCI/CID table 272 is initially consulted. At step 19A-1, the internal VCI value of the incoming cell is used to locate a suitable row in the AAL2 table portion $1802_0$. For example, if the incoming VCI value is "32", the first row of combined VCI/CID table 272 is indicated. At step 19A-2, cell router 220 determines a table offset [from column (6)] from the indicated row. In the example of an incoming VCI of "32", the table offset obtained from column (6) is "A". The table offset "A" signifies that cell router 220 is to check interval $1802_A$ of combined VCI/CID table 272, which is pointed to by offset "A".

Once the proper table interval is located, at step 19A-3 the cell router 220 uses the CID of the first AAL2 packet of the incoming ATM cell in order to locate the specific row within the proper table interval. With the specific row of the proper table interval having been found, at step 19A-4 the cell router 220 obtains the necessary information, e.g., the new internal VPI value and new VCI value from column (7) and column (8), respectively. For example, if the CID of the first AAL2 packet were "8", then at step 19A-4 the VPI value found at the intersection of the row in portion $1802_A$ having CID of 8 and column (7) would be the returned VPI value; and the VCI found at the intersection of the same row and column (8) would be the returned VCI value.

It should be understood that step 19A-3 and step 19A-4 of FIG. 19A are performed for each AAL2 packet in the ATM cell which is to be demultiplexed. For example, in connection with the demultiplexing example of FIG. 4, the operations of step 19A-3 and step 19A-4 would be performed three times—once each for AAL2 packets $26_{4-1}$ through $26_{4-3}$ for the formation of cells $20'_{4-1}$ through $20'_{4-3}$, respectively.

Figure 19B:
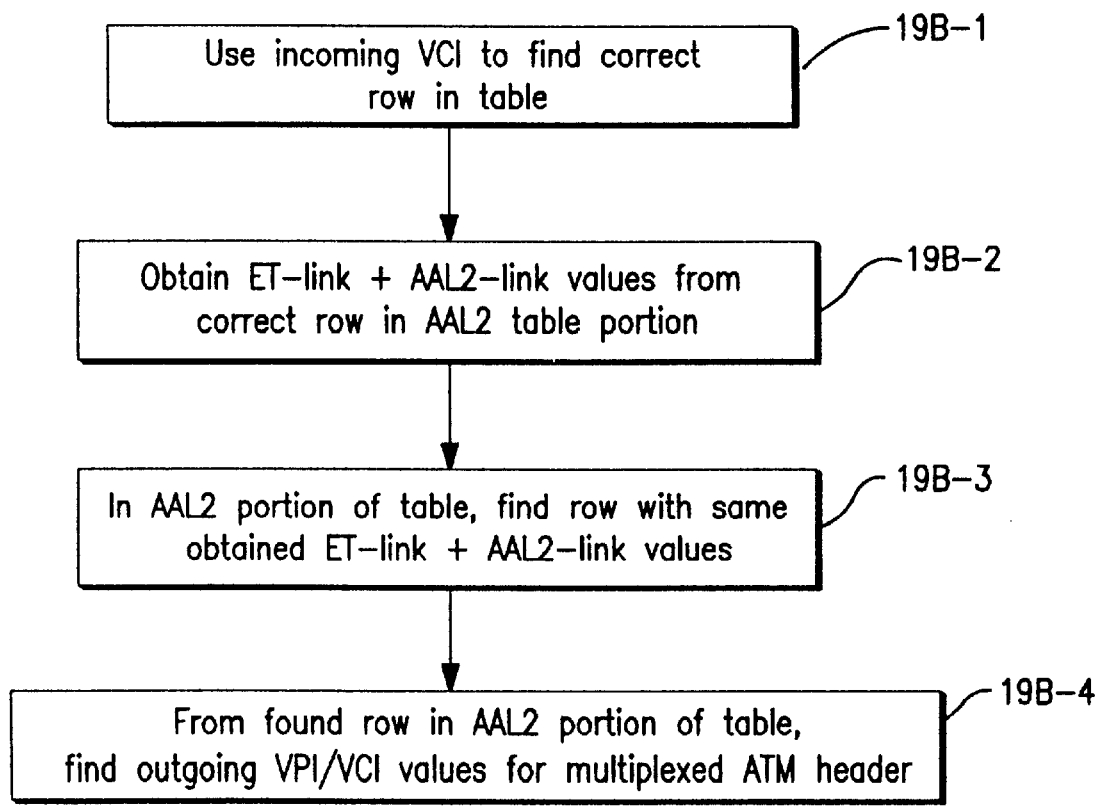
FIG. 19B is a flowchart showing basic steps for utilizing the combined VCI/CID table of FIG. 18 in connection with a multiplexing operation.

FIG. 19B shows steps involved in multiplexing AAL2 packets into an ATM cell having potentially plural AAL2 packets. At step 19B-1, the VCI value of the incoming ATM cell is used to locate the correct row in the combined VCI/CID table 272. For example, if the incoming VCI were "49", the second row of table interval $1802_A$ would be signified. At step 19B-2, the ET-link value and AAL2-link value from the row located at step 19B-1 are obtained. In the example in which the incoming VCI was "49", the ET-link value would be "0" and the AAL2-link value would be "0". At step 19B-3, a row in the AAL2 portion of combined VCI/CID table 272, e.g., table portion $1802_0$, having the ET-link and AAL2-link values found at step 19B-2 is found. In the current example, the first row of table portion $1802_0$ is found. Then, at step 19B-4, the VPI and VCI values from the row found at step 19B-3 are utilized for the ATM header of the cell being multiplexed.

QUEUING WITH TIMESTAMPING

It has been described above how, for some incoming ATM cells, cell router 220 prepares an internal interface package 246 for transmission through in-buffer memory 242 to queue server 230. The internal interface package 246 includes an internal interface header (IIH) and one of (1) the payload of the incoming ATM cell; or (2) an AAL2 packet from the incoming ATM cell. Steps involved in preparing an internal interface package 246 using an ATM cell are shown in ATM mapping function 264 (see FIG. 13D); steps involved in preparing an internal interface package 246 using an AAL2 packet are shown in AAL2' mapping function 262 (see FIG. 13C).

The Queue Cell/Packet function 284 of FIG. 14A has also been referred to as the Time Stamping function. FIG. 20A shows, in more simplified form than the Queue Cell/Packet function 284 of FIG. 14A, basic steps for moving an ATM package into a queue of queue server 230. At step 20A-1, the internal interface package 246 is obtained from in-buffer memory 242. Then, at step 20A-2, the internal interface header (IIH) of the internal interface package 246 is replaced with a time stamp TS. The time stamp TS is related to the time at which the internal interface package 246 is being stored in a queue of queue server 230. Step 20B-3 shows the internal interface package 246 with time stamp TS being stored in an appropriate queue of queue server 230. If the internal interface package 246 contains an AAL2 packet, the internal interface package 246 with time stamp TS is stored in one of the input FIFOs 312 of one of the AAL2 VCI queuing units 310. Into which queuing unit 310 the package is stored depends on the VCI; into which FIFO 312 of that queuing unit 310 depends on the service class. If the internal interface package 246 contains an ATM cell payload, the internal interface package 246 with time stamp is stored in one of the ATM cell input FIFOs 320 (which FIFO 320 depending on service class). FIG. 12 shows the next package to be unloaded in each of input FIFOs 312 and ATM cell input FIFOs 320 as including a time stamp TS. It should be understood that all entries in input FIFOs 312 and ATM cell input FIFOs 320 have such a time stamp TS, although not so illustrated.

How ATM cells are read out of queue server 230 has been described in connection with Queue Server Scheduler function 283 and functions called thereby, particularly the Select AAL2 Packet function of FIG. 14F for the reading out of AAL2 packets and the ATM multiplexing function 288 of FIG. 14C for the reading out of ATM payloads (either of which is considered to be a read out function or time stamp checking function). FIG. 20B is a flowchart showing in more simplified form the basic steps for dequing an ATM package from a queue insofar as the timestamping feature of the invention is concerned. Step 20B-1 shows the next package in a queue being referenced. The next package of step 20B-1 could be either an AAL2 packet in the case of the queue being an input FIFO 312, or an ATM payload in the case of the queue being an ATM cell input FIFO 320. At step 20B-2 the time stamp TS of the next package referenced at step 20B-1 is obtained and checked. At step 20B-3 the time stamp TS obtained at step 20B-2 is compared with a current time value, and a difference determined. The difference is indicative of a delay between storage and readout of the package. At step 20B-4 the delay determined at step 20B-3 is compared with a maximum permissible delay. If the delay determined at step 20B-3 exceeds the maximum permissible delay, the package is discarded as indicated by step 20B-5. Otherwise, the package is utilized for cell formation, e.g., dequeued, as indicated by step 20B-6.

It should be understood that the maximum permissible delay may vary from one queue to another. That is, some connections (such as data connections, for example) may be less delay sensitive than other connections (e.g., voice connections), and accordingly may have smaller maximum permissible delay values. Similarly, the maximum permissible delay may vary based on other factors, such as quality of service class, for example.

The operations of FIG. 20B provide one illustration of using time stamped queuing to determine whether the tenure of a package in a queue is longer than permissible. Another illustration occurs in the context of potential remedying of possible buffer congestion problems. In this regard, FIG. 20C is a flowchart showing basic steps of a Queue Monitoring function executable by queue server 230 for monitoring queue fill using time stamped queuing. The Queue Monitoring function of FIG. 20C can be executed separately for each of the queues of queue server 230, e.g., input FIFOs 312 and ATM cell input FIFOs 320. Step 20C-1 shows the Queue Monitoring function waiting for invocation. Invocation of the Queue Monitoring function can occur periodically or upon occurrence of a triggering event. After being invoked, at step 20C-2 the Queue Monitoring function determines whether the queue fill level for a certain queue exceeds a permissible threshold. In this regard, each a fill level is maintained for each queue, the fill level indicating the degree of utilization of the queue. The permissible threshold can be a fixed percentage of the capacity of the queue. If the permissible threshold of the queue is not exceeded, the Queue Monitoring function returns to the wait state of step 20C-1. If the permissible threshold is exceeded, at step 20C-3 the Queue Monitoring function checks the time stamp TS for the next package (e.g., packet or ATM payload) in the queue. Then, at step 20C-4, the time stamp TS is compared with a reference (e.g., the current time) to determine if the next package in the queue is too old. If the awaiting package is not too old, the Queue Monitoring function returns to the wait state of step 20C-1. If the awaiting package is too old, at step 20C-5 the package is discarded. Package discard involves invoking various discard functions previously described.

COORDINATED CELL DISCHARGE FROM QUEUE

As previously discussed, cell router 220 of cell handling unit 32 of FIG. 11 applies ATM cells via switch port interface circuit (SPIC) 210 to the ATM switch 30. Some of the ATM cells applied by cell router 220 to the ATM switch 30 are obtained from queue server 230, which outputs the ATM cells which its link multiplexers 280 form in out-buffer memory 244. The cells formed and stored in queue server 230 are destined for an inter-node link. For example, in context of the base station controller 44 of FIG. 5, ATM cells formed and stored in queue server 230 can be routed through the ATM switch 44-30 to extension terminal 44-34(0) for application on physical link 56 to mobile switching center (MSC) 46.

It can occur that queue server 230 can form, and cell handling unit 32 can output, ATM cells destined to a particular physical link (e.g., physical link 56) at a rate faster than the transmission rate of cells on that particular physical link. That is, the processing capacity of link multiplexer 280 may be greater than that of the physical link to that link multiplexer 280 server. To remedy such possibility, the queue server 230 of the present invention discharges ATM cells from its link multiplexers 280 at rates which are coordinated with the transmission rates of the corresponding physical links. The transmission rates of differing physical links can differ, with the result that queue server 230 allows for differing cell discharge rates from differing link multiplexers 280.

In the above regard, the Queue Server Scheduler function 283 (see FIG. 14) checks at step 14-3 whether it is timely to discharge an ATM cell from queue server 230 to cell router 220 (and ultimately to the ATM switch 30). The timeliness of discharge is determined by a Link Rate Counter function residing in queue server 230. Operation of the Link Rate Counter function in conjunction with a Link Rate Counter Table is described below.

Figures 21, 22:
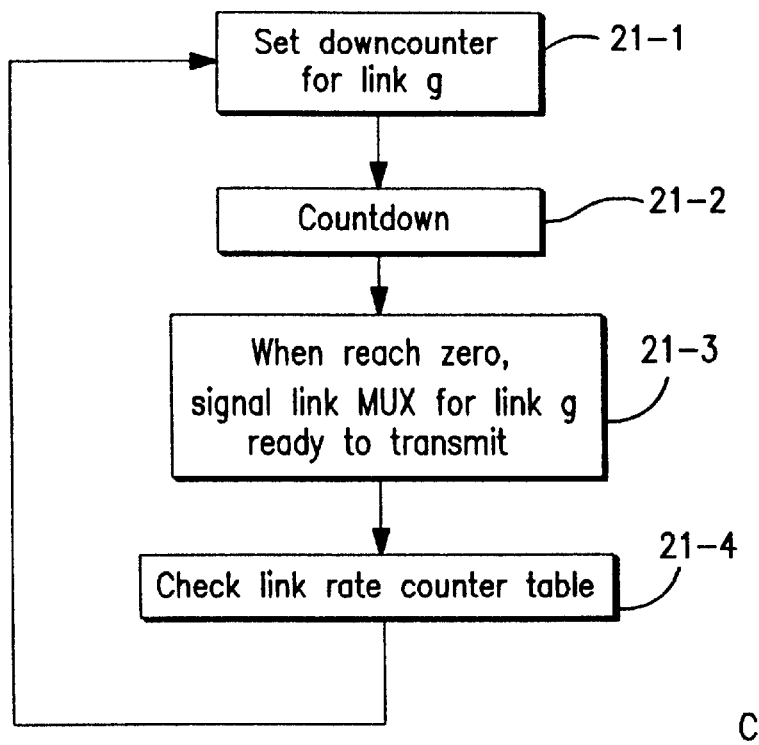
FIG. 21 is a flowchart showing basic steps of a Link Rate Counter function.
FIG. 22 is a diagrammatic view of a Link Rate Counter Table stored in a node controller.

The cell handling unit 32 (which includes queue server 230) is connected to the ATM switch 30 of a node, such as base station controller 44 (see FIG. 5). The node also has a node controller or main controller, such as main processor board 44-33, connected to its ATM switch 30. The main processor board 44-33 has stored in a memory thereof a Link Rate Counter Table such as that shown in FIG. 22. The Link Rate Counter Table has a set of entries for each physical link of the node, the set of entries including: (1) an address (CHU#) of the particular cell handling unit 32 which handles the physical link (since plural cell handling units 32 can be provided); (2) an identification of the particular digital signal processor (DSP#) of the queue server 230 of the addressed cell handling unit 32 which handles the physical link (since the queue server 230 can comprise plural processors); (3) an identification of the particular link multiplexer 280 in the addressed queue server 230 which handles the physical link; and (4) timing characteristics (e.g., transmission rate) of the physical link. FIG. 22 particularly shows an entry for physical link 56 of FIG. 5, with the "Link" column of Link Rate Counter Table containing the value "56"; the "CHU#" column containing the value "44-32" (in this case indicating the sole cell handling unit 32 of the node); the "DSP#" column indicating that a first processor is employed; the "LINK MUX#" column indicating that the first link multiplexer 280 is utilized; and the "TIMING CHARACTERISTICS" column indicating that the transmission rate for physical link 56 is 1.5 Megabits per second.

The information contained in the Link Rate Counter Table of Table 22 is transmitted from the node controller, e.g., main processor 44-33 in FIG. 5, through the ATM switch 30 to cell handling unit 32. At cell handling unit 32 the information of Link Rate Counter Table is transmitted through incoming cell multiplexer 254 to board processor 200. Board processor 200 transmits the information of Link Rate Counter Table over processor bus 240 to queue server 230, which queue server 230 obtains and stores as it processes a slice of its background (see step 14-8 of FIG. 14).

Basic operations of the Link Rate Counter function are shown in FIG. 21 for one of the link multiplexers 280 maintained by queue server 230, i.e., link multiplexer 280 corresponding to physical link q. It should be understood that the Link Rate Counter function is performed for each of the link multiplexers 280 maintained by queue server 230, e.g., in a multitasking context.

At step 21-1 the Link Rate Counter function sets a downcounter for link q. The value to be loaded into the downcounter for link q is obtained or determined in relation to the TIMING CHARACTERISTIC value load in the Link Rate Counter Table for link q. After loading of the downcounter, decrementation of the downcounter is enabled at step 21-2. Decrementation occurs in timed relation to a clock signal input to the downcounter. When the value in the downcounter has been decremented down to zero, at step 21-3 a signal or interrupt is sent to the Queue Server Scheduler function 283 that the link multiplexer 280 for link q is ready to transmit a cell. This signal or interrupt serves to result in an affirmative result at step 14-3. In addition, the signal or interrupt at step 21-3 contains an indication of the identity of the link multiplexer 280 for link q, which is utilized by the Queue Server Scheduler function 283 at step 14-5 for selecting the proper link multiplexer 280 for which the Multiplexing function is to be called (see FIG. 14). After the signal or interrupt is issued at step 21-3, at step 21-4 the Link Rate Counter function checks the Link Rate Counter Table in order to obtain therefrom an appropriate value to load into the downcounter at step 21-1.

The loop formed by steps 21-1 through 21-4 continues, providing queue server 230 with a signal or interrupt in timed relation with the ability of the physical link to accept an ATM cell. The signal or interrupt generated at step 21-3 causes the Queue Server Scheduler function 283 to invoke the Multiplexing function at step 14-7, ultimately resulting in the link multiplexer 280 for the physical link providing an ATM cell for routing to the physical link. The Link Rate Counter function thus assures that for any particular physical link the cell handling unit 32 does not transmit ATM cells at a rate greater than which the physical link can transmit the cells to another node.

The present invention can be utilized in conjunction with the ATM systems disclosed in the following simultaneously-filed United States patent applications, all of which are incorporated herein by reference:

U.S. patent application Ser. No. 09/188,101 and U.S. patent application Ser. No. 09/188,265, both entitled "ASYNCHRONOUS TRANSFER MODE SWITCH" and both of which claim the benefit and priority of U.S. Provisional Patent Application No. 60/071,063 filed Dec. 19, 1997 and U.S. Provisional Patent Application No. 60/086,619 filed May 22, 1998, both of which are also incorporated herein by reference.

U.S. Provisional Patent Application Serial No. 09/272,621, entitled "METHOD, ARRANGMENT, AND APPARATUS FOR TELECOMMUNICATIONS".

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A table stored in a memory for access by an ATM cell handling unit used to obtain an ATM parameter for use in an ATM header of an outgoing ATM cell, the table having plural intervals including a first interval for first AAL type connections and an interval for second AAL type connections,
   the table further having subintervals for the first interval with each subinterval of the first interval being associated with (1) a unique VCI value for the first type AAL connection and (2) an offset value which points to the interval for the second AAL type connection,
   the table further having subintervals of the interval for the second AAL type connections with each subinterval for the second AAL type connections being associated with (1) a channel identifier (CID) for a particular one of the first AAL type connections; and (2) the ATM parameter for use in an ATM header of an outgoing ATM cell.

2. The apparatus of claim 1, wherein the ATM parameter for use in an ATM header of an outgoing ATM cell is a VCI value.

3. The apparatus of claim 1, wherein each subinterval is conceptualized as corresponding to a row of the table, and wherein each interval of the table is conceptualized as having, for each row, columns for each of the following: incoming VCI value; output link value; and outgoing VCI value.

4. The apparatus of claim 3, wherein the first interval is conceptualized as further having, for each row, a column for the offset value.

5. The apparatus of claim 3, wherein the interval for the second AAL type connections is conceptualized as further having, for each row, a column for the channel identifier (CID).

6. The apparatus of claim 3, wherein the table has plural intervals for second AAL type connections, and wherein the offset value for a particular subinterval of the first interval points to a unique one of the plural intervals for second AAL type connections.

7. A table stored in a memory for access by an ATM cell handling unit used to obtain an ATM parameter for use in an ATM header of an outgoing ATM cell, the table having plural intervals including a first interval for first AAL type connections and an interval for second AAL type connections,
   the table further having subintervals of the interval for the second AAL type connections with each of the subintervals for the second AAL type connections being associated with (1) a unique VCI value; and (2) an output link value;
   the table further having subintervals for the first interval with one of the subintervals of the first interval having stored therein (1) a same output link value as a selected one of the subintervals for the second AAL type connections; and (2) the ATM parameter for use in an ATM header of an outgoing ATM cell.

8. The apparatus of claim 7, wherein the ATM parameter for use in an ATM header of an outgoing ATM cell is a VCI value.

9. The apparatus of claim 7, wherein each subinterval is conceptualized as corresponding to a row of the table, and wherein each interval of the table is conceptualized as having, for each row, columns for each of the following: incoming VCI value; output link value; and outgoing VCI value.

10. The apparatus of claim 7, wherein the table has plural intervals for second AAL type connections, and each subinterval of the first interval has an offset value which points to a corresponding unique one of the plural intervals for second AAL type connections.

11. A method of using a table stored in a memory for obtaining an ATM parameter for use in an ATM header of an outgoing ATM cell, the table having plural intervals including a first interval for first AAL type connections and plural intervals for second AAL type connections, the table further having subintervals for the first interval with each subinterval of the first interval being associated with (1) a unique VCI value for the first type AAL connection and (2) an offset value which points to the interval for the second AAL type connection, the table further having subintervals of the interval for the second AAL type connections with each subinterval for the second AAL type connections being associated with (1) a channel identifier (CID) for a particular one of the first AAL type connections; and (2) the ATM parameter for use in an ATM header of an outgoing ATM cell; wherein the method comprises:

upon receiving an incoming ATM cell having an AAL2 protocol, ascertaining therefrom an incoming VCI value and incoming channel identifier (CID) value;

using the incoming VCI value to locate an appropriate subinterval in the first interval;

from the appropriate subinterval obtaining an appropriate offset value;

using the appropriate offset value to locate an appropriate one of the plural intervals for second AAL type connections;

using the CID value to determine an appropriate one of the subintervals of the appropriate one of the plural intervals for second AAL type connections;

obtaining the ATM parameter for use in an ATM header of the outgoing ATM cell from the appropriate one of the subintervals of the appropriate one of the plural intervals for second AAL type connections.

12. The method of claim 11, wherein the ATM parameter for use in an ATM header of the outgoing ATM cell is a VCI value.

13. A method of using a table stored in a memory for obtaining an ATM parameter for use in an ATM header of an outgoing ATM cell, the table having plural intervals including a first interval for first AAL type connections and plural intervals for second AAL type connections, the table further having subintervals for the plural intervals for the second AAL type connections with each of the subintervals for the second AAL type connections being associated with (1) a unique VCI value; and (2) an output link value; the table further having subintervals for the first interval with each of the subintervals of the first interval having stored therein (1) an associated output link value; and (2) an associated ATM parameter for use in an ATM header of an outgoing ATM cell; wherein the method comprises:

(1) upon receiving an incoming ATM cell, ascertaining therefrom an incoming VCI value;

(2) locating an appropriate one of the plural intervals for second AAL type connections and an appropriate subinterval thereof which has its associated VCI value matching the incoming VCI value;

(3) obtaining from the appropriate subinterval determined in step (2) an appropriate output link value;

(4) locating an appropriate one of the subintervals of the first interval which has the associated output link value which matches the appropriate output link value;

(5) obtaining from the appropriate one of the subintervals located in step (4) the associated ATM parameter for use in the header of the outgoing ATM cell.

14. The method of claim 13, wherein the ATM parameter for use in an ATM header of the outgoing ATM cell is a VCI value.

* * * * *